United States Patent
Ceperkovic et al.

(10) Patent No.: US 8,306,340 B2
(45) Date of Patent: Nov. 6, 2012

(54) FAST CODEC WITH HIGH COMPRESSION RATIO AND MINIMUM REQUIRED RESOURCES

(75) Inventors: Vladimir Ceperkovic, Kraljevo (YU); Sasa Pavlovic, Belgrade (YU); Dusan Mirkovic, Belgrade (YU)

(73) Assignees: Vladimir Ceperkovic, Kraljevo, Serbia (HR); Sasa Pavlovic, Belgrade, Serbia (HK); Dusan Mirkovic, Belgrade, Serbia (HR); Milan Prokin, Belgrade, Serbia (HR)

( * ) Notice: Subject to any disclaimer, the term of this patent is extended or adjusted under 35 U.S.C. 154(b) by 1180 days.

(21) Appl. No.: 10/527,963

(22) PCT Filed: Sep. 5, 2003

(86) PCT No.: PCT/YU03/00027
§ 371 (c)(1),
(2), (4) Date: Mar. 15, 2005

(87) PCT Pub. No.: WO2004/028142
PCT Pub. Date: Apr. 1, 2004

(65) Prior Publication Data
US 2006/0053004 A1 Mar. 9, 2006

(30) Foreign Application Priority Data
Sep. 17, 2002 (YU) .................................. 696/02

(51) Int. Cl.
*G06K 9/46* (2006.01)
(52) U.S. Cl. .................... 382/233; 382/234; 382/240
(58) Field of Classification Search .................. 382/232, 382/233, 234, 240
See application file for complete search history.

(56) References Cited

U.S. PATENT DOCUMENTS

| | | | | |
|---|---|---|---|---|
| 5,038,209 | A * | 8/1991 | Hang | 375/240.05 |
| 5,319,457 | A * | 6/1994 | Nakahashi et al. | 348/386.1 |
| 5,446,839 | A * | 8/1995 | Dea et al. | 345/502 |
| 5,844,610 | A * | 12/1998 | Perdrieau et al. | 375/240.11 |
| 5,926,791 | A * | 7/1999 | Ogata et al. | 704/500 |
| 5,974,521 | A * | 10/1999 | Akerib | 712/11 |
| 6,141,446 | A * | 10/2000 | Boliek et al. | 382/233 |
| 6,978,048 | B1 * | 12/2005 | Higginbottom et al. | 382/240 |
| 2004/0015349 | A1 * | 1/2004 | Vinton et al. | 704/230 |

OTHER PUBLICATIONS

D. J. Magenheimer et al.; "Integer Multiplication and Division on the HP PRecision Architecture"; Aug. 1988; IEEE Transactions on Computer vol. 37, No. 8; pp. 980-990.*

(Continued)

*Primary Examiner* — Chan S Park
*Assistant Examiner* — Eueng-Nan Yeh
(74) *Attorney, Agent, or Firm* — Hunton & Williams, LLP

(57) ABSTRACT

This invention provides a novel single-pass and multi-pass synchronized encoder and decoder, performing order(s) of magnitude faster data compression and decompression, at any compression ratio with the higher or the same perceived and measured decompressed image quality in comparison with the best state-of-the-art compression methods, using order(s) of magnitude less system resources (processor complexity, memory size, consumed power, bus bandwith, data latency). These features are achieved using novel direct and inverse non-stationary filters for the recusive octave direct and inverse subband transformation, novel simple context modeling and symbol probability estimation using a minimum number of histograms with the fast adaptation for the sign and the magnitude of the transformation coefficients, a novel accelerated range coder without division operations, and a novel synchronisation of the compressed data.

332 Claims, 34 Drawing Sheets

OTHER PUBLICATIONS

International Preliminary Search Report and International Preliminary Examination Report of PCT/YU2003/000027 dated Mar. 24, 2004.

Chinese Certificate of Invention Patent, State Intellectual Property Office of the People's Republic of China (Jul. 2008).

Information about Granting of Serbian Patent for Invention No. 49934, dated Nov. 3, 2008.

Moore, Samuel K., "Multicore is Bad News for Supercomputers", IEEE Spectrum, Nov. 2008, also available online at http://www.spectrum.ieee.org/nov08/6912.

V. R. Algazi, et al., "Analyisis Based Coding of Image Transform and Subband Coefficients", SPIE Applications of Digital Image Processing XVIII, vol. 2564, p. 11-21, Jul. 1995.

M. Antonini, et al., "Image Coding using the Wavelet Transform", IEEE Trans. Image Pro., vol. 1, No. 2, p. 205-220, Apr. 1992.

M. Boliek, et al. (editors), "JPEG2000 Part Ifinal Draft International Standard", (ISO/IEC FDIS15444-1), ISO/IEC JTC1/SC29/WG1 N1855, Aug. 18, 2000.

L. Bottou, et al., "The Z-coder Adaptive Coder", Proc. Data Compression Conf., Snowbird, UT, p. 13-22, Mar. 1998.

R. W. Buccigrossi, et al., "Image Compression via Joint Statistical Characterization in the Wavelet Domain", GRASP Laboratory Technical Report #414, University of Pennsylvania, USA, May 30, 1997.

R. W. Buccigrossi, et al., "Image Compression via Joint Statistical Characterization in the Wavelet Domain", IEEE Trans. Image Processing, vol. 8, No. 12, p. 1688-1701, Dec. 1999.

R. W. Buccigrossi, et al., "Progressive Wavelet Image Coding Based on a Conditional Probability Model", Proc. Int. Conf. Acoustics, Speech, Signal Processing (ICASSP), Munich, Germany, vol. 4, p. 2597-2600, Apr. 21-24, 1997.

P. J. Burt, et al., "The Laplacian Pyramid as a Cocept Image Code", IEEE Trans. Commun., vol. 31, No. 4, p. 532-540, Apr. 1983.

C. Christopoulos, et al., "The JPEG2000 still Image Coding System: An Overview", IEEE Trans. Consum. Electr., vol. 46, No. 4, p. 1103-1127, Nov. 2000.

C. Chrysafis, et al., "Efficient Context-Based Entropy Coding for Lossy Wavelet Image Compression", Data Compression Conf., Snowbird, UT, Mar. 25-27, 1997.

C. Chrysafis, et al., "Line Based Reduced Memory Wavelet Image Compression", Proc. Data Compression Conf., Snowbird, UT, Mar. 30-Apr. 1, 1998.

C. Chrysafis, et al., "An Algorithm Low Memory Wavelet Image Compression", Proc. IEEE Int. Conf. Image Processing (ICIP), Kobe, Japan, Oct. 24-28, 1999.

C. Chrysafis, et al., "Line Based Reduced Memory Wavelet Image Compression", IEEE Trans. Image Processing, vol. 9, No. 3, p. 378-389, Mar. 2000.

C. Chrysafis, Wavelet Image Compression Rate Distortion Optimizations and Complexity Reductions, Ph.D. Thesis, University of Southern California, USA, Mar. 2000.

C. Chrysafis, et al., "Minimum memory Implementations of the Lifting Scheme", SPIE, Int. Symp. Optical Science Tech., San Diego, CA, Jul. 30-Aug. 4, 2000.

O. Egger, et al., "High Performance Compression of Visual Information—A Tutorial review-Part I: Still Pictures", Proc. IEEE, vol. 87, No. 6, p. 976-1011, Jun. 1999.

O. Egger, et al., "Subband coding of Images using Asymmetrical Filter Banks", IEEE Trans. Image Processing, vol. 4, No. 4, p. 478-485, Apr. 1995.

D. Le Gall, et al., "Subband Coding of Digital Images Using Symmetric Short kernel Filters and Arithmetic Coding Techniques", Proc. Int. Conf. Acoustics, Speech, Signal Processing (ICASSP), New York, NY, p. 761-765, Apr. 1988.

T. Granlund, et al., "Division by invariant Integers using Multiplication", SIGPLAN Notices, vol. 29, No. 6, p. 61, Jun. 1994.

D. A. Huffman, "A method for the construction of minimum-redundancy Codes", Proc. IRE, vol. 40, No. 9, p. 1098-1101, Sep. 1952.

J. D. Johnston, "A filter Family Designed for use in Quadrature Mirror Filter Banks", Proc. Int. Conf. Acoustics, Speech, Signal Processing (ICASSP), Denver, CO, p. 291-294, April 9-11, 1980.

D. J. Magenheimer, et al., "Integer Multiplication and Division on the HP Precision Architecture," IEEE Trans. Computers, vol. 37, No. 8, p. 980-990, Aug. 1988.

S. G. Mallat, "A Theory for Multiresolution Signal Decomposition: The Wavelet Representation", IEEE Trans. Pattern Analysis Machine Intelligence, vol. 11, No. 7, p. 674-693, Jul. 1989.

G. N. N. Martin, "Range encoding: an Algorithm for Removing Redundancy from a Digitised Message", Proc. Video & Data Recording Conf., Southampton, UK, Jul. 24-27, 1979.

Mitchell, et al., "Software Implementations of the Q-coder", IBM J. Res. Develop., vol. 21, No. 6, p. 753-774, Nov. 1988.

A. Moffat, et al., "Arithmetic coding Revisited", ACM Trans. Inform. Syst., vol. 16, No. 3, p. 256-294, Jul. 1998.

Nayebi, et al., "Time Domain Filter Bank Analysis: A New Design Theory", IEEE Trans. Signal Processing, vol. 40, No. 6, p. 1412-1429, Jun. 1992.

T. Q. Nguyen, "A Tutorial on Filter Banks and Wavelets", University of Wisconsin, Madison, WI 53706, USA, (IEEE International Conference on Digital Signal Processing, Cypress, Jun. 1995).

B. A. Olshausen, et al., "Natural Image Statistics and Efficient Coding", Network: Computation in Neural Systems, vol. 7, No. 2, p. 333-339, Jul. 1996.

W. A. Pearlman, "High Performance, low complexity image compression", Applications of Digital Image Processing X, Proc. SPIE 3164, p. 234-246, Jul. 1997.

W. B. Pennebaker, et al., "An Overview of the Basic Principles of the Q-coder Adaptive Binary Arithmetic Coder", IBM J. Res. Develop., vol. 32, No. 6, p. 717-726, Nov. 1988.

A. Said, et al., "An Image Multiresolution Representation for Lossless and Lossy Compression", IEEE Trans. Image Processing, vol. 5, No. 9, p. 1303-1310, Sep. 1996.

A. Said, et al., "A New Fast and Efficient Image Codec Based on Set Partitioning in Hierarchical trees", IEEE Trans. Circuits Syst. Video Tech., vol. 6, No. 3, p. 243-250, Jun. 1996.

D. Santa-Cruz, et al., "JPEG2000 still Image Coding Versus other Standards", Proc. SPIE $45^{th}$ Annual Meeting, Applications of Digital Image Processing XXIII, San Diego, CA, vol. 4115, p. 445-454, Jul. 30-Aug. 4, 2000.

M. Schindler, "A Fast Renormalization for Arithmetic Coding", Poster as DDC, Data Compression Conf., Snowbird, UT, Mar. 30-Apr. 1, 1998.

J. M. Shapiro, "Embedded Image Coding using Zerotrees of Wavelets Coefficients", IEEE Trans. Signal Processing, vol. 41, No. 12, p. 3445-3462, Dec. 1993.

E. P. Simoncelli, et al., Embedded Wavelet Image Compression based on a joint Probability Model, Proc. $4^{th}$ Int. Conf. Image Processing, Santa Barbara, CA, USA, Oct. 26-29, 1997.

E. P. Simoncelli, et al., "Noise Removal via Bayesian Wavelet Coring", Proc. $3^{rd}$ Int. Conf. Image Processing, Lausanne, Switzerland, Vo. 1, p. 379-383, Sep. 1996.

M. J. Smith, et al., "A Procedure for Designing Exact Reconstruction Filter Banks for Tree Structured Subband Coders", Proc. Int. Conf. Acoustics, Speech, Signal Processing (ICASSP), San Diego, CA, p. 27.1.1-27.1.4, Mar. 1984.

M. J. Smith, et al., "Exact Reconstruction Techniques for Tree Structured Subband Coders", IEEE Trans. Acoustics, Speech, Signal Processing, vol. 34, No. 3, p. 434-441, Jun. 1986.

S. D. Stearns, "Arithmetic Coding in Lossless Waveform Compression", IEEE Trans. Signal Processing, vol. 43, No. 8, p. 1874-1879, Aug. 1995.

W. Sweldens, "The Lifting Scheme: A Custom-Design Construction of Biorthogonal Wavelets", Appl. Comput. Harmonic Analysis, vol. 3, No. 2, p. 186-200, 1996, (published before this application Mar. 15, 2005).

W. Sweldens, "The Lifting Scheme: Construction of Second Generation Wavelets", SIAM J. Math. Anal., vol. 29, No. 2, p. 511-546, 1997, (published before this application Mar. 15, 2005).

S. Todd, et al., "Parameter Reduction and Context Selection for Compression of Gray-sclae Images", IBM J. Res. Develop., vol. 29, No. 2, p. 188-193, Mar. 1985.

P.P. Vaidyanathan, "Quadrature Mirror Filter Bank, M-Band Extensions and Perfect Reconstruction Technique", IEEE Acoustics, Speech, Signal Processing Mag., vol. 4, No. 7, p. 1035-1037, Jul. 1987.

P. P. Vaidyanathan,"Theory and Design of M-Channel Maximally Decimated Quadrature Mirror Filters with Arbitrary M, having Perfect Reconstruction Property", IEEE Trans. Acoustics, Speech, Signal Processing, vol. 35, No. 4, p. 476-496, Apr. 1987.

M. Vetterli, "Multi-dimensional Subband Coding: Some Theory and Algorithms", Signal Processing, vol. 6, No. 2, p. 97-112, Apr. 1984.

M. Vetterli, "Filter Banks Allowing Perfect Reconstruction", Signal Processing, vol. 10, No. 3, p. 219-244, Apr. 1986.

M. Vetterli, et al., "Perfect Reconstruction FIR Filter Banks: Some Properties and Factorization", IEEE Trans. Acoustics, Speech, Signal Processing, vol. 37, No. 7, p. 1057-1071, Jul. 1989.

G. K. Wallace, "The JPEG still Picture Compression Standard", IEEE Trans. Consum. Electron., vol. 38, No. 1, p. 18-34, Feb. 1992.

G. K. Wallace, "The JPEG still Picture Compression Standard", Commun. ACM, vol. 34, No. 4, p. 30-44, Apr. 1991.

L. H. Witten, et al., "Arithmetic Coding for Data Compression", Commun. ACM, vol. 30, No. 6, p. 520-540, Jun. 1987.

S. Wong, et al., "Radiologic Image Compression—A review", Proc. IEEE, vol. 83, No. 2, p. 194-219, Feb. 1995.

J. Woods, et al., "Subband Coding of Images", IEEE Trans. Acoustics, Speech, Signal Processing, vol. 34, No. 5, p. 1278-1288, Oct. 1986.

A. Zandi, et al., "CREW lossless/lossy Medical Image Compression", Ricoh California Research Center, Menlo Park, CA 94025, USA, Sep. 12, 1995.

"Digital Compression and Coding of Continuous-Tone still Images", Int. Org. Standardization ISO/IEC, JTC1 Committee Draft, JPEG 8-R8, 1990, (Aug. 1990).

"Range Encoder Homepage", retrieved from the internet at http://www.compressionconsult.com/rangecoder/, retrieved from the internet on Dec. 6, 2005.

R. E. Crochiere, et al., "Digital Coding of Speech in Subbands", Bell Syst. Tech. J., vol. 55, No. 8, p. 1069-1085, Oct. 1976.

E. N. Gilbert, et al., "Variable length Binary Encodings", Bell Syst. Tech. J., vol. 38, No. 4, p. 933-967, Jul. 1959.

N. D. Memon, et al., "Lossless Image Compression: A Comparative Study", Proc. SPIE, vol. 2418, p. 8-20, 1995, (Mar. 1995).

B. M. Oliver, et al., "Efficient Coding", Bell Syst. Tech. J., vol. 31, No. 4, p. 724-750, Jul. 1952.

T. A. Ramstad, "Analysis/Synthesis Filter Banks with Critical Sampling", Proc. Int. Conf. Digital Signaling Processing, Florence, Italy, Sep. 1984.

A. Moffat, et al., "Arithmetic Coding Revisited", Proc. Data Compression Conf., Snowbird, UT, p. 202-211, Mar. 1995.

A. Said, et al., "Image Compression using the Spatial-Orientation Tree", Proc. IEEE Int. Symp. Circuits Systems, Chicago, IL, p. 279-282, May 1993.

* cited by examiner

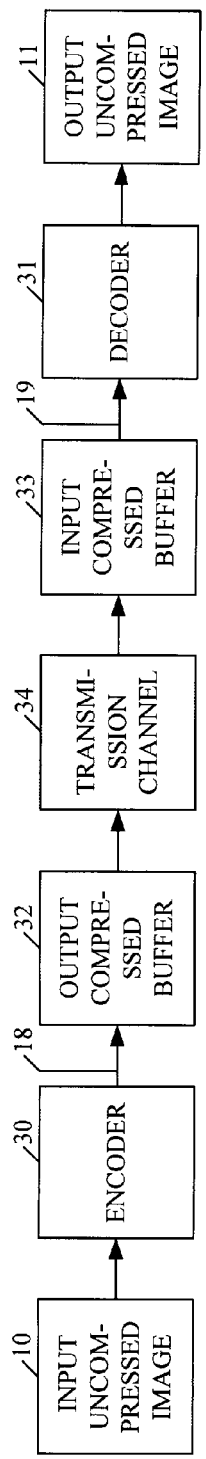
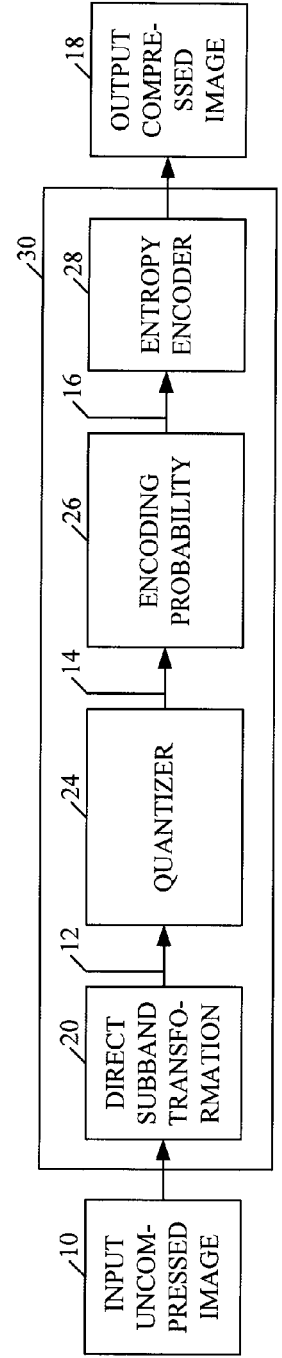
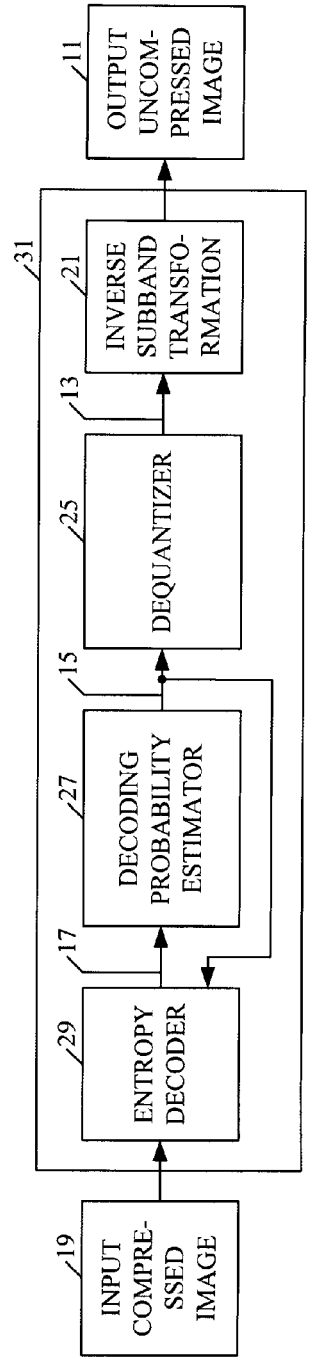
FIG. 1 (PRIOR ART)
FIG. 2 (PRIOR ART)
FIG. 3 (PRIOR ART)

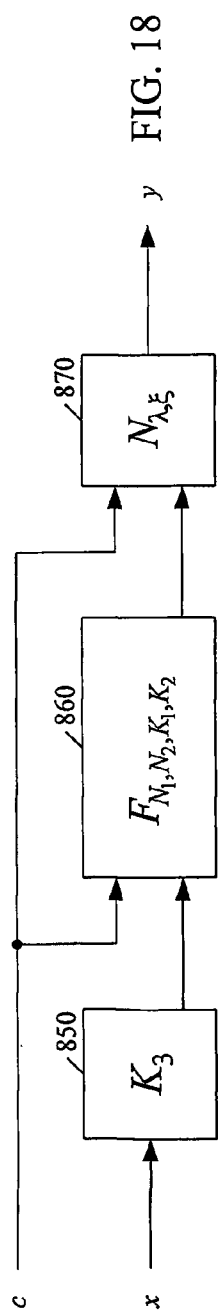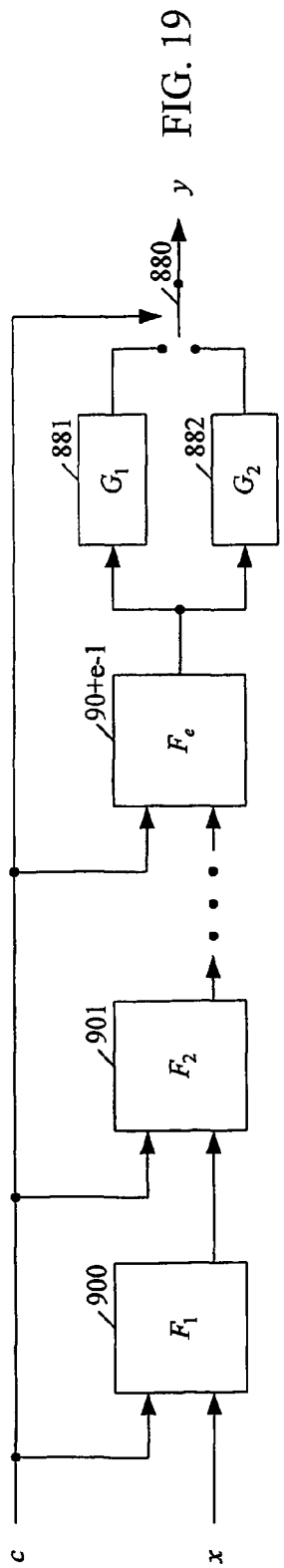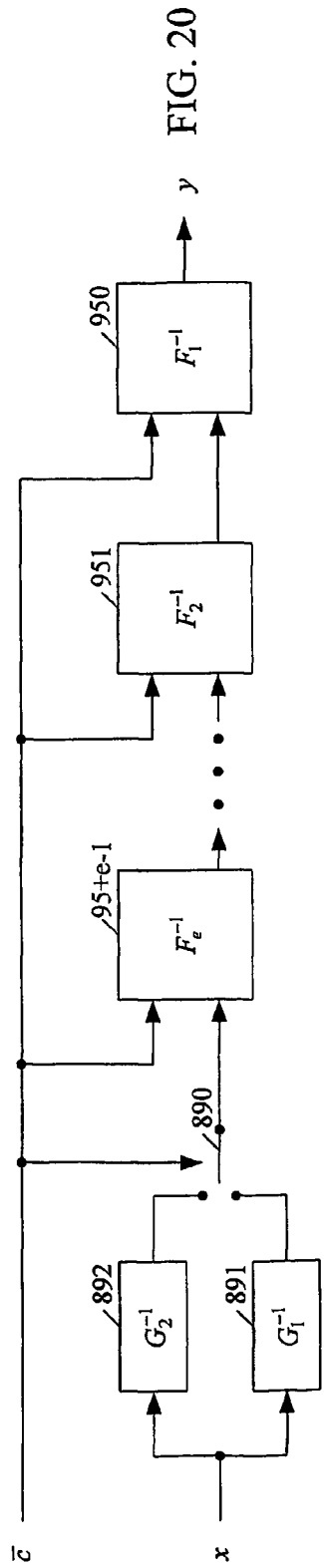

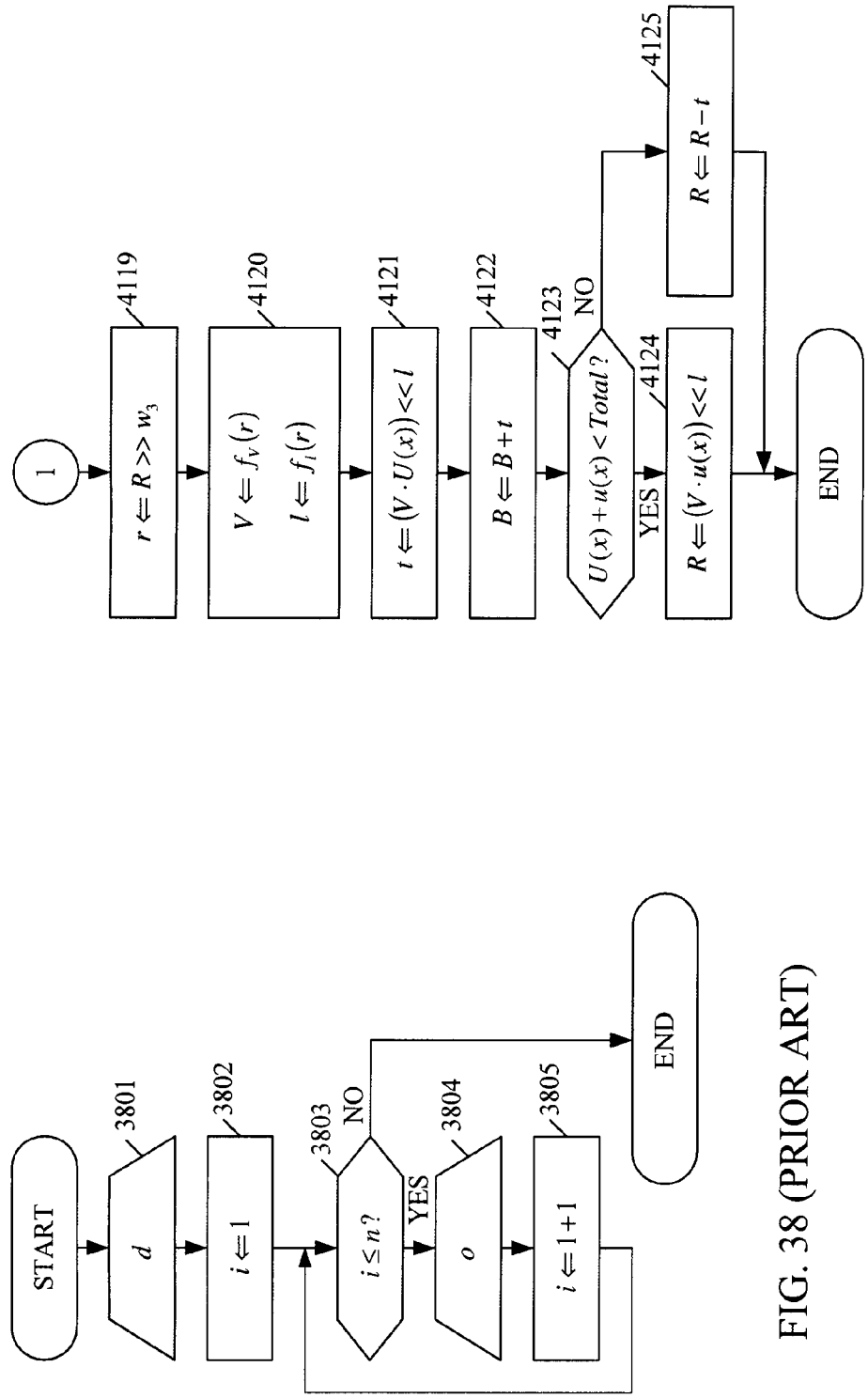

FAST CODEC WITH HIGH COMPRESSION RATIO AND MINIMUM REQUIRED RESOURCES

TECHNICAL FIELD

This invention generally relates to the methods and apparatus for data compression and decompression, and more particularly still and moving image lossless and lossy compression and decompression.

State-of-the-art data compression methods with high compression ratio are time consuming and require complex processors and large memory with high bus bandwidth, which increase consumed power.

The presented technical problem is solved by this invention, which provides order(s) of magnitude faster data compression and decompression, at any compression ratio with the higher or the same perceived and measured decompressed image quality in comparison with the best state-of-the-art compression methods, using order(s) of magnitude less system resources, due to the application of novel direct and inverse non-stationary filters, novel simple context modeling and symbol probability estimation using a minimum number of histograms with the fast adaptation, a novel accelerated range coder without division operations, and a novel synchronization of the compressed data.

BACKGROUND ART

Several tutorials and overviews of still image compression methods are available: O. Egger et al., "High performance compression of visual information—A tutorial review—Part I: Still pictures," Proc. IEEE, Vol. 87, No. 6, pp. 976-1011, June 1999; S. Wong et al., "Radiologic image compression—A review," Proc. IEEE, Vol. 83, No. 2, pp. 194-219, February 1995; N. D. Memon et al., "Lossless image compression: A comparative study," Proc. SPIE, Vol. 2418, pp. 8-20, 1995; and T. Q. Nguyen, "A tutorial on filter banks and wavelets," University of Wisconsin, Madison, Wis. 53706, USA.

A good model of a natural image is based on a power spectrum proportional to $f^{-2}$, with f being the frequency. This means that most of the energy is concentrated in low-frequency regions. Therefore, a suitable partitioning of the frequency should be finer in low-frequency regions and coarser in high-frequency regions.

For most types of images, direct coding using an entropy coder does not achieve satisfactory compression ratio, so some form of prior decomposition is necessary. Decomposition methods used for still image compression are: predictive, block and subband transformations. Predictive methods are suited for lossless and low compression ratio applications. The main drawbacks of block transformation methods, like discrete cosine transform (DCT), are blocking artifacts at high compression ratios, which are especially visible in image regions with low local variance. Unfortunately, human visual system is very sensitive to such type of image distortion. Subband transformation methods are applicable to both lossless and lossy compression, while the only visible artifact at high compression ratios is the Gibbs phenomenon of linear filters, so-called "ringing effect", described in O. Egger et al., "Subband coding of images using asymmetrical filter banks," IEEE Trans. Image Processing, Vol. 4, No. 4, pp. 478-485, April 1995. Due to abundant literature on image compression, the background of this invention is limited to subband transformation.

The subband transformation coefficients are computed by recursively filtering first an input image and then subsequent resulted images with a set of lowpass and highpass filters and down-sampling results. Each subband is separately coded with a bit rate that matches the visual importance of the subband. This leads to visually pleasing image reconstruction and does not produce blocking artifacts. Subband encoding consists of the following four steps: (1) subband decomposition; (2) quantization; (3) probability estimation; and (4) entropy coding of the subbands. The decoding process requires the reversal order of the reversal steps.

The concept of subband transformation was first introduced for speech coding by R. E. Crochiere et al., "Digital coding of speech in subbands," Bell Syst. Tech. J., Vol. 55, No. 8, pp. 1069-1085, October 1976; and U.S. Pat. No. 4,048,443 issued September 1977 to R. E. Crochiere et al. The non-perfect reconstruction filter with a linear phase is two-band QMF, introduced by J. D. Johnston, "A filter family designed for use in quadrature mirror filter banks," Proc. Int. Conf. Acoustics, Speech, Signal Processing (ICASSP), Denver, Colo., pp. 291-294, April 9-11, 1980.

The perfect reconstruction filter banks for one-dimensional (1-D) subband transformations were investigated by several authors, like: M. J. Smith et al., "A procedure for designing exact reconstruction filter banks for tree structured subband coders," Proc. Int. Conf. Acoustics, Speech, Signal Processing (ICASSP), San Diego, Calif., pp. 27.1.1-27.1.4, March 1984; T. A. Ramstad, "Analysis/synthesis filter banks with critical sampling," Proc. Int. Conf. Digital Signal Processing, Florence, Italy, September 1984; M. Vetterli, "Filter banks allowing perfect reconstruction," Signal Processing, Vol. 10, No. 3, pp. 219-244, April 1986; M. J. Smith et al., "Exact reconstruction techniques for tree structured subband coders," IEEE Trans. Acoustics, Speech, Signal Processing, Vol. 34, No. 3, pp. 434-441, June 1986; P. P. Vaidyanathan, "Theory and design of M-channel maximally decimated quadrature mirror filters with arbitrary M, having perfect reconstruction property," IEEE Trans. Acoustics, Speech, Signal Processing, Vol. 35, No. 4, pp. 476-496, April 1987; P. P. Vaidyanathan, "Quadrature mirror filter bank, M-band extensions and perfect reconstruction technique," IEEE Acoustics, Speech, Signal Processing Mag., Vol. 4, No. 7, pp. 1035-1037, July 1987; and M. Vetterli et al., "Perfect reconstruction FIR filter banks: Some properties and factorization," IEEE Trans. Acoustics, Speech, Signal Processing, Vol. 37, No. 7, pp. 1057-1071, July 1989. A design technique leading to numerically perfect reconstruction filter banks has been developed by Nayebi et al., "Time domain filter bank analysis: A new design theory," IEEE Trans. Signal Processing, Vol. 40, No. 6, pp. 1412-1429, June 1992. However, such filters are relatively long and thus unsuitable for image-coding applications.

1-D subband transformation theory was extended to two-dimensional (2-D) case by P. J. Burt et al., "The Laplacian pyramid as a compact image code," IEEE Trans. Commun., Vol. 31, No. 4, pp. 532-540, April 1983; M. Vetterli, "Multi-dimensional subband coding: Some theory and algorithms," Signal Processing, Vol. 6, No. 2, pp. 97-112, April 1984; J. Woods et al., "Subband coding of images," IEEE Trans. Acoustics, Speech, Signal Processing, Vol. 34, No. 5, pp. 1278-1288, October 1986; U.S. Pat. No. 4,817,182 issued March 1989 to E. H. Adelson et al., which utilizes 2-D separable QMF banks; A. Zandi et al., "CREW lossless/lossy medical image compression," Ricoh California Research Center, Menlo Park, Calif. 94025, USA, Sep. 12, 1995; and U.S. Pat. No. 6,195,465 issued February 2001 to A. Zandi et al.

State-of-the-art compression algorithms can be divided into three basic groups: single-pass, two-pass and multi-pass. Single-pass algorithms encode/decode image using single access to each transformation coefficient in the memory, as disclosed in C. Chrysafis et al., "Efficient context-based entropy coding for lossy wavelet image compression," *Data Compression Conf.*, Snowbird, Utah, Mar. 25-27, 1997. These algorithms are usually limited to prior statistical model with fixed parameters, which typically leads to lower compression ratio than achieved by other methods.

Two-pass algorithms encode/decode image using two accesses to each transformation coefficient in the memory. Therefore, they can use prior statistical model with variable parameters, which leads to better compression ratio than in the single-pass case. However, they need to store all transformation coefficients in the memory, in order to perform second pass, which requires additional memory size of the order of an uncompressed input image.

Multi-pass algorithms encode/decode image based on an implicitly defined static model (JPEG2000, SPIHT and EZW). JPEG2000 was described in C. Christopoulos et al. "The JPEG2000 still image coding system: An overview," *IEEE Trans. Consum. Electr.*, Vol. 46, No. 4, pp. 1103-1127, November 2000. Set partitioning in hierarchical trees (SPIHT) algorithm was disclosed in A. Said et al., "Image compression using the spatial-orientation tree," *Proc. IEEE Int. Symp. Circuits Systems*, Chicago, Ill., pp. 279-282, May 1993; A. Said et al., "A new fast and efficient image codec based on set partitioning in hierarchical trees," *IEEE Trans. Circuits Syst. Video Tech.*, Vol. 6, No. 3, pp. 243-250, June 1996; and U.S. Pat. No. 5,764,807 issued June 1998 to W. A. Pearlman et al. Alphabet and group partitioning of transformation coefficients was disclosed in U.S. Pat. No. 5,959,560 issued September 1999 to A. Said et al. Embedded Zerotrees Wavelet (EZW) algorithm was described in J. M. Shapiro, "Embedded image coding using zerotrees of wavelets coefficients," *IEEE Trans. Signal Processing*, Vol. 41, No. 12, pp. 3445-3462, December 1993. EZW technique is based on: (1) partial ordering of the transformation coefficients by magnitude using a set of octavely decreasing thresholds; (2) transmission of order by a subset partitioning algorithm that is duplicated at the decoder; (3) ordered bit plane transmission of refinement bits; and (4) utilization of the self-similarity of the transformation coefficients across different subbands. The Embedded Predictive Wavelet Image Coder (EPWIC), based on the conditional probabiliti model in addition to EZW, was disclosed in R. W. Buccigrossi et al., "Progressive wavelet image coding based on a conditional probability model," *Proc. Int. Conf. Acoustics, Speech, Signal Processing (ICASSP)*, Munich, Germany, Vol. 4, pp. 2597-2600, Apr. 21-24, 1997; and E. P. Simoncelli et al., "Progressive wavelet image compression using linear inter-band magnitude prediction," *Proc. 4thh Int. Conf. Image Processing*, Santa Barbara, Calif., Oct. 26-29, 1997. All these methods store the complete image in the memory and require relatively large number of passes to encode/decode image.

A number of authors have observed that subband transformation coefficients have highly non-Gaussian statistics, according to B. A. Olshausen et al., "Natural image statistics and efficient coding," *Network: Computation in Neural Systems*, Vol. 7, No. 2, pp. 333-339, July 1996; R. W. Buccigrossi et al., "Image compression via joint statistical characterization in the wavelet domain," GRASP Laboratory Technical Report #414, University of Pennsylvania, USA, 30 May 1997; E. P. Simoncelli et al., "Embedded wavelet image compression based on a joint probability model," *Proc. 4th Int. Conf. Image Processing*, Santa Barbara, Calif., USA, Oct. 26-29, 1997; and R. W. Buccigrossi et al., "Image compression via joint statistical characterization in the wavelet domain," *IEEE Trans. Image Processing*, Vol. 8, No. 12, pp. 1688-1701, December 1999.

The reason is a spatial structure of typical images consisting of smooth regions interspersed with sharp edges. The smooth regions produce near-zero transformation coefficients, while the sharp edges produce large-amplitude transformation coefficients. Statistics of transformation coefficients can be modeled by two-parameter "generalized Laplacian" density function, which sharply peaks at zero, with more extensive tails compared to a Gaussian density function, as in S. G. Mallat, "A theory for multiresolution signal decomposition: The wavelet representation," *IEEE Trans. Pattern Analysis Machine Intelligence*, Vol. 11, No. 7, pp. 674-693, July 1989; and E. P. Simoncelli et al., "Noise removal via bayesian wavelet coring," *Proc. 3rd Int. Conf. Image Processing*, Lausanne, Switzerland, Vol. 1, pp. 379-383, September 1996. Unfortunately, two-pass algorithm is necessary for the calculation of density function parameters. Furthermore, experimental results show significant disagreement between this density function and actual histograms at higher levels of subband transformation. The lowpass subband contains almost entirely positive transformation coefficients, appropriate to uniform density function.

Higher compression ratio can be achieved by defining symbols based on the context model, i.e. on the basis of neighborhood transformation coefficients, analogously to text compression methods. An analysis of zero-tree and other wavelet coefficient context models was described in S. Todd et al., "Parameter reduction and context selection for compression of gray-scale images," *IBM J. Res. Develop.*, Vol. 29, No. 2, pp. 188-193, March 1985; V. R. Algazi et al., "Analysis based coding of image transform and subband coefficients," *SPIE Applications of Digital Image Processing XVIII*, Vol. 2564, pp. 11-21, July 1995; S. D. Stearns, "Arithmetic coding in lossless waveform compression," *IEEE Trans. Signal Processing*, Vol. 43, No. 8, pp. 1874-1879, August 1995; and U.S. Pat. No. 6,222,941 issued April 2001 to A. Zandi et al.

It is possible to find a bit code, which is more efficient than the fixed-length code, if the probability of an occurrence of a particular symbol is known. Codeword assignment is usually done by variable-length coding, run-length coding, Huffman coding and arithmetic coding. Techniques for removing alphabetical redundancy mostly generate prefix codes, and mostly transform the messages into a bit string, assigning longer codes to less probable symbols, as in B. M. Oliver et al., "Efficient coding," *Bell Syst. Tech. J.*, Vol. 31, No. 4, pp. 724-750, July 1952; D. A. Huffman, "A method for the construction of minimum-redundancy codes," *Proc. IRE*, Vol. 40, No. 9, pp. 1098-1101, September 1952; and E. N. Gilbert et al., "Variable length binary encodings," *Bell Syst. Tech. J.*, Vol. 38, No. 4, pp. 933-967, July 1959.

The highest compression ratio is achieved by arithmetic coding, which theoretically can remove all redundant information from a digitized message, according to L. H. Witten et al., "Arithmetic coding for data compression," *Commun. ACM*, Vol. 30, No. 6, pp. 520-540, June 1987; A. Moffat et al., "Arithmetic coding revisited," *Proc. Data Compression Conf.*, Snowbird, Utah, pp. 202-211, March 1995; and A. Moffat et al., "Arithmetic coding revisited," *ACM Trans. Inform. Syst.*, Vol. 16, No. 3, pp. 256-294, July 1998.

Arithmetic Q-coder is disclosed in Mitchell et al., "Software implementations of the Q-coder," *IBM J. Res. Develop.*, Vol. 21, No. 6, pp. 753-774, November 1988; W. B. Pennebaker et al., "An overview of the basic principles of the Q-coder adaptive binary arithmetic coder," *IBM J. Res.*

*Develop.*, Vol. 32, No. 6, pp. 717-726, November 1988; and U.S. Pat. Nos.: 4,933,883 issued June 1990; and 4,935,882 issued June 1990 to W. B. Pennebaker et al.

Arithmetic Z-coder is disclosed in L. Bottou et al., "The Z-coder adaptive coder," *Proc. Data Compression Conf.*, Snowbird, Utah, pp. 13-22, March 1998; and U.S. Pat. Nos.: 6,188,334 issued February 2001; 6,225,925 issued May 2001; and 6,281,817 issued August 2001 to Y. Bengio et al.

However, this invention is based on the range coder disclosed in G. N. N. Martin, "Range encoding: an algorithm for removing redundancy from a digitised message," *Proc. Video & Data Recording Conf.*, Southampton, UK, Jul. 24-27, 1979.

Both processing time and memory size of state-of-the-art lossy image compression methods increase with the compression ratio. State-of-the-art microprocessors, signal processors and even microcontrollers have small capacity of fast memory (general-purpose processor registers and internal or external cache memory), and large capacity of several times slower memory (external system memory). This invention fits most or even all necessary temporary data into this fast memory, thus additionally achieving fastest algorithm execution.

The common approach for decreasing the required memory size is to divide the large image into blocks and encode each block independently. All best state-of-the-art still image compression methods (JPEG2000, JPEG, etc.) and moving image compression methods (MPEG-4, MPEG-2, MPEG-1, etc.) are block based, as described in D. Santa-Cruz et al., "JPEG2000 still image coding versus other standards," *Proc. SPIE 45$^{th}$ annual meeting, Applications of Digital Image Processing XXIII*, San Diego, Calif., Vol. 4115, pp. 446-454, Jul. 30-Aug. 4, 2000.

JPEG2000 encoder first divides an input uncompressed image into non-overlapping blocks, then recursively subband transforms each block independently using direct discrete wavelet transform (DWT), according to M. Boliek et al. (editors), "JPEG2000 Part I Final Draft International Standard," (ISO/IEC FDIS15444-1), ISO/IEC JTC1/SC29/WG1 N1855, Aug. 18, 2000. The transformation coefficients are then quantized and entropy coded, before forming the output codestream. The input codestream in decoder is first entropy decoded, dequantized and recursively subband transformed into independent blocks using inverse DWT, in order to produce the reconstructed image. However, tiling produces blocking artifacts at the boundaries between blocks. This drawback can be partially eliminated by framing, i.e. overlapping of the neighborhood blocks for at least one pixel. Another serious drawback is quality degradation at higher compression ratios and limited maximum acceptable compression ratio.

JPEG2000 standard supports two filtering modes: a convolution and a lifting. The signal should be first extended periodically on both ends for half-length of the filter. Convolution-based filtering consists of performing a series of multiplications between the low-pass and high-pass filter coefficients and samples of the extended 1-D signal. Lifting-based filtering consists of a sequence of alternative updating of odd sample values of the signal with a weighted sum of even sample values, and updating of even sample values with a weighted sum of odd sample values, according to W. Sweldens, "The lifting scheme: A custom-design construction of biorthogonal wavelets," *Appl. Comput. Harmonic Analysis*, Vol. 3, No. 2, pp. 186-200, 1996; and W. Sweldens, "The lifting scheme: Construction of second generation wavelets," *SIAM J. Math. Anal.*, Vol. 29, No. 2, pp. 511-546, 1997.

JPEG2000 utilizes MQ arithmetic coder similar to the QM coder adopted in the original JPEG standard described by G. K. Wallace, "The JPEG still picture compression standard," *IEEE Trans. Consum. Electron.*, Vol. 38, No. 1, pp. 18-34, February 1992; U.S. Pat. Nos. 5,059,976 issued October 1991; and 5,307,062 issued April 1994 to F. Ono et al.

JPEG standard was described in "Digital compression and coding of continuous-tone still images," Int. Org. Standardization ISO/IEC, JTC1 Commitee Draft, JPEG 8-R8, 1990; and G. K. Wallace, "The JPEG still picture compression standard," *Commun. ACM*, Vol. 34, No. 4, pp. 30-44, April 1991. The original image is divided into 8×8 blocks, which are separately transformed using DCT. After transformation, the 64 transform coefficients are quantized by different quantization steps in order to account the different importance of each transformation coefficient, using smaller quantization steps for low-frequency coefficients than those for high-frequency coefficients. The transformation coefficients are then coded using either Huffman or arithmetic coding. The independent quantization of blocks causes blocking effect. JPEG lossless compression does not use transform, but a prediction for the removal of a redundant information between neighboring pixels. The prediction error is coded by a Huffman code. The compression ratio is about 2:1 for natural images.

MPEG-4 video compression standard is object based and is developed to compress sequences of images using interframe coding. However, its intraframe coding is a still image compression method, very similar to JPEG. The bounding box of the object to be coded is divided into macroblocks of 16×16 size, containing four blocks of 8×8 pixels for the luminance and two blocks of 8×8 pixels for the down-sampled chrominance. DCT is performed separately on each of the blocks in a macroblock, coefficients are quantized, zigzag scanned, and entropy coded by run-length and Huffman methods.

DISCLOSURE OF THE INVENTION

The first object of this invention is to provide novel single-pass and multi-pass synchronized encoder and decoder, performing order(s) of magnitude faster data compression and decompression, at any compression ratio with the higher or the same perceived and measured decompressed image quality in comparison with the best state-of-the-art compression methods (JPEG2000, JPEG, MPEG-4, MPEG-2, MPEG-1, etc.), using order(s) of magnitude less system resources (processor complexity, memory size, consumed power, bus bandwidth, data latency).

The second object of this invention is to provide novel direct and inverse non-stationary filters for the recursive octave direct and inverse subband transformation (pyramidal decomposition), in order to fulfill the first object of this invention.

The third object of this invention is to provide novel simple context modeling and symbol probability estimation using a minimum number of histograms with fast adaptation for the sign and the magnitude of the transformation coefficients, provided by the second object of this invention, in order to fulfill the first object of this invention.

The fourth object of this invention is to provide novel accelerated range coder without division operations, due to the utilization of the context models and symbol probability estimation provided by the third object of this invention, in order to fulfill the first object of this invention.

The fifth object of this invention is to provide a novel synchronization of the compressed data provided by the fourth object of this invention, in order to fulfill the first object of this invention.

All objects of this invention may be implemented either in hardware or software or their combination. The input uncompressed data can be still or video images, audio, digitized analog data, executable code, text or any digital data.

BRIEF DESCRIPTION OF DRAWINGS

The advantages and features of this invention will be readily apparent to those skilled in the art from the detailed description of the preferred embodiments of this invention in connection with the accompanying drawings in which:

FIG. 1 is a block diagram of state-of-the-art communication system employing compression and decompression.

FIG. 2 is a block diagram of state-of-the-art encoder for the compression.

FIG. 3 is a block diagram of state-of-the-art decoder for the decompression.

FIG. 18 is a block diagram of the general integer-to-integer non-stationary filter cell of this invention, used in all embodiments of the direct and inverse non-stationary filters.

FIG. 19 and FIG. 20 are block diagrams of all embodiments of the direct and inverse non-stationary filter of this invention, respectively.

FIG. 38 is a flowchart of the state-of-the-art flush procedure.

BEST MODE(S) FOR CARRYING OUT THE INVENTION

Figure 4:
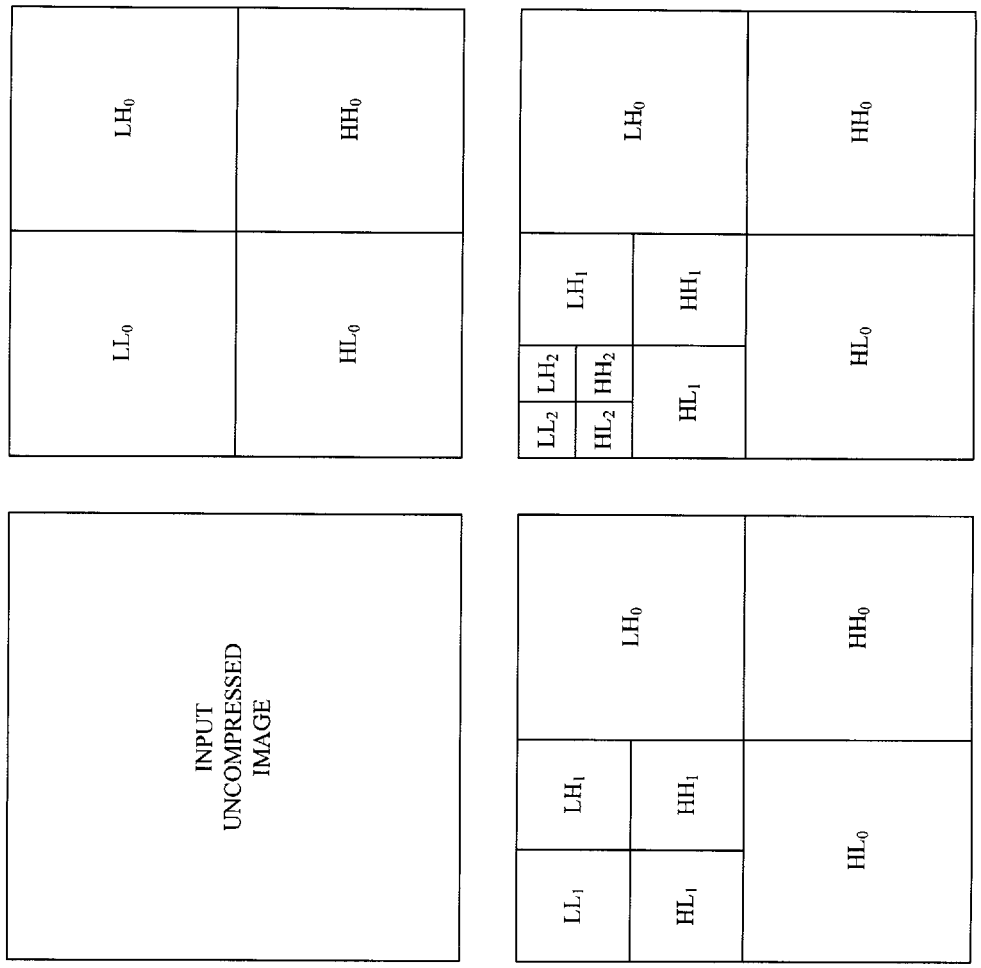
FIG. 4 illustrates results during three levels of direct two-dimensional subband transformation (direct 2DST) of an input uncompressed image, as well as during three levels of inverse 2DST, producing an output uncompressed image.

FIG. 1 is a block diagram of state-of-the-art communication system employing the compression of the input uncompressed image 10 inside the encoder 30, in order to fill the output compressed buffer 32 with the output compressed image 18, which is transmitted through the transmission channel 34, in order to fill the input compressed buffer 33 with the input compressed image 19, which is decompressed inside the decoder 31, in order to produce the output uncompressed image 11. The input uncompressed image 10 is preferably color or gray-scale image in YUV 4:4:4 or 4:2:2 formats. However, any other input image format, like RGB or YCrCb is also applicable using appropriate color space converter for input image format conversion into YUV formats, which is well known to that skilled-in-the-art.

FIG. 2 is a block diagram of the state-of-the-art encoder 30. The input uncompressed image 10 is received by the direct subband transformer 20. The output of the direct subband transformer 20 are transformation coefficients 12, which can be quantized into the quantized transformation coefficients 14 in the quantizer 24, in case of lossy compression, or just passed to the encoding probability estimator 26, in case of lossless compression. The outputs of the encoding probability estimator 26 are symbol probabilities 16 within the specified contexts, which are used by the entropy encoder 28, in order to produce the output compressed image 18.

FIG. 3 is a block diagram of state-of-the-art decoder 31. The input compressed image 19 is received by the entropy decoder 29. The output 15 of the entropy decoder 29 is received by the decoding probability estimator 27, in order to reconstruct the symbol probabilities 17 within the specified contexts, and feed them back into the entropy decoder 29. The output 15 of the entropy decoder 29 is also received by the dequantizer 25, in order to produce dequantized transformation coefficients 13, in case of lossy compression, or just passed to the inverse subband transformer 21, in case of lossless compression. The output of the inverse subband transformer 21 is the output uncompressed image 11.

FIG. 4 illustrates results during three level state-of-the-art direct and inverse two-dimensional subband transformation. The number of levels is usually fixed and is between three and seven in state-of-the-art systems. However, in this invention, the number of subband transformation levels N is variable and depends on the image size, according to the:

$$N = \lceil \log_2(\min(W, H)/K_S) \rceil$$

where W is the image width (number of pixels in each line), H is the image height (number of lines), parameter $K_S$ is preferably 17, and brackets ⌈ ⌉ denote ceil function, i.e. a minimum integer number higher than the floating point number within the brackets.

State-of-the-art single-level 1DST is performed by low-pass filtering input data and downsampling by two, in order to produce the subband L, and high-pass filtering input data and downsampling by two, in order to obtain the subband H.

State-of-the-art multi-level 1DST is performed by applying single-level 1DST onto the input uncompressed data in the level 0, and then subsequently performing single-level 1DST onto the subband $L_i$, produced as a result of previous single-level 1DST. Level 0 subbands are $L_0$ and $H_0$. Level 1 subbands $L_1$ and $H_1$ are produced by applying low-pass and high-pass filters onto the subband $L_0$, respectively. Level 2 subbands $L_2$ and $H_2$ are produced by applying low-pass and high-pass filters onto the subband $L_1$, respectively, etc.

State-of-the-art single-level 2DST is performed by applying 1DST separately, first horizontally along the rows and then vertically along the columns. The results of a single-level 2DST are four subbands: LL, LH, HL and HH.

The subband LL corresponds to the low-pass filtering along the rows and the low-pass filtering along the columns, and contains simultaneously low frequency horizontal information and low frequency vertical information. Most of the typical image energy is concentrated in this subband.

The subband LH corresponds to the low-pass filtering along the rows and the high-pass filtering along the columns, and contains simultaneously low frequency horizontal information and high frequency vertical information, i.e. horizontal edge information.

The subband HL corresponds to the high-pass filtering along the rows and the low-pass filtering along the columns, and contains simultaneously high frequency horizontal information and low frequency vertical information, i.e. vertical edge information.

The subband HH corresponds to the high-pass filtering along the rows and the high-pass filtering along the columns, and contains simultaneously high frequency horizontal information and high frequency vertical information, i.e. diagonal edge information.

State-of-the-art multi-level 2DST is performed by applying single-level 2DST onto the input uncompressed image 10 in the level 0, and then subsequently performing single-level 2DST onto the subband $LL_i$, produced as a result of previous single-level 2DST. Level 0 subbands are $LL_0$, $LH_0$, $HL_0$ and $HH_0$. Level 1 subbands $LL_1$, $LH_1$, $HL_1$ and $HH_1$ are produced by applying 2DST onto the subband $LL_0$. Level 2 subbands $LL_2$, $LH_2$, $HL_2$ and $HH_2$ are produced by applying 2DST onto the subband $LL_1$, etc.

The block diagrams in FIG. 5, FIG. 6, FIG. 7 and FIG. 8 are described in more details in: C. Chrysafis et al., "Line based reduced memory wavelet image compression," *Proc. Data Compression Conf.*, Snowbird, Utah, Mar. 30-Apr. 1, 1998; C. Chrysafis et al., "An algorithm for low memory wavelet image compression," *Proc. IEEE Int. Conf. Image Processing (ICIP)*, Kobe, Japan, 24-28 Oct. 1999; C. Chrysafis et al., "Line based reduced memory wavelet image compression," *IEEE Trans. Image Processing*, Vol. 9, No. 3, pp. 378-389, March 2000; C. Chrysafis, "Wavelet image compression rate distortion optimizations and complexity reductions," *Ph.D. Thesis*, University of Southern California, USA, March 2000; and C. Chrysafis et al., "Minimum memory implementations of the lifting scheme," *SPIE, Int. Symp. Optical Science Tech.*, San Diego, Calif., July 30-Aug. 4, 2000.

C. Chrysafis' papers describe line-based approach, in which an input uncompressed image 10 is read line by line. The order in which subband transformation coefficients are generated by the direct 2DST is almost opposite to the order expected by the inverse 2DST, thus requiring additional synchronization memory between the encoder and the decoder. The total synchronization memory size is usually equally split between the encoder and the decoder. However, it is possible to assign the complete synchronization memory to encoder only or to decoder only, depending on the particular application. Further description will be devoted only to the symmetrical synchronization memory of equal size in the encoder and the decoder.

C. Chrysafis first considered the memory size for 1DST based on the convolution filtering with the finite impulse response (FIR) filter with odd filter length $L = 2 \cdot D + 1$ and symmetric extension of the input uncompressed data at the boundaries. The samples are received serially with period $T_p$. After delay of $D \cdot T_p$, the total of $L = D + 1 + D$ samples were received due to the extension, so the filter starts generation of high-pass subband $H_0$ coefficients with $2 \cdot T_p$ period, as well as the generation of low-pass subband $L_0$ coefficients with $2 \cdot T_p$ period, due to the downsampling by two.

Unfortunately, linear phase FIR filters are computationally expensive in terms of both required processing time and memory. These drawbacks are eliminated by the computationally efficient direct and inverse non-stationary filters of this invention, which will be described further. The memory needed for filtering depends on D and a size of the internal variable used for the storing operation according to TABLE 1.

TABLE 1

| Filtering method | Filtering memory size F per 1DST level [internal variable] | Total filtering memory size for N 1DST levels [internal variable] |
| --- | --- | --- |
| Convolution | $2 \cdot D + 1$ | $(2 \cdot D + 1) \cdot N$ |
| Chrysafis' lifting | $D + 2$ | $(D + 2) \cdot N$ |
| Lifting | $D + 1$ | $(D + 1) \cdot N$ |
| Non-stationary filters of this invention | $D$ | $D \cdot N$ |

Figure 5:
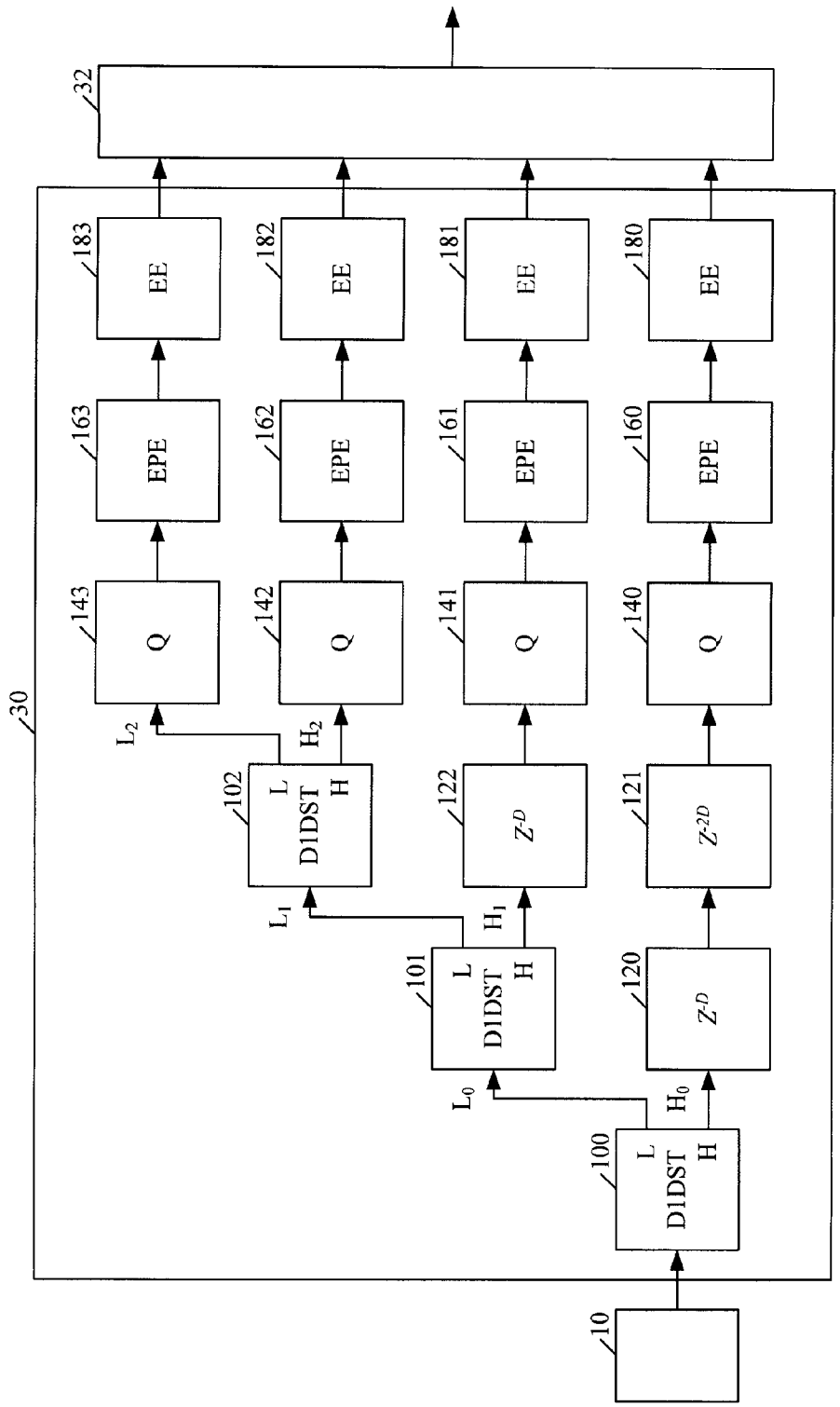
FIG. 5 and FIG. 6 are block diagrams of state-of-the-art low-memory encoder and the decoder, respectively, with three levels of one-dimensional subband transformation (1DST).
Figure 6:
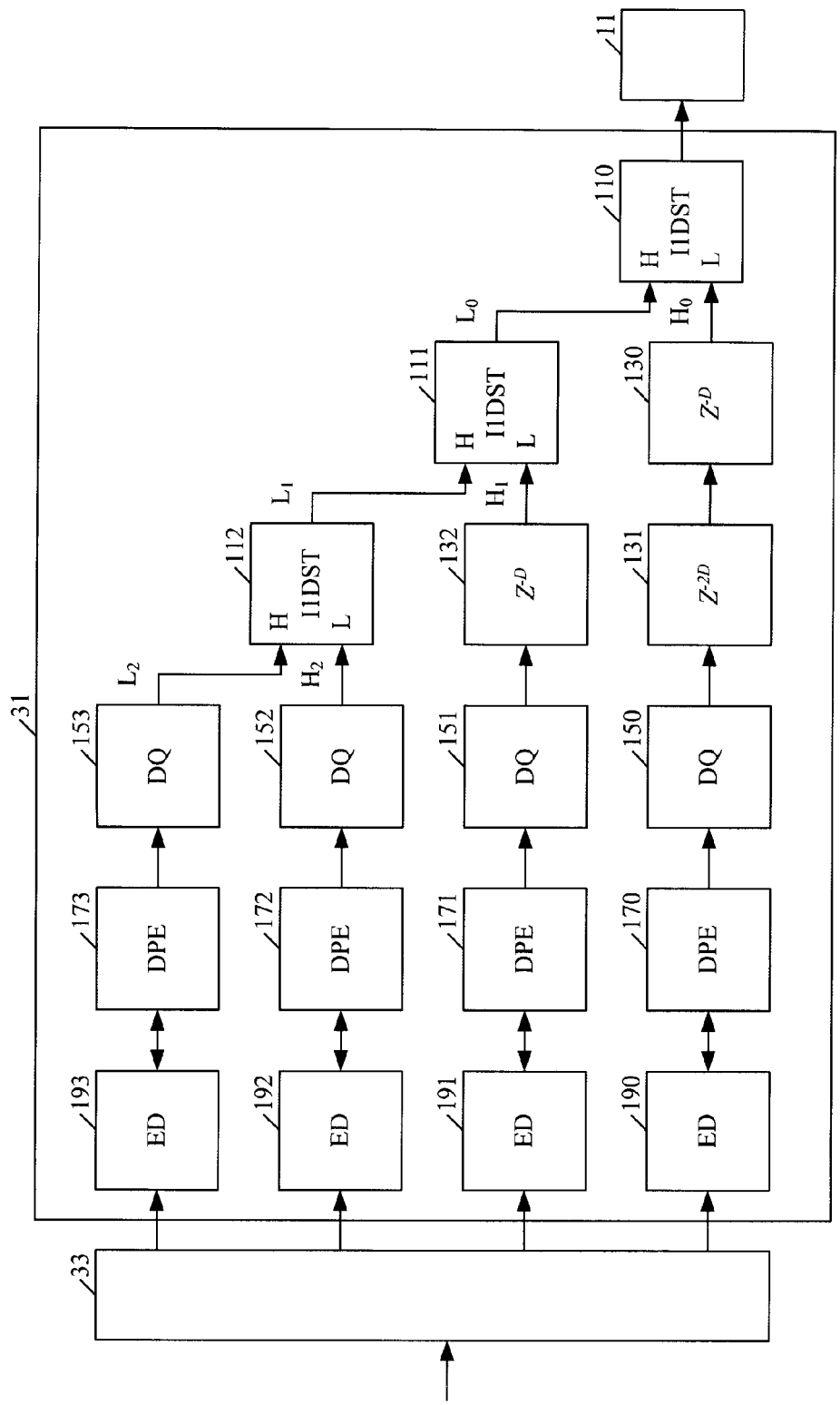

FIG. 5 and FIG. 6 are block diagrams of state-of-the-art low-memory encoder 30 and the decoder 31 with N=3 levels of direct 1DST (D1DST) and inverse 1DST (I1DST), respectively. The period between receipts of successive samples of the input uncompressed data is $T_p$. The delay in the level 0 D1DST 100 is $D \cdot T_p$. The period between the generations of successive transformation coefficients in each of subbands $L_0$ and $H_0$ is $2 \cdot T_p$.

The delay in the level 1 D1DST 101 is $2 \cdot D \cdot T_p$. This delay is compensated by the synchronization memory $z^{-D}$ 120 of size D for the subband $H_0$, due to the period $2 \cdot T_p$ between the generations of successive transformation coefficients. The period between the generations of successive transformation coefficients in each of subbands $L_1$ and $H_1$ is $4 \cdot T_p$.

The delay in the level 2 D1DST 102 is $4 \cdot D \cdot T_p$. This delay is compensated by the synchronization memory $z^{-2 \cdot D}$ 121 of size $2 \cdot D$ for the subband $H_0$, due to the period $2 \cdot T_p$ between the generation of successive transformation coefficients, as well as the synchronization memory $z^{-D}$ 122 of size D for the subband $H_1$, due to the period $4 \cdot T_p$ between the generations of successive transformation coefficients. The period between the generations of successive transformation coefficients in each of subbands $L_2$ and $H_2$ is $8 \cdot T_p$.

Thanks to the compensation of delays, all transformation coefficients become available at the same time for the quantization in quantizers 140-143, encoding probability estimation in encoding probability estimators 160-163 and entropy encoding in entropy encoders 180-183. However, in the actual implementation, quantization can be performed before the storage in the synchronization memories 120-122, in order to decrease the necessary total synchronization memory size, especially if 32-bit floating point transformation coefficients are the result of irreversible DWT using 9-tap/7-tap (9/7) filter, disclosed in M. Antonini et al., "Image coding using the wavelet transform," *IEEE Trans. Image Proc.*, Vol. 1, No. 2, pp. 205-220, April 1992, and applied in JPEG2000 standard.

The symmetrical situation is valid for the decoder 31, requiring their own synchronization memories 130-132. The synchronization memory sizes for the encoder 30 or the decoder 31 with N=3 1DST levels are-given in TABLE 2.

TABLE 2

| 1DST level | Input data period | 1DST level delay | Output data period | 1DST level 1 synchronization memory size | 1DST level 2 synchronization memory size | Total synchronization memory size |
|---|---|---|---|---|---|---|
| 0 | $T_P$ | $D \cdot T_P$ | $2 \cdot T_P$ | D | $2 \cdot D$ | $D + 2 \cdot D = 3 \cdot D$ |
| 1 | $2 \cdot T_P$ | $2 \cdot D \cdot T_P$ | $4 \cdot T_P$ | — | D | D |
| 2 | $4 \cdot T_P$ | $4 \cdot D \cdot T_P$ | $8 \cdot T_P$ | — | — | 0 |
| All | — | — | — | — | — | $3 \cdot D + D = 4 \cdot D$ |

The synchronization memory sizes in transformation coefficient units, for the encoder 30 or the decoder 31 within the communication system utilizing N 1DST levels are given in TABLE 3. As the number N of 1DST levels increases, the synchronization memory size for all 1DST levels increases much faster than the filtering memory size.

Figure 7:
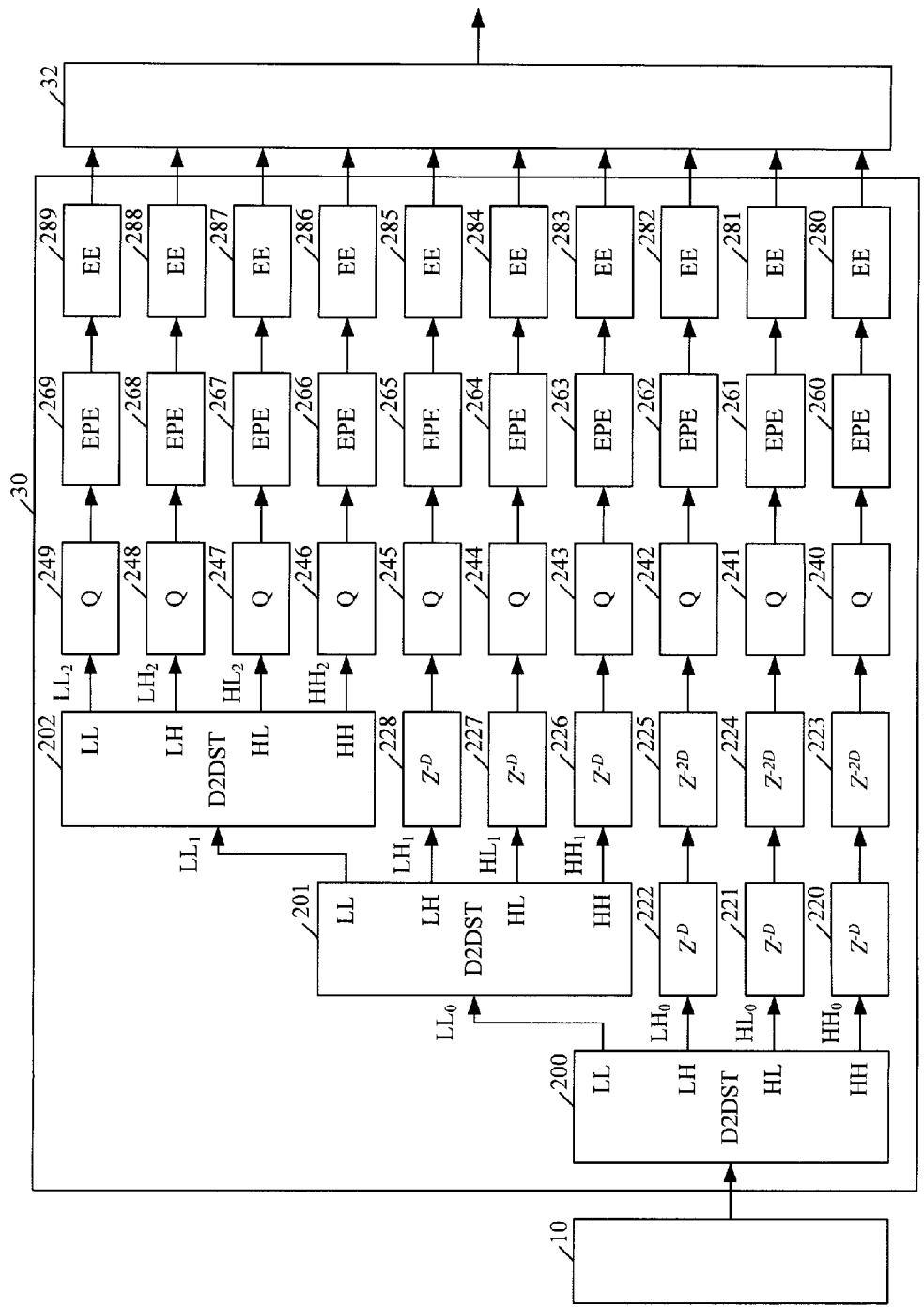
FIG. 7 and FIG. 8 are block diagrams of state-of-the-art low-memory encoder and the decoder, respectively, with three levels of 2DST.
Figure 8:
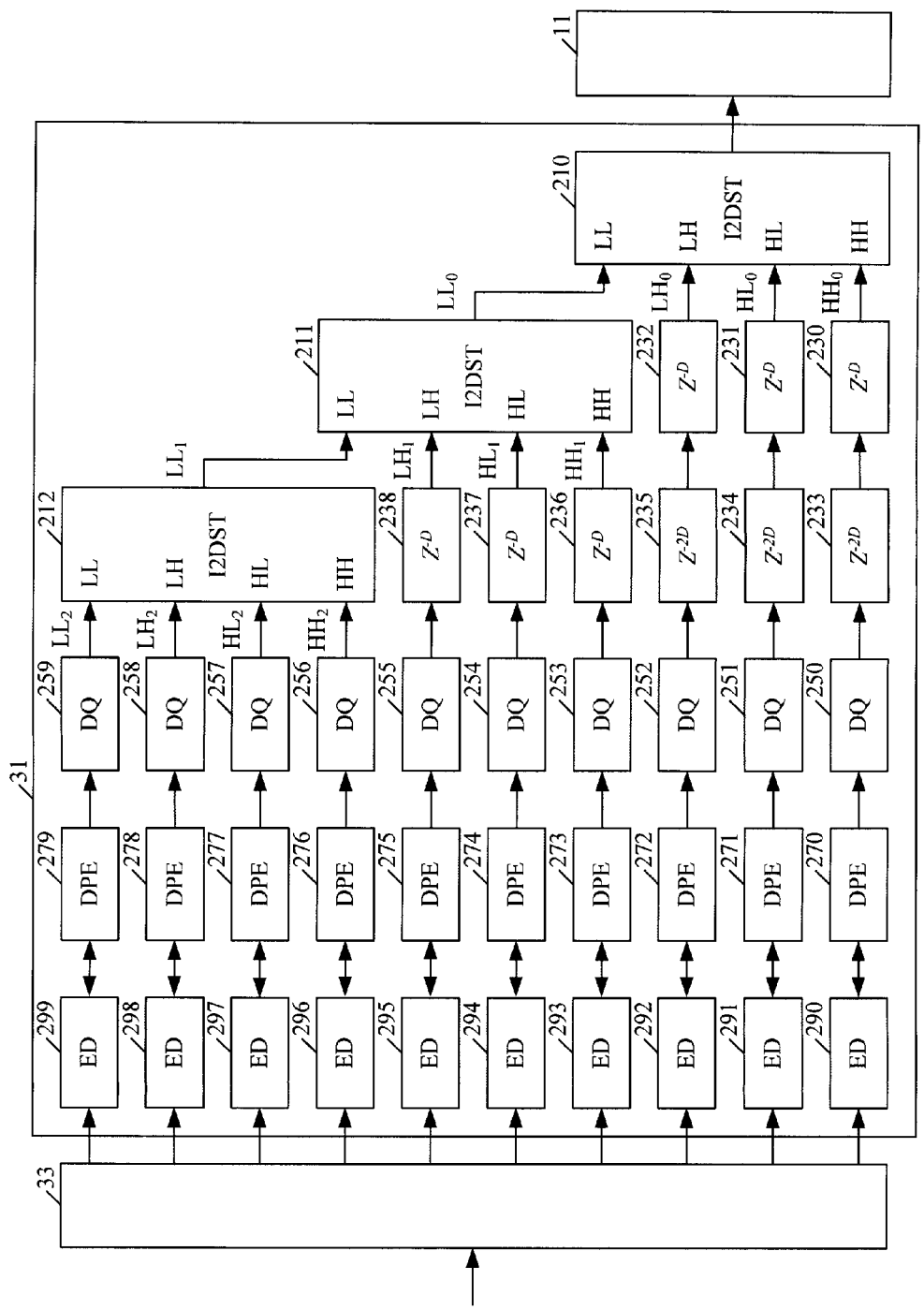

FIG. 7 and FIG. 8 are block diagrams of state-of-the-art low-memory encoder 30 and the decoder 31, with N=3 levels of direct 2DST (D2DST) and inverse 2DST (I2DST), respectively. After the level 0 1DST horizontal filtering is finished, the complete lines of transformation coefficients are stored in the memory, requiring memory size W for each line, where W is the number of pixels within each line, i.e. the width of the image. The width of the subband image is reduced by two with each increment of 2DST level. Therefore, each subband $LL_{i+1}$ at 2DST level i+1 requires memory for half of the lines of the previous subband $LL_i$ at 2DST level i, according to TABLE 4.

TABLE 3

| 1DST level | Synchronization memory size per 1DST level [coefficient] |
|---|---|
| 0 | $D + 2 \cdot D + 2^2 \cdot D + \ldots + 2^{N-2} \cdot D = \sum_{k=0}^{N-2} 2^k \cdot D = (2^{N-1} - 1) \cdot D$ |
| 1 | $D + 2 \cdot D + 2^2 \cdot D + \ldots + 2^{N-3} \cdot D = \sum_{k=0}^{N-3} 2^k \cdot D = (2^{N-2} - 1) \cdot D$ |
| 2 | $D + 2 \cdot D + 2^2 \cdot D + \ldots + 2^{N-4} \cdot D = \sum_{k=0}^{N-4} 2^k \cdot D = (2^{N-3} - 1) \cdot D$ |
| n | $D + 2 \cdot D + 2^2 \cdot D + \ldots + 2^{N-n-2} \cdot D = \sum_{k=0}^{N-n-2} 2^k \cdot D = (2^{N-n-1} - 1) \cdot D$ |
| N-3 | $D + 2 \cdot D = 3 \cdot D$ |
| N-2 | D |
| All levels | $\sum_{n=0}^{N-2} (2^{N-n-1} - 1) \cdot D = (2^N - N - 1) \cdot D$ |

The period between receipts of successive lines of the input uncompressed image 10 is $T_L$. The delay in the level 0 D2DST 200 is $D \cdot T_L$. The period between the generations of successive lines in the subband $LL_0$ is $2 \cdot T_L$ and the width of each line is W/2. The delay in the level 1 D2DST 201 is $2 \cdot D \cdot T_L$. This delay is compensated by the synchronization memories $z^{-D}$ 220-222 of size $D \cdot W/2$ for each of the subbands $LH_0$, $HL_0$ and $HH_0$, due to the period $2 \cdot T_L$ between the generations of successive lines and the width W/2 of each line. The period between the generations of successive lines in each of subbands $LL_1$, $LH_1$, $HL_1$ and $HH_1$ is $4 \cdot T_L$ and the width of each line is W/4.

The delay in the level 2 D2DST 202 is $4 \cdot D \cdot T_L$. This delay is compensated by the synchronization memories $z^{-2 \cdot D}$ 223-225 of size $2 \cdot D \cdot W/2$ for each of the subbands $LH_0$, $HL_0$ and $HH_0$, due to the period $2 \cdot T_L$ between the generations of successive lines and the width W/2 of each line, as well as the synchronization memories $z^{-D}$ 226-228 of size $D \cdot W/4$ for each of the subbands $LH_1$, $HL_1$ and $HH_1$, due to the period $4 \cdot T_L$ between the generations of successive lines and the width W/4 of each line. The period between the generations of successive lines in each of subbands $LL_2$, $LH_2$, $HL_2$ and $HH_2$ is $8 \cdot T_L$.

TABLE 4

| 2DST level | Filtering memory size per 2DST level [internal variables] |
|---|---|
| 0 | $F \cdot W$ |
| 1 | $\dfrac{F \cdot W}{2}$ |

TABLE 4-continued

| 2DST level | Filtering memory size per 2DST level [internal variables] |
|---|---|
| 2 | $\dfrac{F \cdot W}{4}$ |
| n | $\dfrac{F \cdot W}{2^n}$ |
| N − 1 | $\dfrac{F \cdot W}{2^{N-1}}$ |
| All levels | $\sum_{n=0}^{N-1} \dfrac{F \cdot W}{2^n} = 2 \cdot F \cdot W \cdot \left(1 - \dfrac{1}{2^N}\right) < 2 \cdot F \cdot W$ |

Thanks to the compensation of delays, all transformation coefficients become available at the same time for the quantization in quantizers 240-249, encoding probability estimation in encoding probability estimators 260-269 and entropy encoding in entropy encoders 280-289. However, in the actual implementation, quantization can be performed before storage in the synchronization memories 220-228, in order to decrease the necessary total synchronization memory size.

The symmetrical situation is valid for the decoder 31, requiring their own synchronization memories 230-238. The synchronization memory sizes in coefficient units, for the encoder 30 or the decoder 31 with N=3 2DST levels is given in TABLE 5.

The synchronization memory sizes in transformation coefficient units, for the encoder 30 or the decoder 31 with N 2DST levels is given in TABLE 6. It should be noticed that the last two results from TABLE 6 are correct, in comparison with erroneous equation (5.1) at page 76 (page 90 in PDF file) of C. Chrysafis' Ph.D. Thesis. The total synchronization memory size is derived by multiplying the last result from TABLE 6, with the number of bytes in a single transformation coefficient, or more exactly the number of bytes in a single quantized transformation coefficient, if quantization is performed before buffering of transformation coefficients.

TABLE 5

| 2DST level | Input line period | 2DST level delay | Output line period | 2DST level 1 synchronization memory size | 2DST level 2 synchronization memory size | Total synchronization memory size |
|---|---|---|---|---|---|---|
| 0 | $T_L$ | $D \cdot T_L$ | $2 \cdot T_L$ | $D \cdot W/2$ | $2 \cdot D \cdot W/2$ | $3 \cdot D \cdot W/2$ |
| 1 | $2 \cdot T_L$ | $2 \cdot D \cdot T_L$ | $4 \cdot T_L$ | — | $D \cdot W/4$ | $D \cdot W/4$ |
| 2 | $4 \cdot T_L$ | $4 \cdot D \cdot T_L$ | $8 \cdot T_L$ | — | — | 0 |
| All | — | — | — | — | — | $7 \cdot D \cdot W/4$ |

Figure 9:
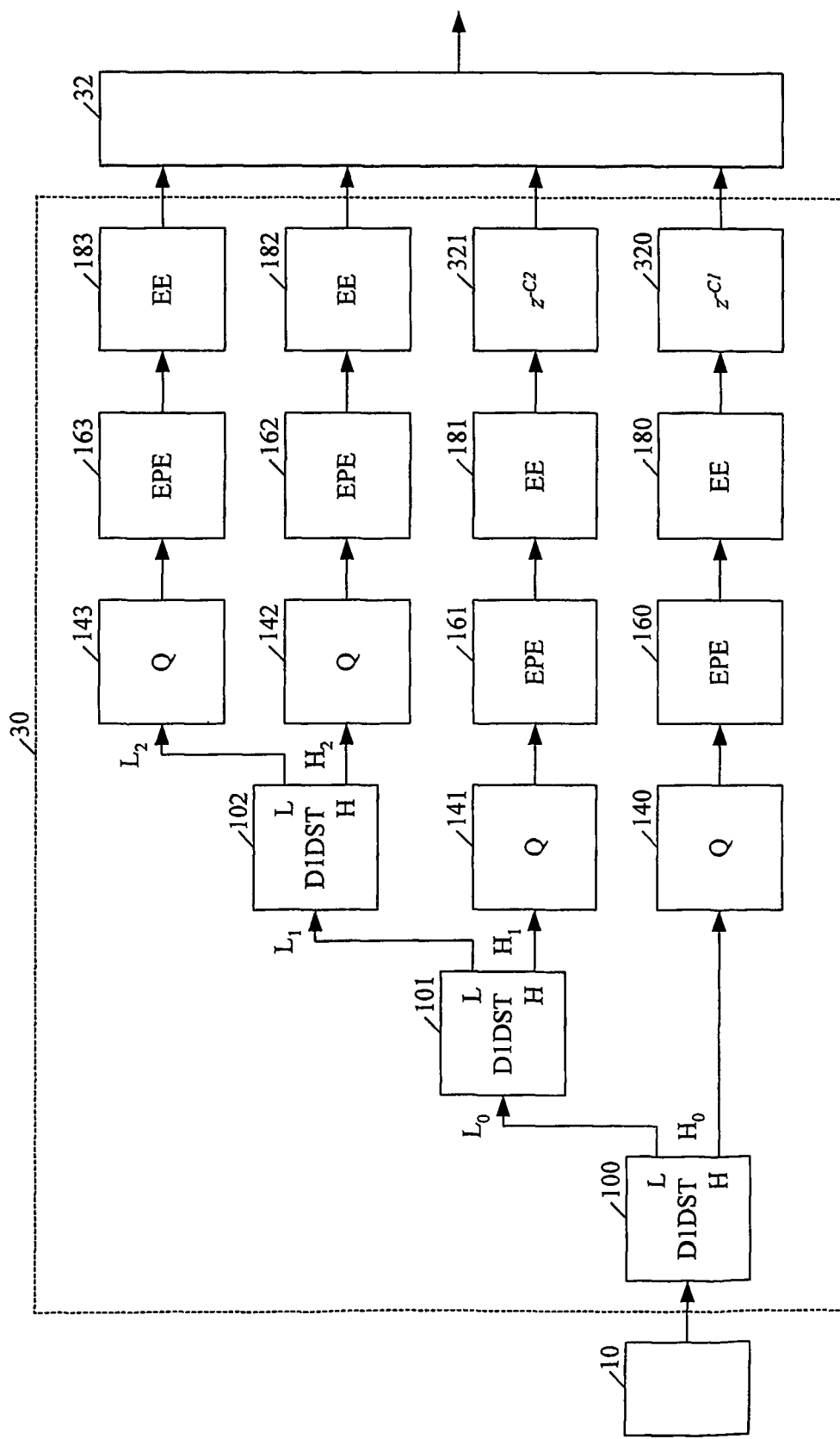
FIG. 9 and FIG. 10 are block diagrams of the first embodiment of the encoder and the decoder of this invention, respectively, with three levels of 1DST.
Figure 10:
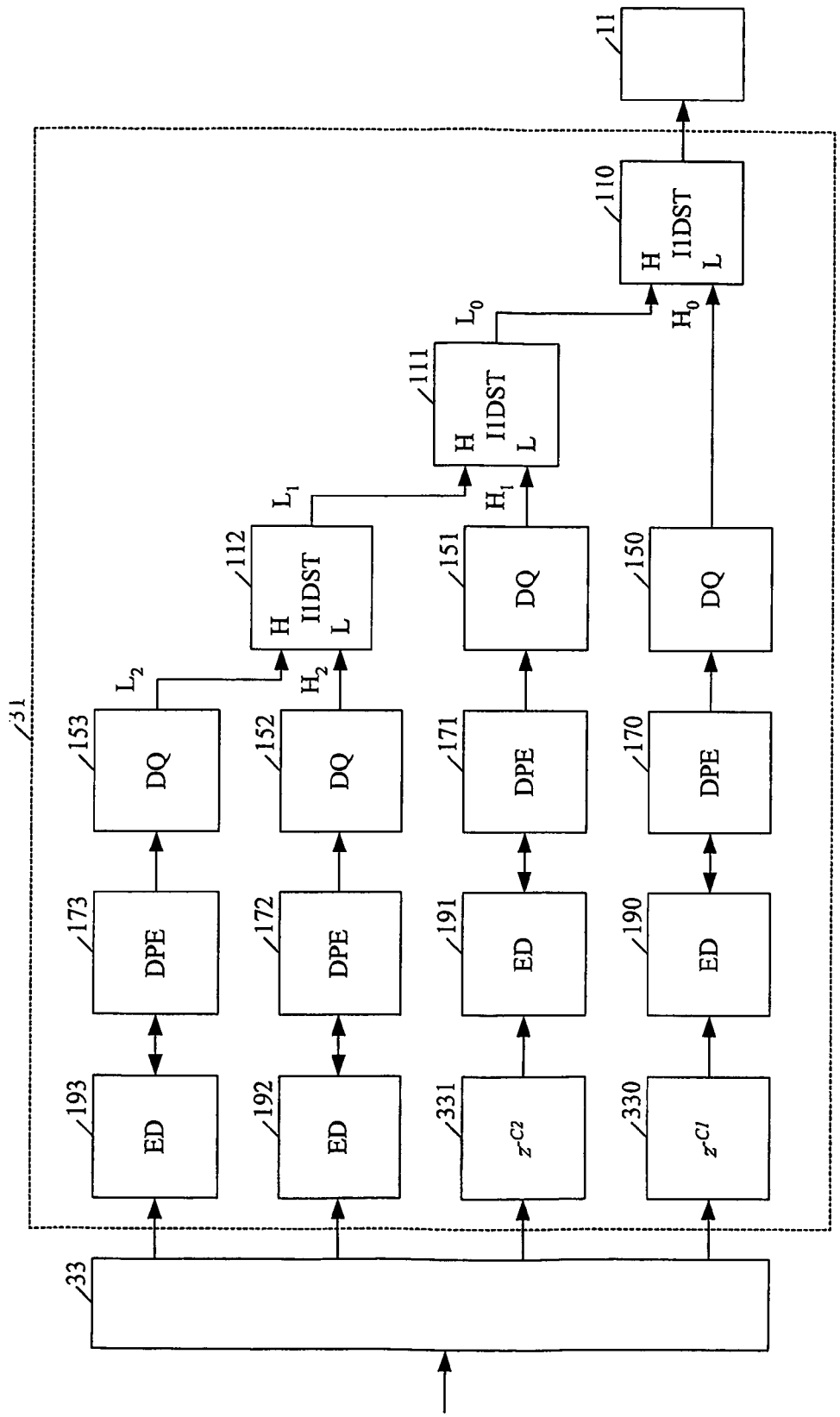

FIG. 9 and FIG. 10 are block diagrams of the first embodiment of the encoder 30 and the decoder 31 of this invention, with N=3 levels of D1DST and I1DST, respectively.

TABLE 6

| 2DST level | Total synchronization memory size per subband [coefficient] Synchronization memory size for 3 subbands (LH, HL and HH) is 3 times higher |
|---|---|
| 0 | $(D + 2 \cdot D + 2^2 \cdot D + \ldots + 2^{N-2} \cdot D) \cdot \dfrac{W}{2} = \dfrac{W}{2} \cdot \sum_{k=0}^{N-2} 2^k \cdot D = (2^{N-1} - 1) \cdot D \cdot \dfrac{W}{2}$ |
| 1 | $(D + 2 \cdot D + 2^2 \cdot D + \ldots + 2^{N-3} \cdot D) \cdot \dfrac{W}{4} = \dfrac{W}{4} \cdot \sum_{k=0}^{N-3} 2^k \cdot D = (2^{N-2} - 1) \cdot D \cdot \dfrac{W}{4}$ |
| 2 | $(D + 2 \cdot D + 2^2 \cdot D + \ldots + 2^{N-4} \cdot D) \cdot \dfrac{W}{8} = \dfrac{W}{8} \cdot \sum_{k=0}^{N-4} 2^k \cdot D = (2^{N-3} - 1) \cdot D \cdot \dfrac{W}{8}$ |
| n | $(D + 2 \cdot D + 2^2 \cdot D + \ldots + 2^{N-m-2} \cdot D) \cdot \dfrac{W}{2^{n+1}} = \dfrac{W}{2^{n+1}} \cdot \sum_{k=0}^{N-n-2} 2^k \cdot D = (2^{N-n-1} - 1) \cdot D \cdot \dfrac{W}{2^{n+1}}$ |
| N-3 | $(D + 2 \cdot D) \cdot \dfrac{W}{2^{N-2}} = 3 \cdot D \cdot \dfrac{W}{2^{N-2}}$ |
| N-2 | $D \cdot \dfrac{W}{2^{N-1}}$ |
| All levels | $\sum_{n=0}^{N-2} (2^{N-n-1} - 1) \cdot D \cdot \dfrac{W}{2^{n+1}} = \dfrac{1}{3} \cdot \left(2^N - 3 + \dfrac{1}{2^{N-1}}\right) \cdot D \cdot W$ |
| All levels and all subbands | $3 \cdot \sum_{n=0}^{N-2} (2^{N-n-1} - 1) \cdot D \cdot \dfrac{W}{2^{n+1}} = \left(2^N - 3 + \dfrac{1}{2^{N-1}}\right) \cdot D \cdot W$ |

Instead of buffering the transformation coefficients in the synchronization memory of the encoder 30, input uncompressed data are direct subband transformed in D1DSTs 100-102, using direct non-stationary filters, transformation coefficients are quantized in quantizers 140-143, the probabilities of transformation coefficients within the specified contexts are estimated in the encoding probability estimators 160-163, the quantized transformation coefficients are entropy encoded in the entropy encoders 180-183 and finally in theirs compressed form pass through the synchronization memories 320-321, in order to produce the output compressed data, which are temporarily stored into the output compressed buffer 32, from which they will be transmitted.

Instead of buffering the transformation coefficients in the synchronization memory of the decoder 31, input compressed data, received from the input compressed buffer 33, pass through the synchronization memories 330-331, then are decoded in the entropy decoders 190-193, with the help of the decoding probability estimators 170-173, after that the quantized transformation coefficients are dequantized in the dequantizers 150-153, and finally inverse subband transformed in I1DSTs 110-112, using inverse non-stationary filters, and stored in theirs uncompressed form in the output uncompressed data memory.

Figure 11:
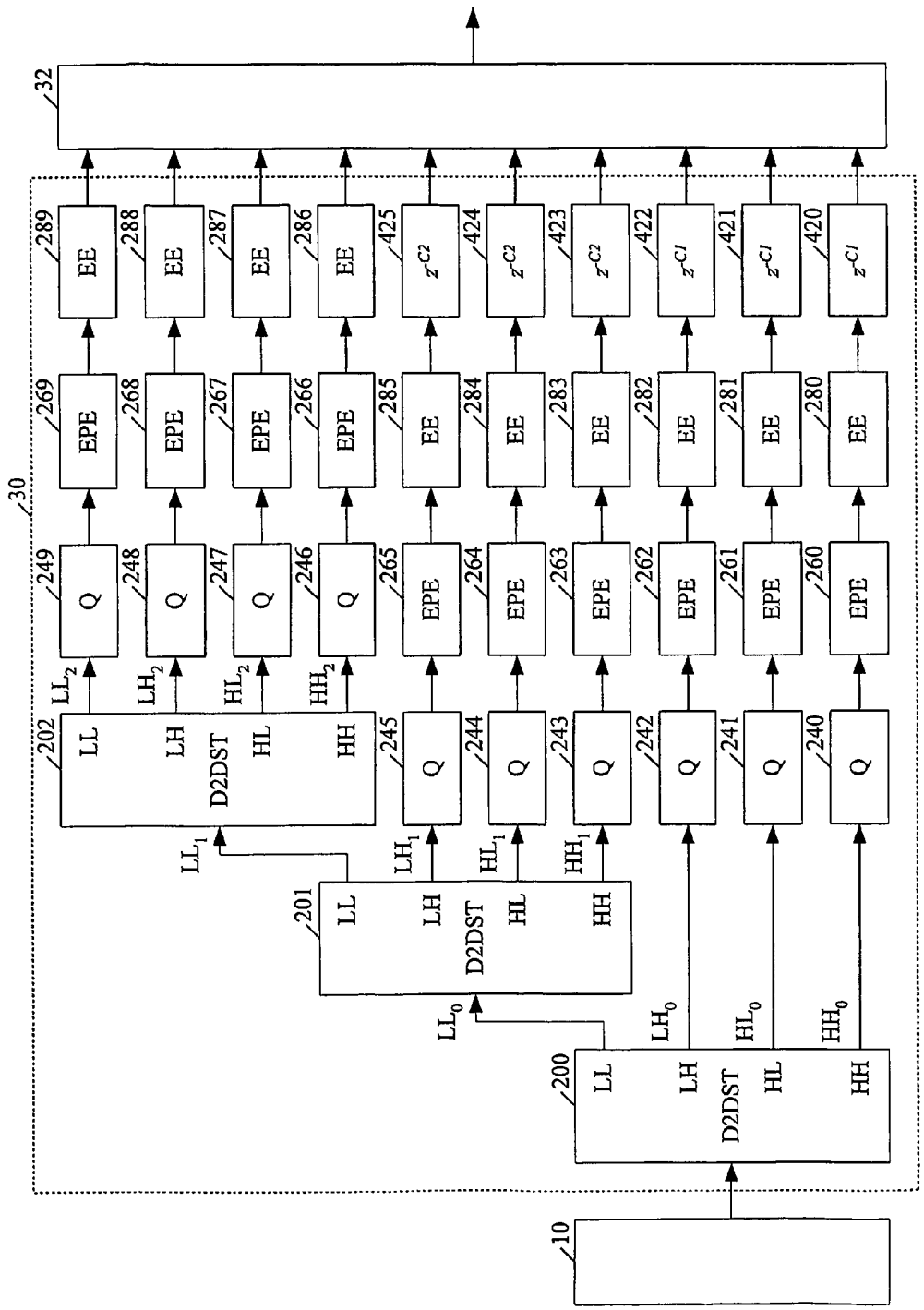
FIG. 11 and FIG. 12 are block diagrams of the first embodiment of the encoder and the decoder of this invention, respectively, with three levels of 2DST.
Figure 12:
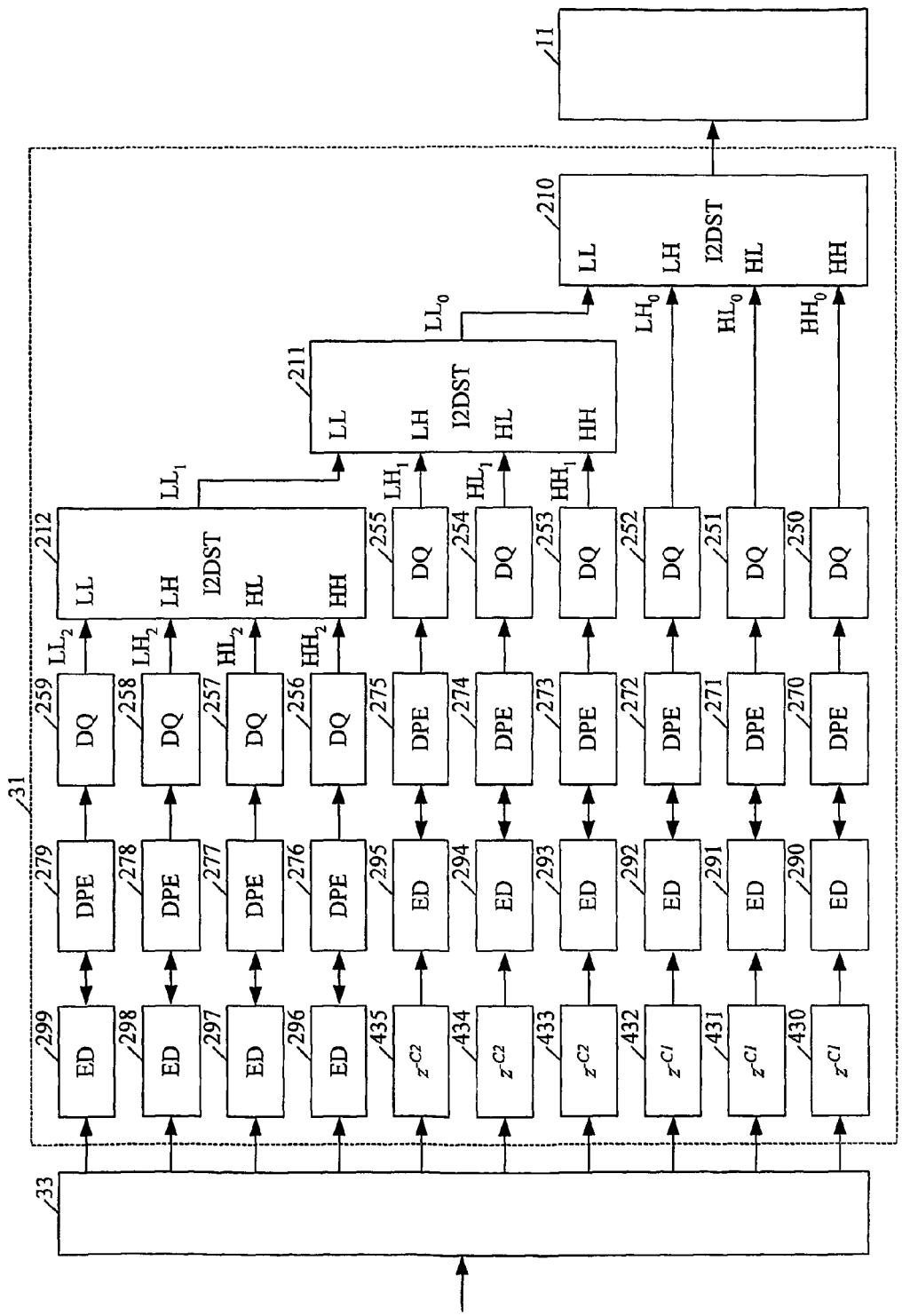

FIG. 11 and FIG. 12 are block diagrams of the first embodiment of the encoder 30 and the decoder 31 of this invention, with N=3 levels of D2DST and I2DST, respectively.

Instead of buffering the transformation coefficients in the synchronization memory of the encoder 30, input uncompressed image 10 is direct subband transformed in D2DSTs 200-202, using direct non-stationary filters, transformation coefficients are quantized in quantizers 240-249, the probabilities of transformation coefficients within the specified contexts are estimated in the encoding probability estimators 260-269, the quantized transformation coefficients are entropy encoded in the entropy encoders 280-289 and finally in theirs compressed form pass through the synchronization memories 420-425, in order to produce the output compressed image 18, which is temporarily stored into the output compressed buffer 32, from which it will be transmitted.

Instead of buffering the transformation coefficients in the synchronization memory of the decoder 31, the input compressed image 19, received from the input compressed buffer 33, passes through the synchronization memories 430-435, then is decoded in the entropy decoders 290-299, with the help of the decoding probability estimators 270-279, after that the quantized transformation coefficients are dequantized in the dequantizers 250-259, and finally inverse subband transformed in I2DSTs 210-212, using inverse non-stationary filters, and stored in theirs uncompressed form in the output uncompressed image 11 memory.

Therefore, the first embodiment of this invention requires order of magnitude less memory size, proportional to the compression ratio CR, in comparison with the results given in TABLE 3 in page 92 (page 106 of PDF file) of C. Chrysafis' Ph.D. Thesis, and several orders of magnitude less memory size in comparison with best state-of-the-art communication systems employing compression (JPEG2000, JPEG, MPEG-4, MPEG-2 and MPEG-1). Furthermore, the column filtering is performed as soon as the sufficient number of lines has been horizontally filtered (TABLE 1). For example, the first embodiment of the direct non-stationary filter of this invention requires only D=2 horizontal lines in order to start column filtering.

Figure 13:
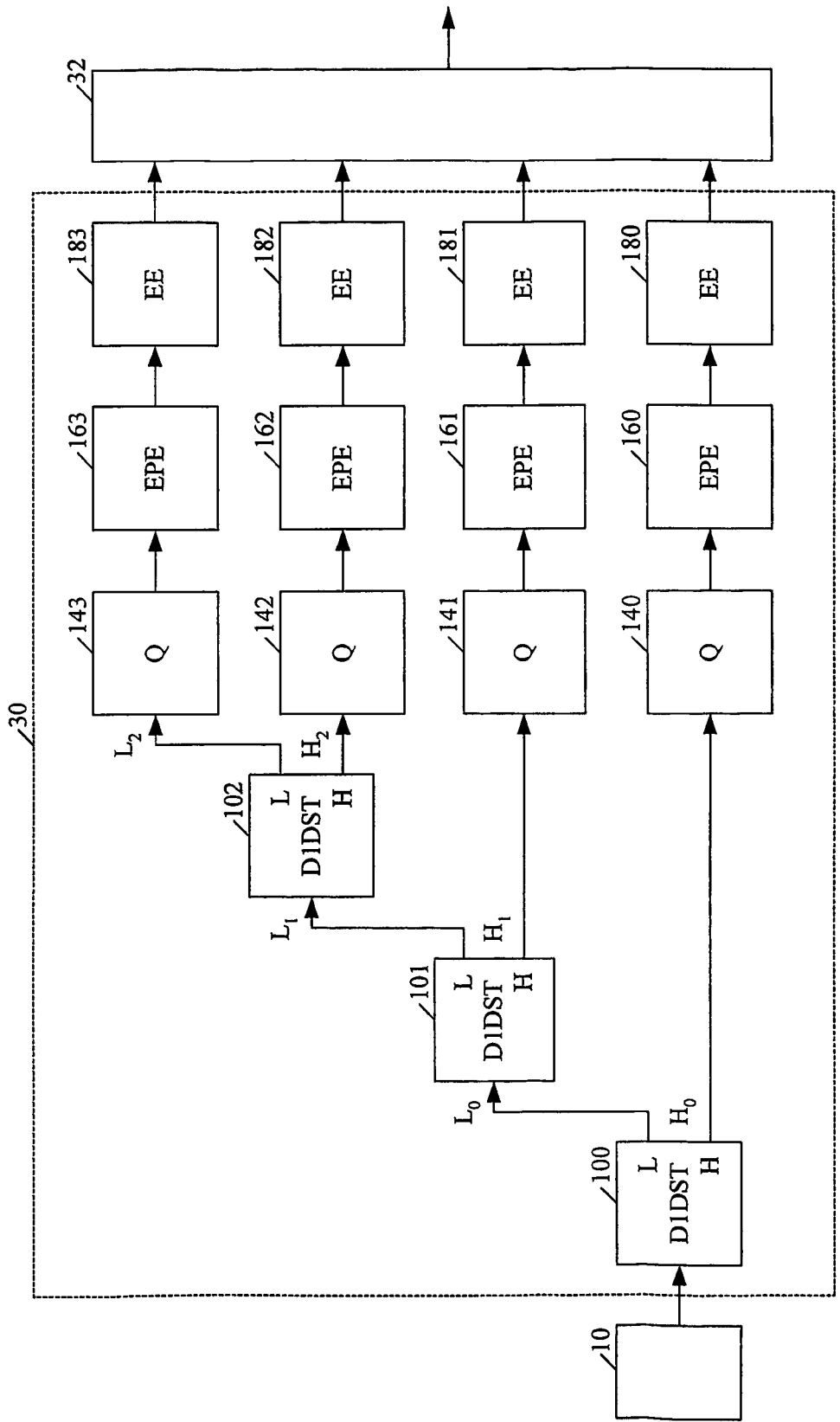
FIG. 13 and FIG. 14 are block diagrams of the second embodiment of the encoder and the decoder of this invention, respectively, with three levels of 1DST.
Figure 14:
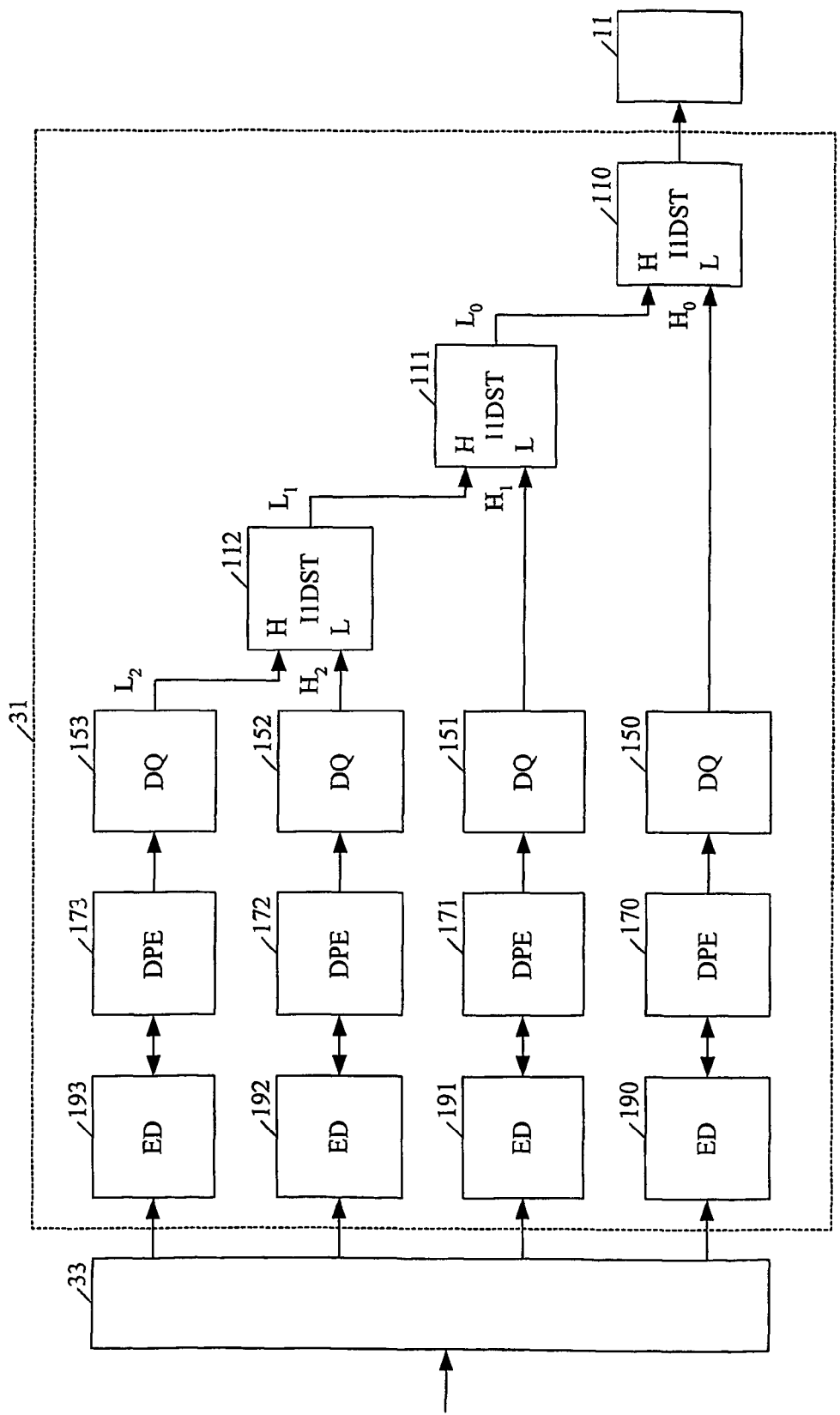

FIG. 13 and FIG. 14 are block diagrams of the second embodiment of the encoder 30 and the decoder 31 of this invention, with N=3 levels of D1DST and I1DST, respectively.

Instead of buffering the compressed transformation coefficients in the synchronization memory of the encoder 30, input uncompressed data is direct subband transformed in D1DSTs 100-102, using direct non-stationary filters, transformation coefficients are quantized in quantizers 140-143, the probabilities of transformation coefficients within the specified contexts are estimated in the encoding probability estimators 160-163, the quantized transformation coefficients are entropy encoded in the entropy encoders 180-183 and finally in theirs compressed form stored into the output compressed buffer 32, which temporarily serves as the synchronization memory, from which they will be transmitted.

Instead of buffering the compressed transformation coefficients in the synchronization memory of the decoder 31, input compressed data, received from the input compressed buffer 33, are decoded in the entropy decoders 190-193, with the help of the decoding probability estimators 170-173, after that the quantized transformation coefficients are dequantized in the dequantizers 150-153, and finally inverse subband transformed in I1DSTs 110-112, using inverse non-stationary filters, and stored in theirs uncompressed form in the output uncompressed data memory.

Figure 15:
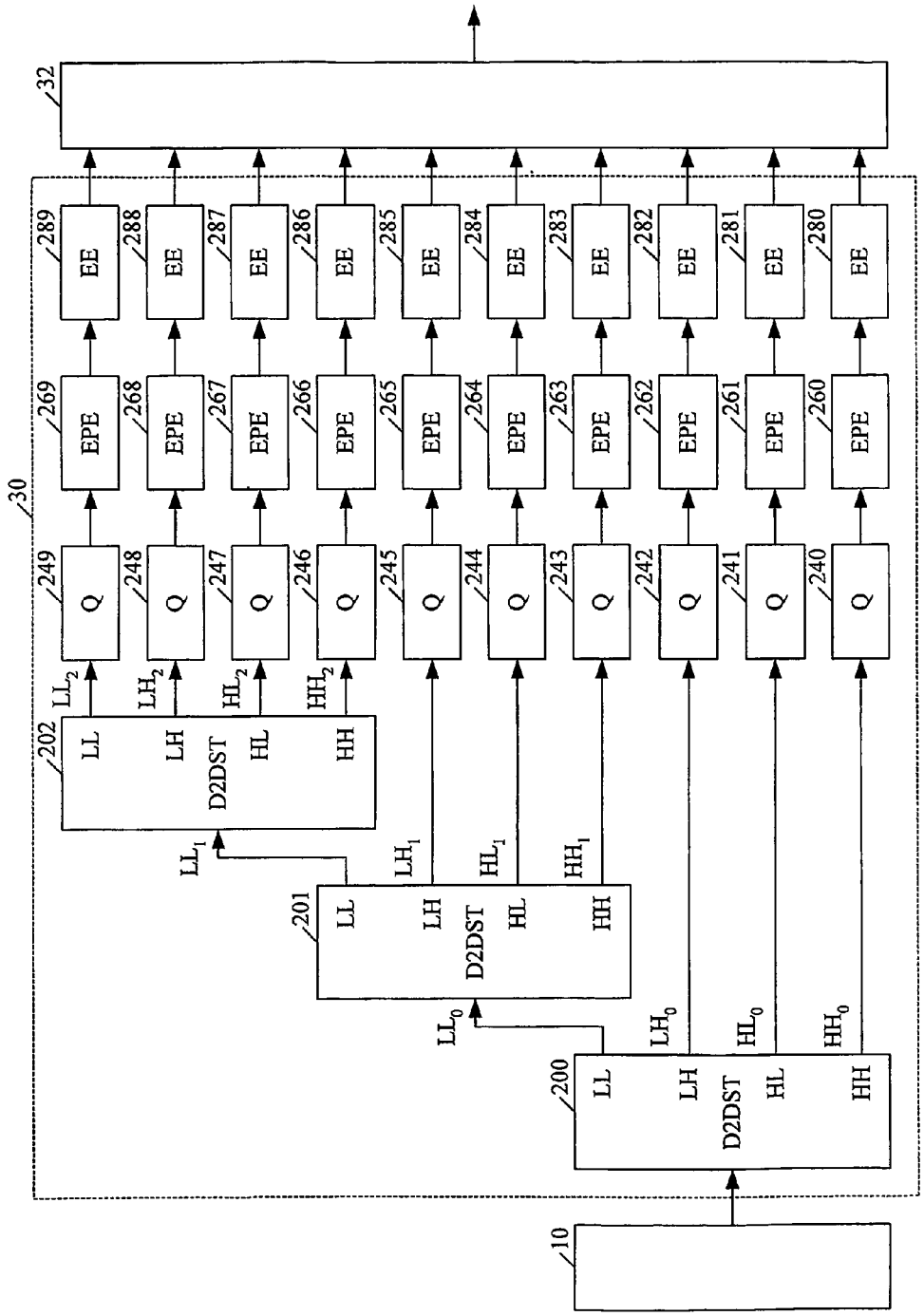
FIG. 15 and FIG. 16 are block diagrams of the second embodiment of the encoder and the decoder of this invention, respectively, with three levels of 2DST.
Figure 16:
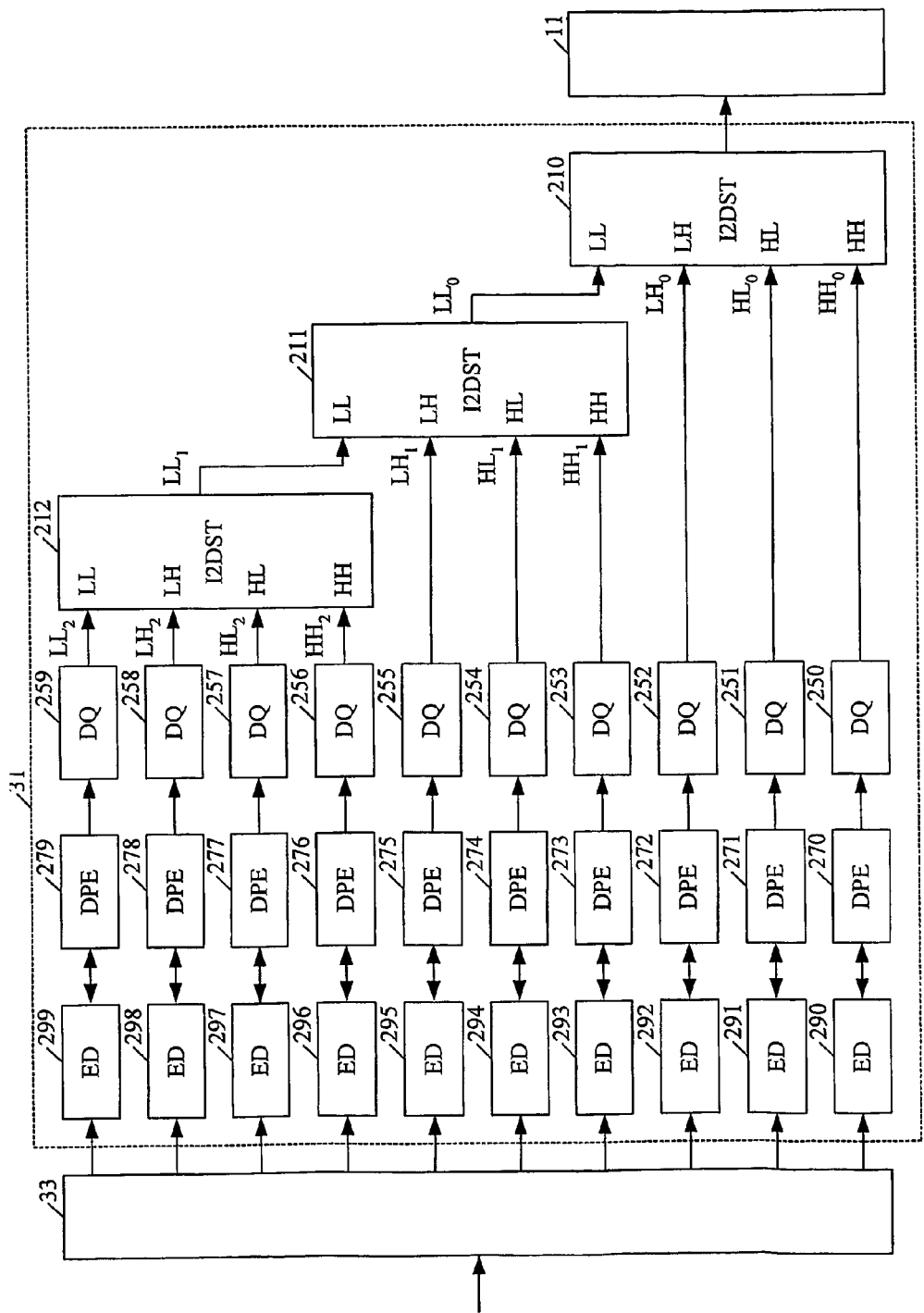

FIG. 15 and FIG. 16 are block diagrams of the second embodiment of the encoder 30 and the decoder 31 of this invention, with N=3 levels of D2DST and I2DST, respectively.

Instead of buffering the compressed transformation coefficients in the synchronization memory of the encoder 30, input uncompressed image 10 is direct subband transformed in D2DSTs 200-202, using direct non-stationary filters, transformation coefficients are quantized in quantizers 240-249, the probabilities of transformation coefficients within the specified contexts are estimated in the encoding probability estimators 260-269, the quantized transformation coefficients are entropy encoded in the entropy encoders 280-289 and finally in theirs compressed form stored into the output compressed buffer 32, from which the output compressed image 18 will be transmitted.

Instead of buffering the compressed transformation coefficients in the synchronization memory of the decoder 31, input compressed image 19, received from the input compressed buffer 33, is decoded in the entropy decoders 290-299, with the help of the decoding probability estimators 270-279, after that the quantized transformation coefficients are dequantized in the dequantizers 250-259, and finally inverse subband transformed in I2DSTs 210-212, using inverse non-stationary filters, and stored in theirs uncompressed form in the output uncompressed image 11 memory.

Since neither input uncompressed image 10 memory, nor output compressed image 18 memory are considered as a part of the image compression system, the second embodiment of this invention does not require synchronization memory, according to TABLE 7.

TABLE 7

| Method | Total filter memory size [internal variable] | Total synchronization memory size [coefficient] |
| --- | --- | --- |
| Chrystafis' with convolution | $2 \cdot (2 \cdot D + 1) \cdot W \cdot \left(1 - \frac{1}{2^N}\right)$ | $D \cdot W \cdot \left(2^N - 3 + \frac{1}{2^{N-1}}\right)$ |

TABLE 7-continued

| Method | Total filter memory size [internal variable] | Total synchronization memory size [coefficient] |
|---|---|---|
| Chrystafis' with lifting | $2 \cdot (D+2) \cdot W \cdot \left(1 - \frac{1}{2^N}\right)$ | $D \cdot W \cdot \left(2^N - 3 + \frac{1}{2^{N-1}}\right)$ |
| First embodiment of present invention | $2 \cdot D \cdot W \cdot \left(1 - \frac{1}{2^N}\right)$ | $D \cdot W \cdot \left(2^N - 3 + \frac{1}{2^{N-1}}\right) \Big/ CR$ |
| Second embodiment of present invention | $2 \cdot D \cdot W \cdot \left(1 - \frac{1}{2^N}\right)$ | 0 |

It should be noticed that neither first nor the second embodiment of this invention can be represented in a block form of FIG. 2 and FIG. 3, due to highly distributed quantizers, encoding probability estimators, entropy encoders, entropy decoders, decoding probability estimators, dequantizers and synchronization memories. However, the generic numbering introduced in FIG. 2 and FIG. 3 will be used in further description for simplicity reasons.

Figure 17:
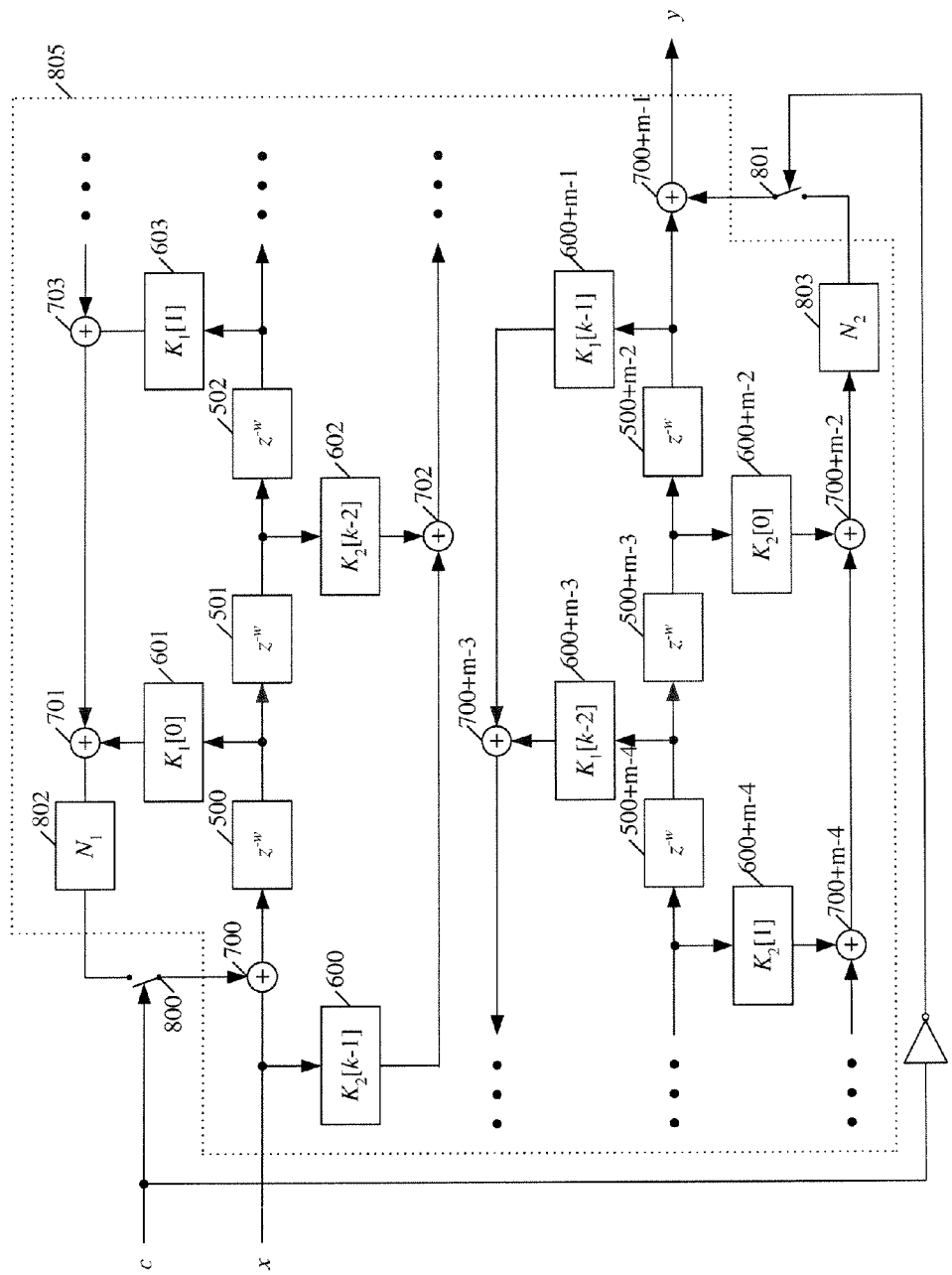
FIG. 17 is a block diagram of the general non-stationary filter cell of this invention, used in all embodiments of the direct and inverse non-stationary filters.

FIG. 17 is a block diagram of the general non-stationary filter cell (NSFC) of this invention, used in all embodiments of the direct and inverse non-stationary filters. NSFC provides octave subband decomposition, while keeping linear phase, contrary to state-of-the-art stationary infinite impulse response (IIR) filters, which are the basis for the invention of NSFC. Additionally, the realization of non-stationary filters is twice simpler than the realization of the equivalent FIR filter. Furthermore, non-stationary filters of this invention provide alternate low-pass and high-pass filtered result at its output, with even and odd sample indexes, respectively, additionally reducing realization complexity. Total number of delay elements is usually about two times less than in two FIR filters mutually performing the same task (TABLE 7). Finally, the first and the second embodiment of the direct and inverse non-stationary filters of this invention do not utilize multipliers due to the filter coefficients that are powers of two.

General NSFC $F_{N_1,N_2,\vec{K}_1,\vec{K}_2}$ (x, c) has two NSFC inputs, x and c, as well as single NSFC output y. Thereto, x and y represent an input and an output of a filter device 805, which nonstationarity is controlled by an input c through the first switch 800 and the second switch 801. The input samples are received serially, one sample at each period at input x. Input c is, for example, c=0 for the samples with even indexes and c=1 for the samples with odd indexes, although it can be defined in the opposite manner. The output samples with even indexes are low-pass filtered and down-sampled. The output samples with odd indexes are high-pass filtered and down-sampled. The specific embodiments depend on a choice of the parameters $N_1$, $N_2$, $\vec{K}_1$ and $\vec{K}_2$, where $N_1$ is a first function 802, $N_2$ is a second function 803, $\vec{K}_1$ is the constant vector with elements $K_1[0], K_1[1], \ldots, K_1[k-2], K_1[k-1]$, denoted as 601, 603, ..., 600+m−3, 600+m−1, respectively, and $\vec{K}_2$ is the constant vector with elements $K_2[0], K_2[1], \ldots, K_2[k-2], K_2[k-1]$, denoted as 600+m−2, 600+m−4, ..., 602, 600, respectively.

The following description of the general NSFC operation will be described for case of filters with odd number of delay elements $z^{-w}$ 500, 501, ..., 500+m−2, i.e. even m=2·k. The outputs of even indexed delay elements $z^{-w}$ 500, 502, ..., 500+m−4, 500+m−2 are routed through the multipliers $K_1[0]$ 601, $K_1[1]$ 603, ..., $K_1[k-1]$ 600+m−1, which are substituted by shifters in the first and the second embodiment of the direct and inverse non-stationary filters of this invention. The outputs of the multipliers $K_1[0]$ 601, $K_1[1]$ 603, ..., $K_1[k-1]$ 600+m−1 are summed together using the adders 701, 703, ..., 700+m−3, the sum is transformed in $N_1$ 802, fed back and finally summed with input x in the adder 700 for the closed switch 800, i.e. for c=1. The NSFC input x and the outputs of odd indexed delay elements $z^{-w}$ 501, 503, ..., 500+m−3 are routed through the multipliers $K_2[k-1]$ 600, $K_2[k-2]$ 602, ..., $K_2[1]$ 600+m−4, $K_2[0]$ 600+m−2, which are substituted by shifters in the first and the second embodiment of the direct and inverse non-stationary filters of this invention. The outputs of the multipliers $K_2[k-1]$ 600, $K_2[k-2]$ 602, ..., $K_2[1]$ 602, $K_2[0]$ 600+m−2 are summed together using the adders 702, ..., 700+m−4, 700+m−2, the sum is transformed in $N_2$ 803, fed forward and finally summed with the output of the last delay element $z^{-w}$ 500+m−2 in the adder 700+m−1 for the closed switch 801, i.e. for c=0, in order to produce the NSFC output y.

If the direct NSFC is defined by $F_{N_1,N_2,\vec{K}_1,\vec{K}_2}$ (x,c), the inverse NSFC is defined by $F_{-N_1,-N_2,\vec{K}_1,\vec{K}_2}$ (x, $\bar{c}$), where $-N_1$ and $-N_2$ represents functions with the negative sign, while $\bar{c}$ represents inverted binary variable c, which is 1 for the samples with even indexes and 0 for the samples with odd indexes. It is obvious that both direct and inverse NSFC have the same structure as the general NSFC. The serial connection of the direct and inverse NSFC provides the transfer function $z^{-2 \cdot w \cdot (m-1)}$, i.e. time delay of 2·w·(m−1) samples, where m−1 is the number of delay elements $z^{-w}$ in each of direct and inverse NSFC. The order of received pixels is usually left to right, and top to bottom. The delay element $z^{-w}$ within the horizontal filter has to store only a single pixel, i.e. w=1. However, the delay element $z^{-w}$ for the vertical filter has to store the complete horizontal line with W pixels, so w=W.

Although the preferred embodiment of the general, direct and inverse NSFCs are described and illustrated, those skilled in the art can perform various modifications and design equivalents, since there is an infinite number of filter cells with the same transfer functions up to the time shift. For example, the time delay of the transfer function will be increased simply by appending arbitrary number of zeros to vectors $\vec{K}_1$ or $\vec{K}_2$. It is also possible to split single NSFC into multiple NSFCs. For example, serial connection of three NSFCs, $F_{N_1,0,\vec{K}_1,[0]}, F_{0,0,[0],[0]}$ and $F_{0,N_2,[0],\vec{K}_2}$ provide the time delayed transfer function $F_{N_1,N_2,\vec{K}_1,\vec{K}_2}$, which can be implemented in a single NSFC. Such variations and equivalents should not be regarded as a departure from the spirit and the scope of invented NSFC, since they are obvious to those skilled in the art.

It can be shown that sufficient conditions for providing linear phase in NSFC are $N_1 = N_2 = $const and $\vec{K}_1 = \vec{K}_2$. However, said conditions are not necessary. For example, it can be shown that $F_{1,1,[1],[-1]}$ also provides linear phase.

FIG. 18 is a block diagram of the general integer-to-integer non-stationary filter cell (INSFC) $FI_{N_1,N_2,\lambda,\xi,\vec{K}_1,\vec{K}_2,K_3}$ (x, c) of this invention, which can be used in all embodiments of the direct and inverse non-stationary filters. General INSFC is based on a general NSFC 860. Newly introduced parameters are binary constant $\lambda$, real constant $\xi$ and prescaling factor $K_3$ 850. The definition of the parameterized nonlinear block $N_{\lambda,\xi}$ (x,c) 870 utilizes the following annotations: $\lfloor w \rfloor$ as the largest integer not exceeding w (i.e. "floor" function), and $\lceil w \rceil$ as the smallest integer greater than w (i.e. "ceil" function).

If the direct INSFC is defined by $FI_{N_1,N_2,\lambda,\xi,\vec{K}_1,\vec{K}_2,K_3}$ (x,c), inverse INSFC is defined by $FI_{-N_1,-N_2,\lambda,\xi,\vec{K}_1,\vec{K}_2,K_3}$ (x, $\bar{c}$), where $-N_1$ and $-N_2$ represents functions with the negative sign, while $\overline{\lambda}$ represents inverted binary constant $\lambda$ and $\overline{c}$ represents inverted binary variable c. It is obvious that both direct and inverse INSFC have the same structure as the general INSFC.

$$N_{\lambda,\xi}(x,c) = \begin{cases} \frac{x}{K_3}, & c=1 \\ \lfloor \frac{x}{K_3} + \xi \rfloor, & c=0 \wedge \lambda=0 \\ \lceil \frac{x}{K_3} - \xi \rceil, & c=0 \wedge \lambda=1 \end{cases}$$

FIG. 19 is a block diagram of all embodiments of the direct non-stationary filter of this invention, which are made of sequentially connected direct NSFCs or direct INSFCs 900, 901, . . . , 900+e−1. Multipliers with constants $G_1$ 881 and $G_2$ 882 provide unity gain during both low-pass and high-pass direct filtering operation, depending on the position of the switch 880, which passes signal multiplied with constant $G_1$ for c=1, or signal multiplied with constant $G_2$ for c=0. Integer-to-integer transform is performed with $G_1=G_2=1$.

FIG. 20 is a block diagram of all embodiments of the inverse non-stationary filter of this invention, which are made of sequentially connected inverse NSFCs or inverse INSFCs 950+e−1, . . . , 951, 950 in the inversed order in comparison with FIG. 19. Multipliers with constants $G_1^{-1}$ 891 and $G_2^{-1}$ 892 provide unity gain during both low-pass and high-pass inverse filtering, depending on the position of the switch 890, which passes signal multiplied with constant $G_1^{-1}$ for c=1, or signal multiplied with constant $G_2^{-1}$ for c=0. Integer-to-integer transform is performed with $G_1=G_2=1$.

In a practical implementation one adder could be removed at each connection of two NSFCs. Namely, either a feedback signal from the next NSFC or a feedforward signal from the previous NSFC has zero value within the period of c, so two adders can be replaced by a single adder with the multiplexed input. This modification is possible even in INSFC. Namely, the nonlinear block $N_{b,\xi}(x,c)$ reduces itself to a gain block when fed forward value is zero.

Figure 21:
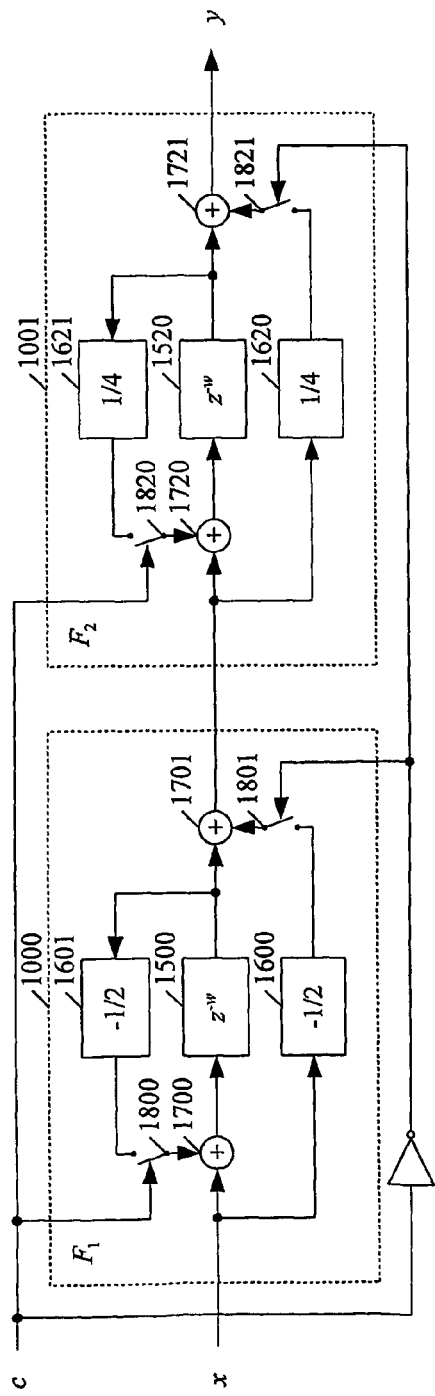
FIG. 21 and FIG. 22 are block diagrams of the first embodiment of the direct and inverse non-stationary filter of this invention, respectively.

FIG. 21 is a block diagram of the first embodiment of the direct non-stationary filter of this invention, made of sequentially connected two first-order direct NSFCs $F_1=F_{-1,-1,[1/2],[1/2]}(x,c)$ 1000 and $F_2=F_{1,1,[1/4],[1/4]}(x,c)$ 1001. The transfer function of this filter is appropriate to the 5-tap/3-tap analysis (5/3) filter, disclosed in D. Le Gall et al., "Subband coding of digital images using symmetric short kernel filters and arithmetic coding techniques," *Proc. Int. Conf. Acoustics, Speech, Signal Processing (ICASSP)*, New York, N.Y., pp. 761-765, April 1988, which is used for reversible DWT in JPEG2000 standard.

Figure 22:
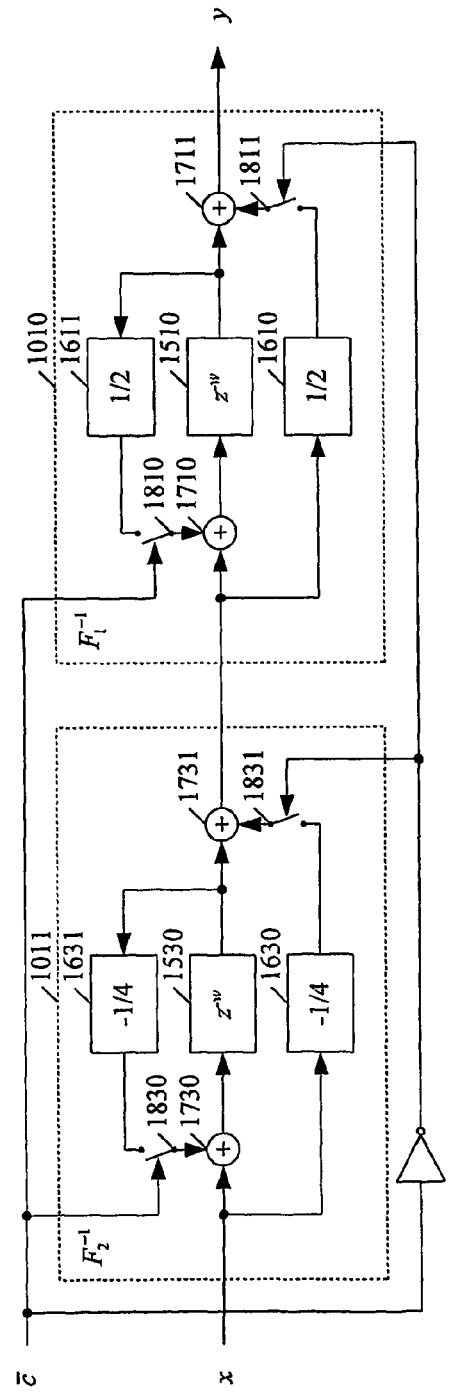

FIG. 22 is a block diagram of the first embodiment of the inverse non-stationary filter of this invention, made of sequentially connected two first-order inverse NSFCs $F_2^{-1}=F_{-1,-1,[1/4],[1/4]}(x,c)$ 1011 and $F_1^{-1}=F_{1,1,[1/2],[1/2]}(x,c)$ 1010. The transfer function of this filter is appropriate to the 5-tap/3-tap synthesis (5/3) filter, disclosed in D. Le Gall et al., "Subband coding of digital images using symmetric short kernel filters and arithmetic coding techniques," *Proc. Int. Conf. Acoustics, Speech, Signal Processing (ICASSP)*, New York, N.Y., pp. 761-765, April 1988, which is used for reversible DWT in JPEG2000 standard.

Figure 23:
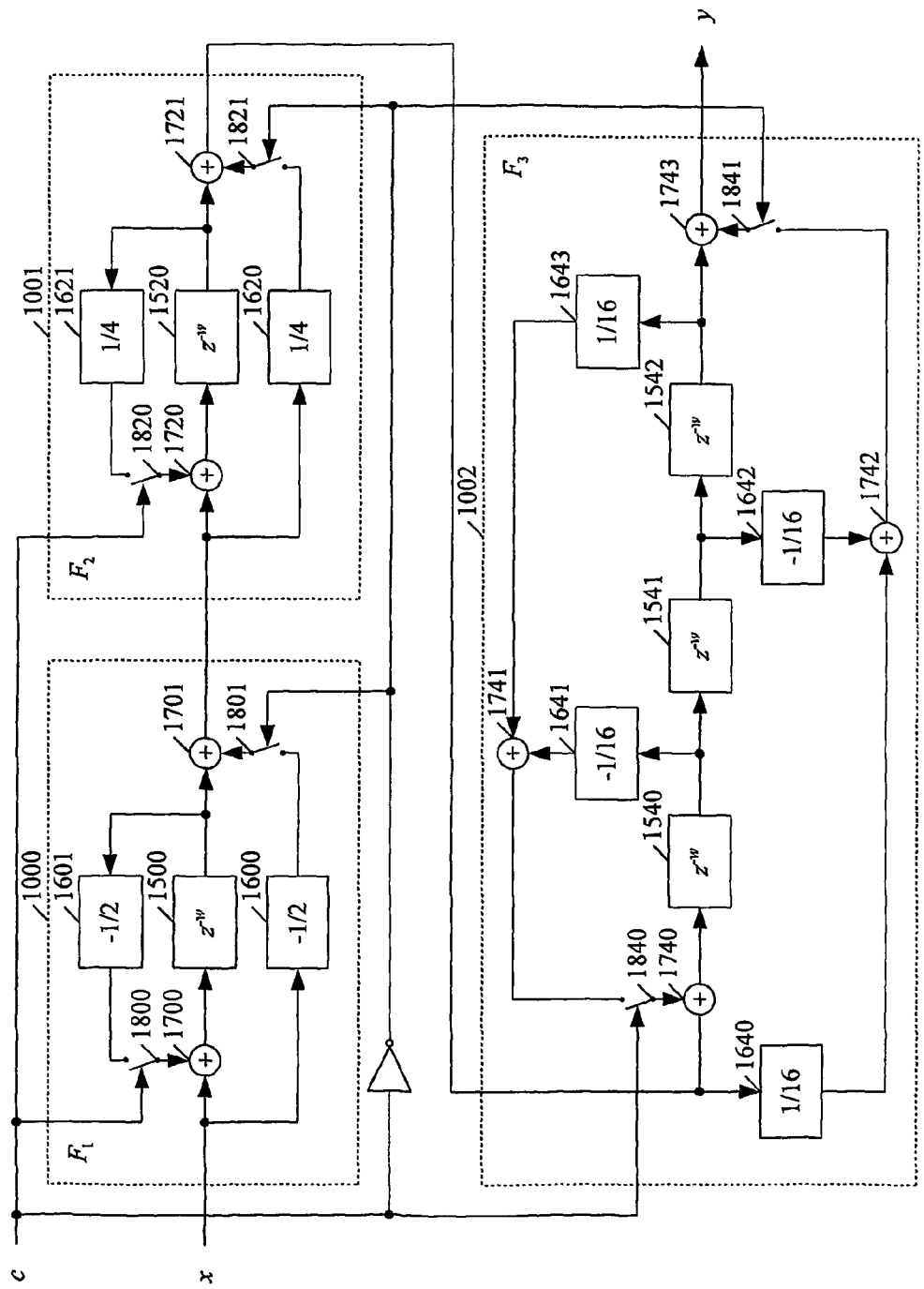
FIG. 23 and FIG. 24 are block diagrams of the second embodiment of the direct and inverse non-stationary filter of this invention, respectively.
Figure 24:
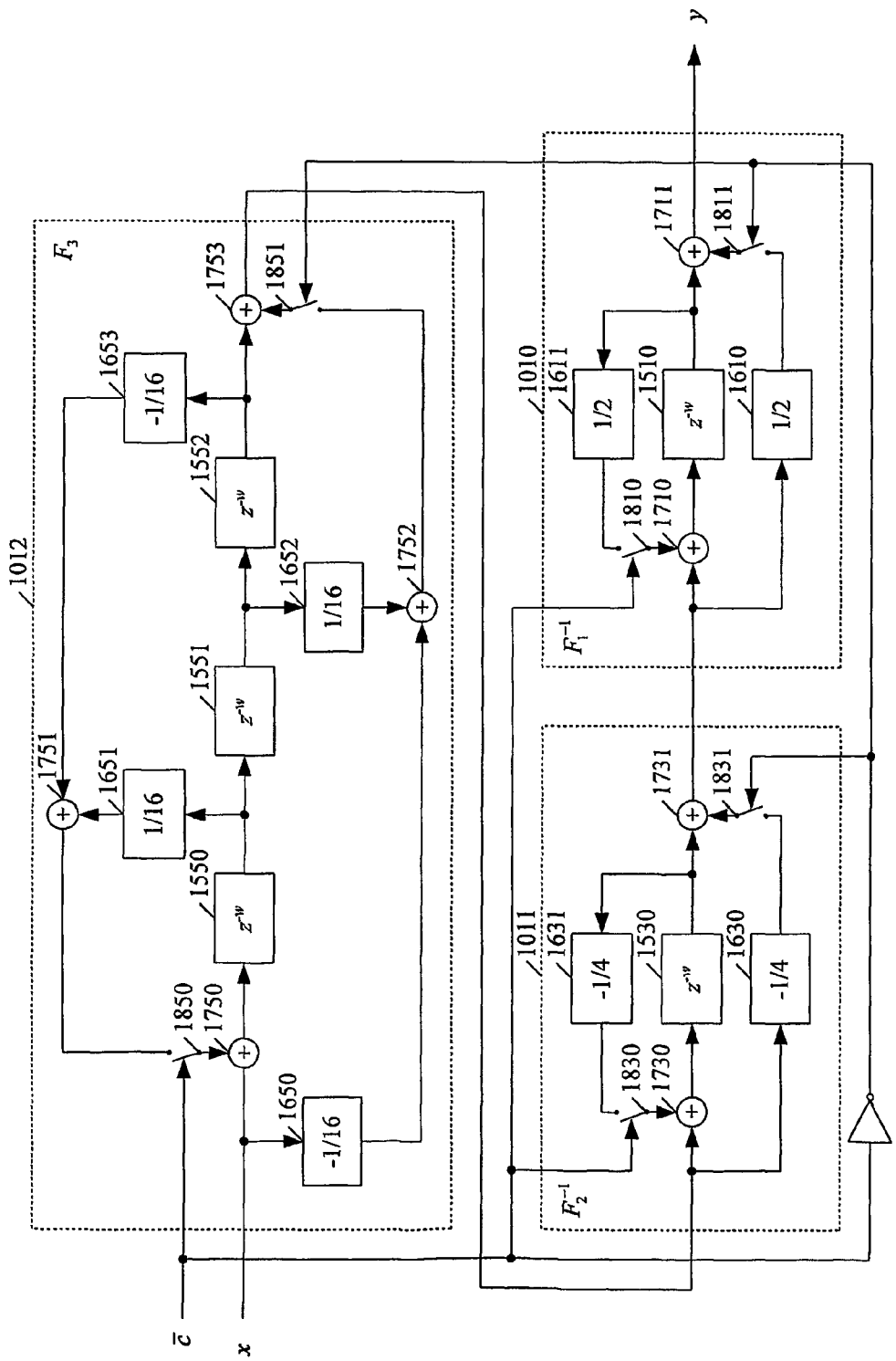

FIG. 23 is a block diagram of the second embodiment of the direct non-stationary filter of this invention, made by the addition of one third-order direct NSFC $F_3=F_{-1,-1,[1/16-1/16],[1/16-1/16]}(x,c)$ 1002 after the first embodiment of the direct non-stationary filter of this invention. FIG. 24 is a block diagram of the second embodiment of the inverse non-stationary filter of this invention, made by the addition of one third-order inverse NSFC $F_3^{-1}=F_{1,1,[1/16-1/16],[1/16-1/16]}(x,c)$ 1012 before the first embodiment of the inverse non-stationary filter of this invention.

Figure 25:
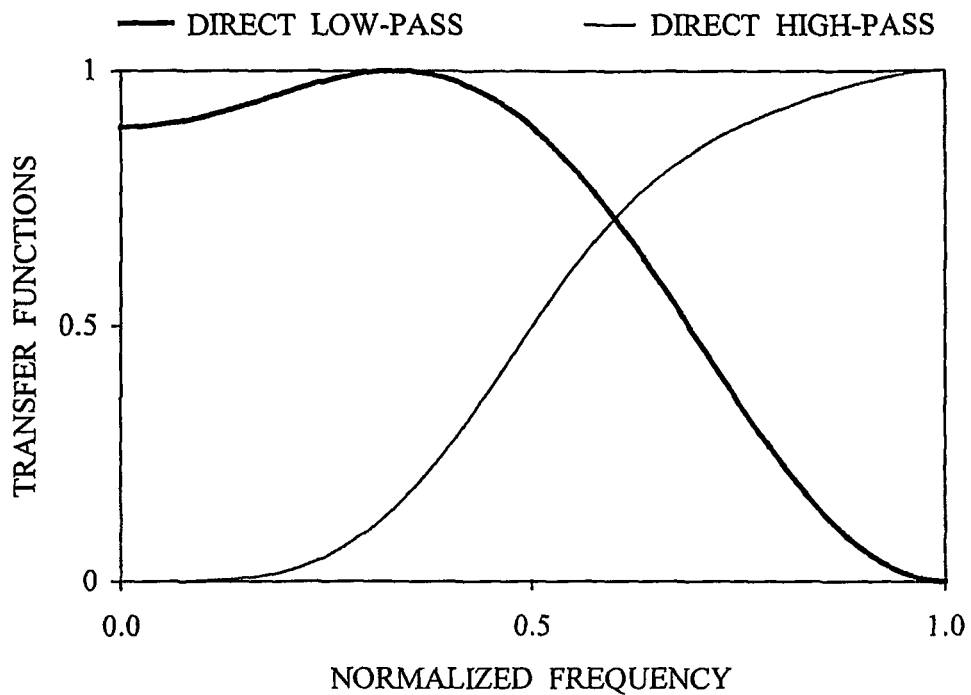
FIG. 25 and FIG. 26 illustrate transfer function in the frequency domain of the second embodiment of the direct and inverse non-stationary filter of this invention, respectively.
Figure 26:
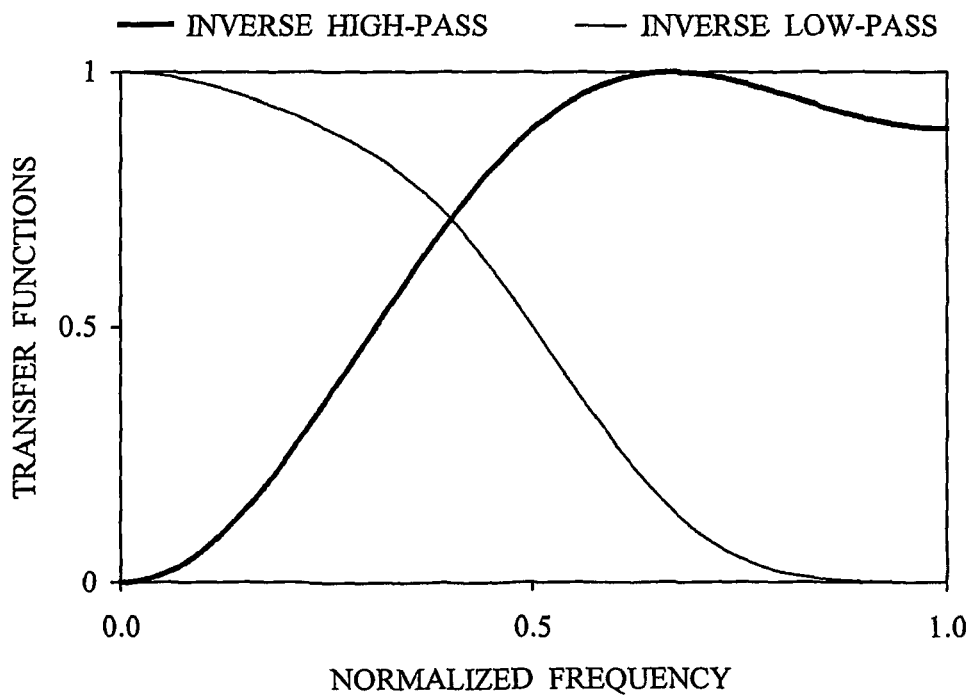

FIG. 25 illustrates transfer function in the frequency domain of the second embodiment of the direct non-stationary filter of this invention, respectively. FIG. 26 illustrates transfer function in the frequency domain of the second embodiment of the inverse non-stationary filter of this invention, respectively. Neither the first nor the second embodiment of the non-stationary filters of this invention utilizes multipliers with constants $G_1$ 881 and $G_2$ 882, so the third embodiment is especially designed to show their use.

Multipliers in both the first and the second embodiment of the non-stationary filters of this inventions can be made either as shifters or shifted hardwired bit line connections (shifted connections between output and input bit lines) in hardware, or shift instructions or bit remapping data structures (bit fields in C programming language) in software.

Figure 27:
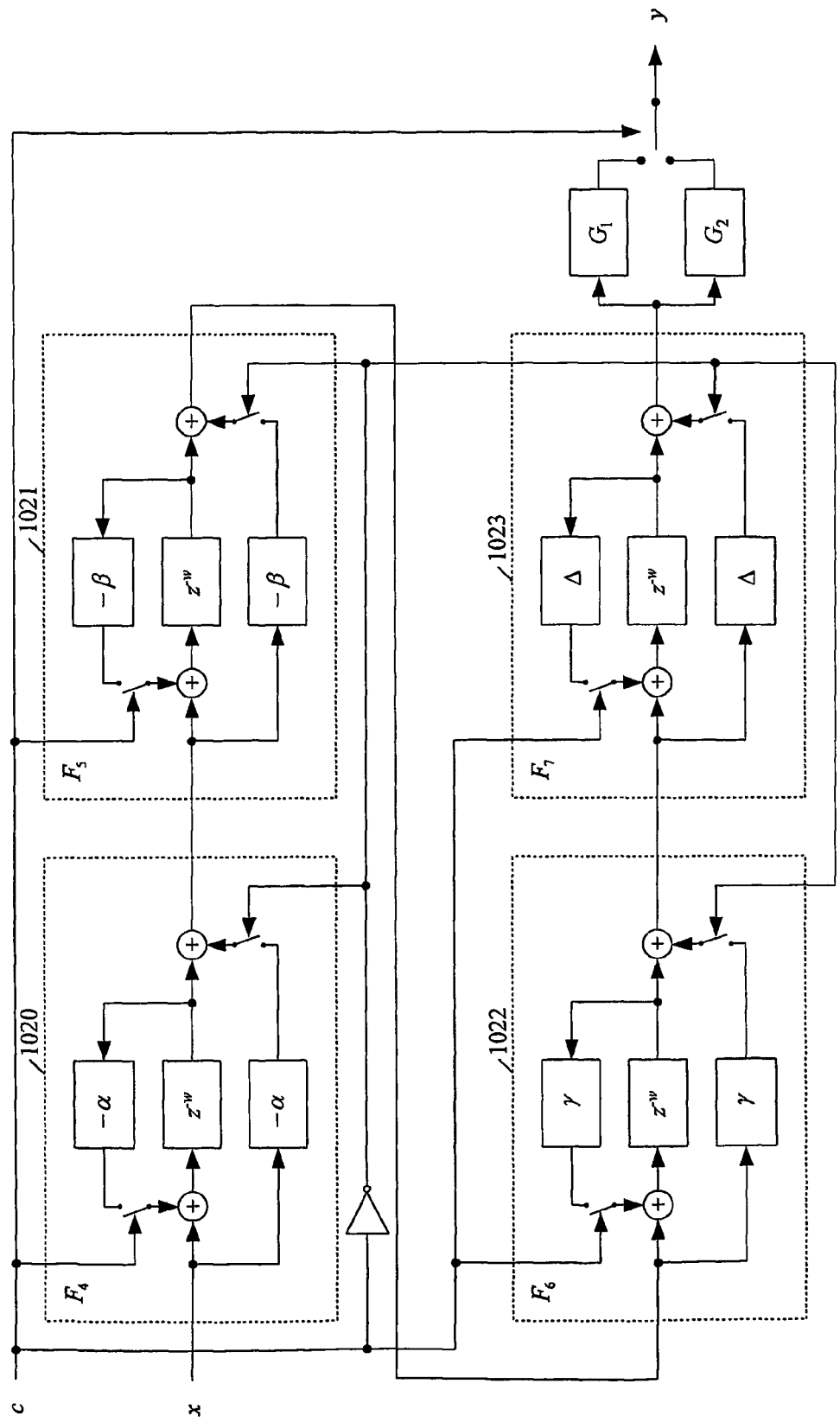
FIG. 27 and FIG. 28 are block diagrams of the third embodiment of the direct and inverse non-stationary filter of this invention, respectively.

FIG. 27 is a block diagram of the third embodiment of the direct non-stationary filter of this invention, made of sequentially connected four first-order direct NSFCs: $F_4=F_{-1,-1,[\alpha],[\alpha]}(x,c)$ 1020, $F_5=F_{-1,-1,[\beta],[\beta]}(x,c)$ 1021, $F_6=F_{1,1,[\gamma],[\gamma]}(x,c)$ 1022 and $F_7=F_{1,1,[\Delta],[\Delta]}(x,c)$ 1023, with parameters given in the TABLE 8.

Figure 28:
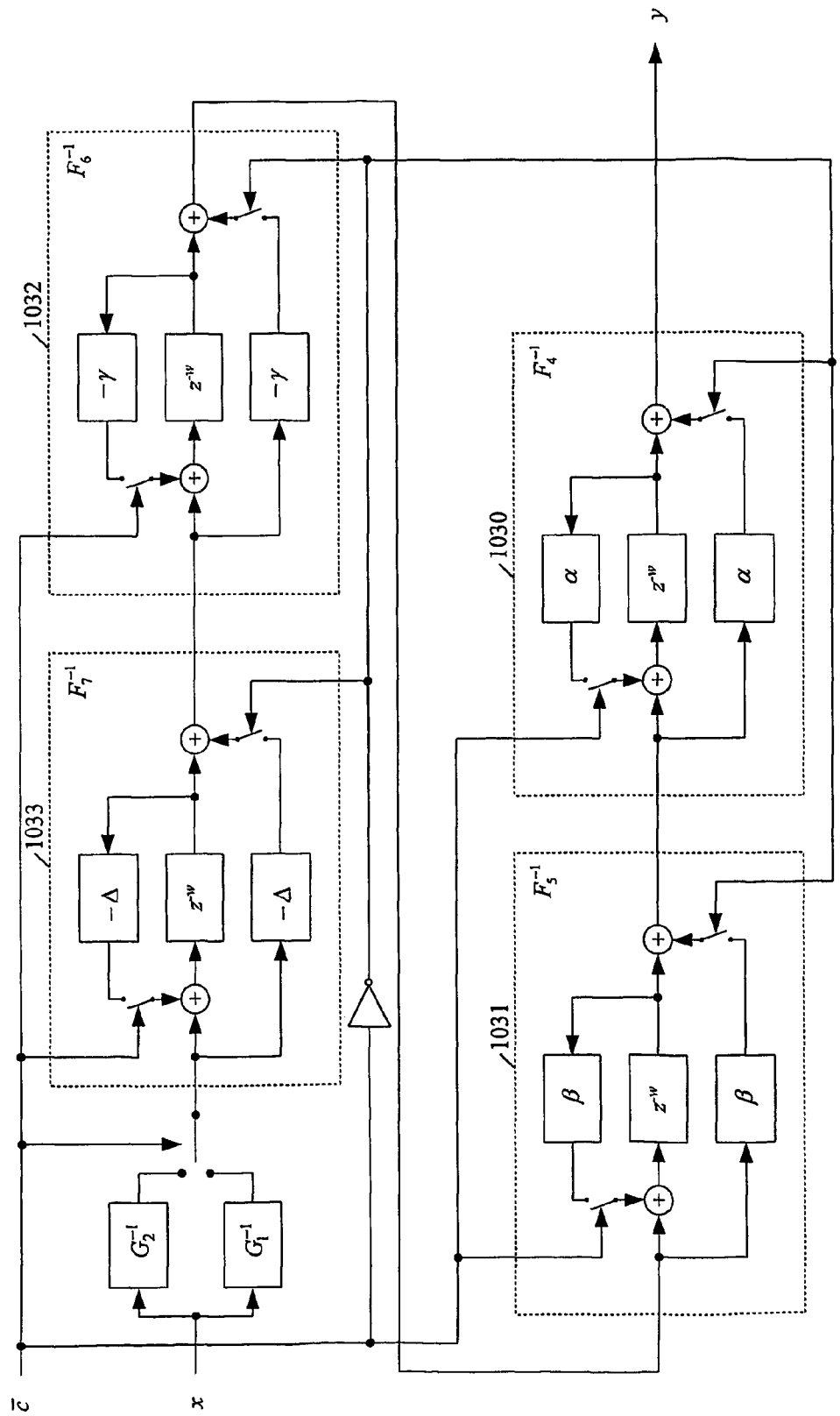

FIG. 28 is a block diagram of the third embodiment of the inverse non-stationary filter of this invention, made of sequentially connected four first-order direct NSFCs: $F_7^{-1}=F_{-1,-1,[\Delta],[\Delta]}(x,c)$ 1033, $F_6^{-1}=F_{-1,-1,[\gamma],[\gamma]}(x,c)$ 1032, $F_5^{-1}=F_{1,1,[\beta],[\beta]}(x,c)$ 1031 and $F_4^{-1}=F_{1,1,[\alpha],[\alpha]}(x,c)$ 1030, with parameters given in the TABLE 8.

TABLE 8

| Parameter | Value |
| --- | --- |
| α | 1.58193248659365 |
| β | 0.07167834102835 |
| γ | 0.82577375069311 |
| Δ | 0.52307224508739 |
| $G_1$ | 0.76323962993937 |
| $G_2$ | 1.31020450298084 |

It should be also noticed that all filter embodiments use a symmetrical extension of input data at the image boundaries. However, it is possible to implement non-stationary filter coefficients near image boundaries, in order to provide the same effect, which is well known to that skilled-in-the-art. Therefore, such unnecessary description will be omitted, since it does not influence the spirit of this invention.

Figure 29:
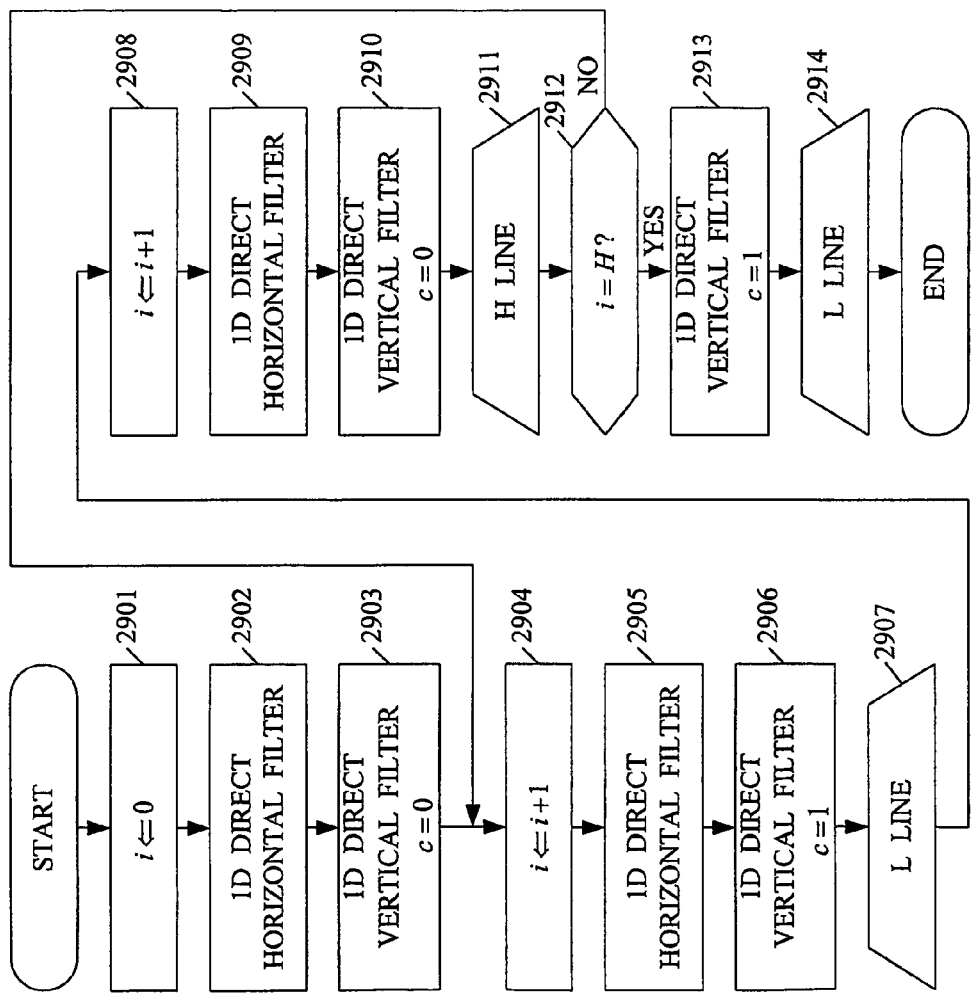
FIG. 29 and FIG. 30 are flowcharts of a single level 2DST using first embodiment of direct and inverse non-stationary filters of this invention, respectively.

FIG. 29 is a flowchart of a single level 2DST using first embodiment of direct non-stationary filters of this invention in the encoder 30, for odd number of lines as an example. Line index i is initialized in the processing block 2901. Horizontal 1DST with direct non-stationary filters is performed in the processing block 2902, using alternate c=0 for pixels with even indexes and c=1 for pixels with odd indexes. Vertical 1DST with direct non-stationary filter with c=0 is performed in the processing block 2903. The processing of all other lines is performed within the loop until the height H of the input uncompressed image 10 is reached in the examination block 2912. Line index i is incremented in the processing block 2904. Horizontal 1DST with direct non-stationary filters is performed in the processing block 2905, using alternate c=0 for pixels with even indexes and c=1 for pixels with odd indexes. Vertical 1DST with direct non-stationary filter with c=1 is performed in the processing block 2906. The low-pass transformed coefficients of a single line are output in the output block 2907. Line index i is incremented again in the processing block 2908. Horizontal 1DST with direct non-stationary filters is performed in the processing block 2909, using alternate c=0 for pixels with even indexes and c=1 for pixels with odd indexes. Vertical 1DST with direct non-stationary filter with c=0 is performed in the processing block 2910. The high-pass transformed coefficients of a single line are output in the output block 2911. Vertical 1DST with direct non-stationary filter with c=1 is performed in the processing block 2913. The low-pass transformed coefficients of a single line are output in the output block 2914.

Figure 30:
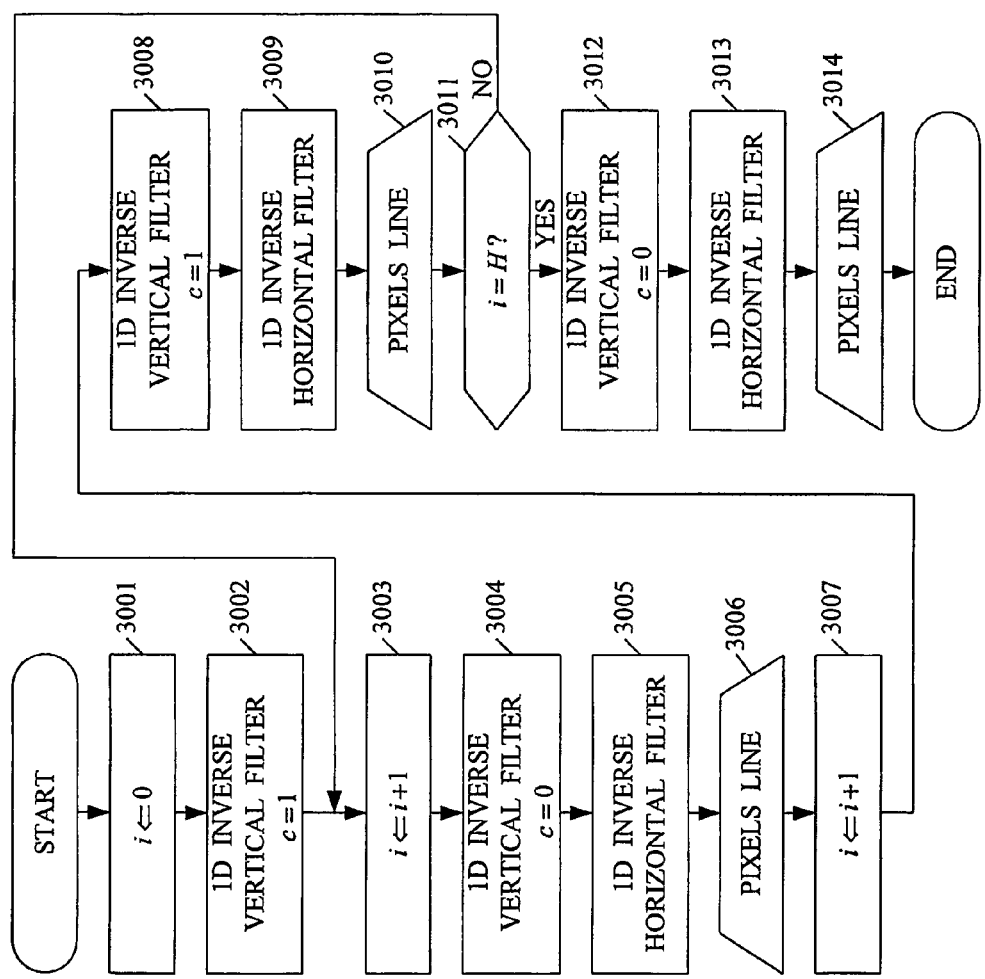

FIG. 30 is a flowchart of a single level 2DST using first embodiment of inverse non-stationary filters of this invention in the decoder 31, for odd number of lines an an example. Line index i is initialized in the processing block 3001. Vertical 1DST with inverse non-stationary filter with c=1 is performed in the processing block 3002. The processing for all other lines is performed within the loop until the height H of the image is reached in the examination block 3011. Line index i is incremented in the processing block 3003. Vertical 1DST with inverse non-stationary filter with c=0 is performed in the processing block 3004. Horizontal 1DST with inverse non-stationary filters is performed in the processing block 3005, using alternate c=1 for pixels with even indexes and c=0 for pixels with odd indexes. The pixels of a single line are output in the output block 3006. Line index i is incremented again in the processing block 3007. Vertical 1DST with inverse non-stationary filter with c=1 is performed in the processing block 3008. Horizontal 1DST with inverse non-stationary filters is performed in the processing block 3009, using alternate c=1 for pixels with even indexes and c=0 for pixels with odd indexes. The pixels of a single line are output in the output block 3010. Vertical 1DST with inverse non-stationary filter with c=0 is performed in the processing block 3012. Horizontal 1DST with inverse non-stationary filters is performed in the processing block 3013, using alternate c=1 for pixels with even indexes and c=0 for pixels with odd indexes. The pixels of a single line are output in the output block 3014.

TABLE 9 shows an example of the order of the generation of transformation coefficients within subbands for a hypothetical 8 pixels×8 lines image during single-level 2DST in the encoder 30. The output of the direct non-stationary filter generates alternatively low-pass transformation coefficients with even indexes and high-pass transformation coefficients with odd indexes.

Most state-of-the-art compression methods use the same 1DST filter for both rows and columns, since all directions in the image should be treated equally. However, this decreases computational efficiency. This invention can successfully use different filters for horizontal and vertical filtering. Since horizontal filter has much smaller memory/quality ratio, we may choose better and more complex horizontal filter, and slightly worse and less complex vertical filter, practically without increasing memory size. Three embodiments of the direct and inverse non-stationary filters provide total of nine two-dimensional filters according to TABLE 10.

TABLE 9

ORDER OF THE GENERATION OF TRANSFORMATION COEFFICIENTS

| Subband LL | | | | Subband HL | | | | Subband LH | | | | Subband HH | | | |
|---|---|---|---|---|---|---|---|---|---|---|---|---|---|---|---|
| 1 | 3 | 5 | 7 | 2 | 4 | 6 | 8 | 9 | 11 | 13 | 15 | 10 | 12 | 14 | 16 |
| 17 | 19 | 21 | 23 | 18 | 20 | 22 | 24 | 25 | 27 | 29 | 31 | 26 | 28 | 30 | 32 |
| 33 | 35 | 37 | 39 | 34 | 36 | 38 | 40 | 41 | 43 | 45 | 47 | 42 | 44 | 46 | 48 |
| 49 | 51 | 53 | 55 | 50 | 52 | 54 | 56 | 57 | 59 | 61 | 63 | 58 | 60 | 62 | 64 |

TABLE 10

| Vertical filter embodiment | Horizontal filter embodiment | Required memory | Required multipliers |
|---|---|---|---|
| 1 | 1 | Low | No |
| 1 | 2 | Low | No |
| 1 | 3 | Low | Yes |
| 2 | 1 | Medium | No |
| 2 | 2 | Medium | No |
| 2 | 3 | Medium | Yes |
| 3 | 1 | High | Yes |
| 3 | 2 | High | Yes |
| 3 | 3 | High | Yes |

Quantization of transformation coefficients is performed in the quantizer 24 only in case of lossy compression. Dequantization of transformation coefficients is performed in the dequantizer 25 only in case of lossy compression. Transformation coefficients directly pass through the quantizer 24 and dequantizer 25 in case of lossless compression.

Quantized or non-quantized transformation coefficients 14 in each subband are encoded separately without any information from any other subband, in order to fulfill the first objection of this invention.

Figure 31:
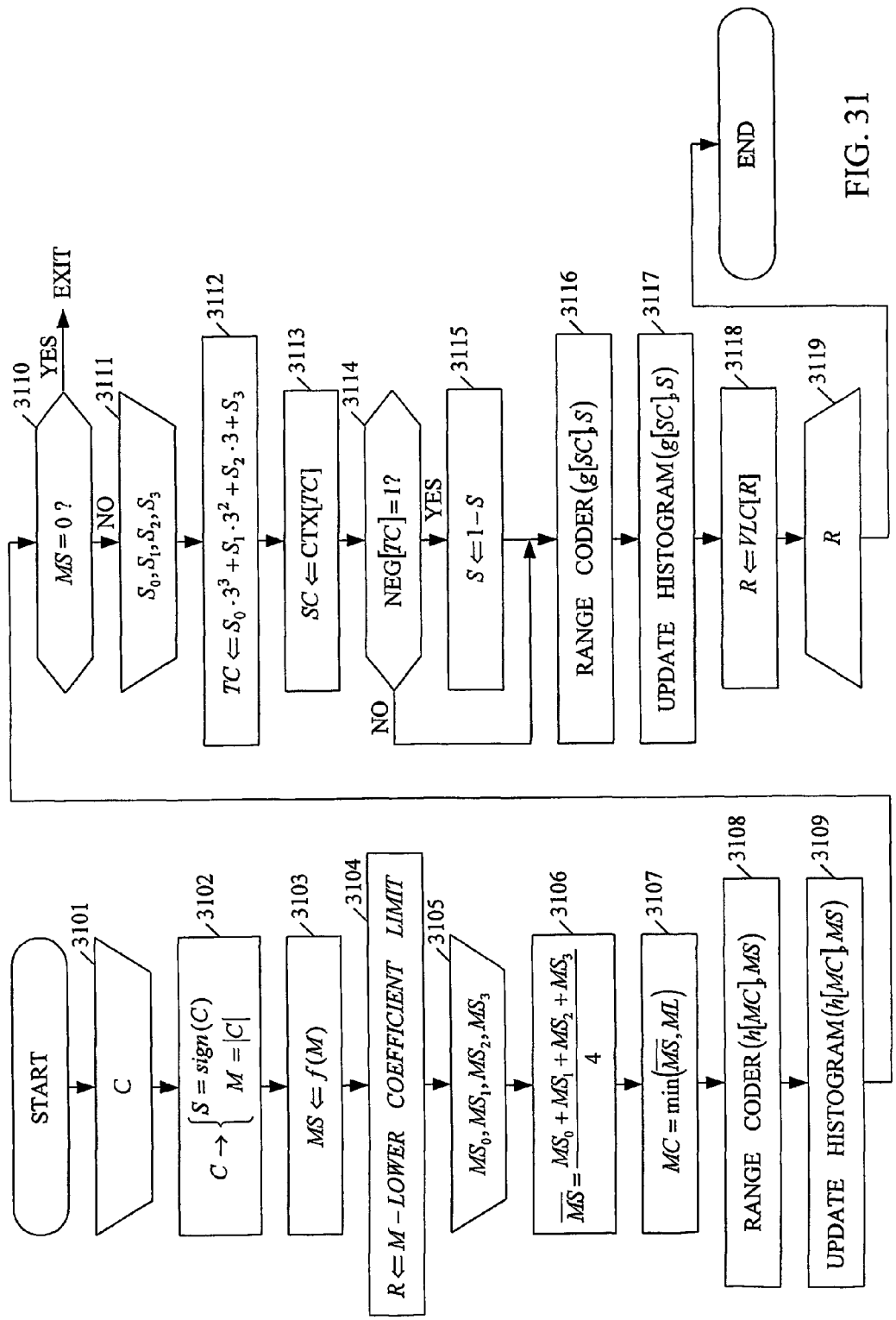
FIG. 31 is a flowchart of the encoding probability estimator and entropy encoder of this invention based on single-pass adaptive histograms.

FIG. 31 is a flowchart of the encoding probability estimator 26 and entropy encoder 28 of this invention, based on single-pass adaptive histograms. The adaptation starts from a uniform distribution and requires several samples to complete. The adaptation time is proportional to a number of histogram bins and the difference between the uniform distribution and the exact distribution of the variable to be encoded. Positive and negative transformation coefficients have the same probability in LH, HL and HH subbands, providing opportunity to adapt histograms according to magnitude only, thus halving the total number of unknown probabilities and twice increasing the adaptation speed. The transformation coefficients C, which are input in the input block 3101, are split into sign S and magnitude M pairs in the processing block 3102. This method is also described in A. Said et al., "An image multi-resolution representation for lossless and lossy compression," *IEEE Trans. Image Processing*, Vol. 5, No. 9, pp. 1303-1310, September 1996. Sign S takes three values as in C. Chrysafis' Ph.D. Thesis, but with different code.

$$S = \begin{cases} 0, & C > 0 \\ 2, & C = 0 \\ 1, & C < 0 \end{cases}$$

The statistics of transformation coefficients for most images directly leads to the definition of bin boundaries based on the logarithmic progression, as in W. A. Pearlman, "High performance, low complexity image compression," *Applications of Digital Image Processing X, Proc. SPIE* 3164, pp. 234-246, July 1997; and U.S. Pat. No. 5,959,560 issued September 1999 to A. Said et al. However, this invention utilizes higher number of histogram bins (32 in total), than state-of-the-art methods. The logarithms of base 2, used in the processing block 3103 of this invention, define the magnitude-set index MS to be equal to a sum of a doubled position of the first nonzero bit of the highest significance and the value of the first next bit of the lower significance, in a binary representation of the magnitude M, according to TABLE 11, which is given for 16-bit coefficients. A residual R is defined as the difference between the magnitude M and the lower coefficient limit, equal to a value of the magnitude M with all bits zeroed except the first nonzero bit of the highest significance and the first next bit of the lower significance in a binary representation of the magnitude M, according to TABLE 11. Therefore, the transformation coefficients are actually split in the processing block 3104 into sign S, magnitude-set index MS and residual R triples. Due to this, the probability density distributions of MS and R can be approximately treated as uniform.

TABLE 11

| Coefficient limits (inclusive) | | | |
|---|---|---|---|
| Lower | Upper | Coefficient range | MS |
| 0 | 0 | 1 | 0 |
| 1 | 1 | 1 | 1 |
| 2 | 2 | 1 | 2 |
| 3 | 3 | 1 | 3 |
| 4 | 5 | 2 | 4 |
| 6 | 7 | 2 | 5 |
| 8 | 11 | 4 | 6 |
| 12 | 15 | 4 | 7 |
| 16 | 23 | 8 | 8 |
| 24 | 31 | 8 | 9 |
| 32 | 47 | 16 | 10 |
| 48 | 63 | 16 | 11 |
| 64 | 95 | 32 | 12 |
| 96 | 127 | 32 | 13 |
| 128 | 191 | 64 | 14 |
| 192 | 255 | 64 | 15 |
| 256 | 383 | 128 | 16 |
| 384 | 511 | 128 | 17 |
| 512 | 767 | 256 | 18 |
| 768 | 1023 | 256 | 19 |
| 1024 | 1535 | 512 | 20 |
| 1536 | 2047 | 512 | 21 |
| 2048 | 3071 | 1024 | 22 |
| 3072 | 4095 | 1024 | 23 |
| 4096 | 6143 | 2048 | 24 |
| 6144 | 8191 | 2048 | 25 |
| 8192 | 12287 | 4096 | 26 |
| 12288 | 16383 | 4096 | 27 |
| 16384 | 24575 | 8192 | 28 |
| 24576 | 32767 | 8192 | 29 |
| 32768 | 49151 | 16384 | 30 |
| 49152 | 65535 | 16384 | 31 |

The predictor for MS based on the local variance is used to improve compression ratio. Since MS value can be considered as an approximation of a logarithm, a logarithm of a local variance (proportional to an entropy) can be calculated as a mean value $\overline{MS}$ in the processing block 3106 from neighborhood magnitude-set indexes $MS_i$ of already encoded transformation coefficients from the input block 3105, shown in FIG. 32. On the basis of $\overline{MS}$, the magnitude context MC is defined as an index of an appropriate adaptive magnitude histogram h[MC], which is then used for the actual encoding of the magnitude-set index MS using the range encoder in the processing block 3108. However, the local variance can enormously increase near the sharp edges, leading to a large number of histograms, and their slow adaptation. Because of that, MC is limited by the constant ML, with preferable value ML=4, in the processing block 3107. The number MH of magnitude histograms, i.e. the number of different MC, is preferably limited to MH=1+ML=5. Magnitude histogram h[MC] update is performed in the processing block 3109.

A slightly better prediction can be achieved in the modified processing block 3106 in a multi-pass case, by the calculation of a mean value $\overline{MS}$, based on all 8 neighbors from the modified input block 3105.

$$\overline{MS} = \frac{1}{8} \cdot \sum_{i=0}^{7} MS_i$$

It is also possible to achieve slightly better prediction in the modified processing block 3107 in a multi-pass case, based on MSP value of a "parent" transformation coefficient, i.e. one that lies in the same relative spatial position, but in a higher 2DST level. MC is limited by the constant MLP, with preferable value MLP=3, in the modified processing block 3107. The number MH of magnitude histograms, i.e. the number of different MC, is preferably limited to M=1+ML+MP·MLP=20, using the constant MP, with preferable value MP=5. However, the increased compression ratio obtained in this manner is negligible in relation to an enormous increase in the memory size, due to the storage of all transformation coefficients.

$$MC=\min(\overline{MS},ML)+MP\cdot\min(MSP,MLP)$$

The multi-pass method with different constant MLP is described in A. Said et al., "An image multiresolution representation for lossless and lossy compression," *IEEE Trans. Image Processing*, Vol. 5, No. 9, pp. 1303-1310, September 1996.

Figures 32, 33, 35:
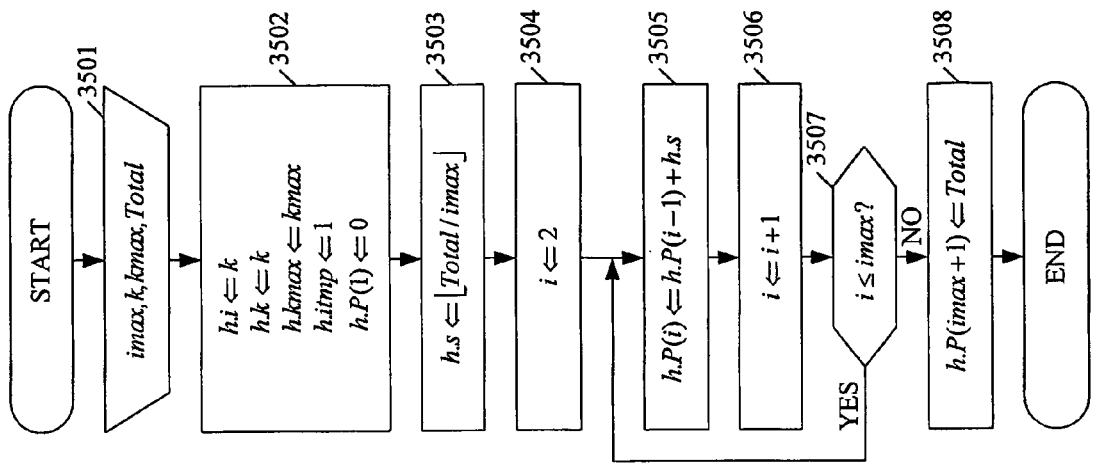
FIG. 32 shows the magnitude-sets for the context modeling.
FIG. 33 shows the signs for the context modeling.
FIG. 35 is an initialization flowchart for histograms with fast adaptation.

In case of MS=0, sign S is not encoded at all, according to the examination block 3110. Otherwise, the predictor for sign S is used to improve compression ratio. The neighborhood sign values $S_i$ of already encoded transformation coefficients from input block 3111, shown in FIG. 33, are used for the encoding of the ternary context TC in the processing block 3112. The number of different values of ternary contexts TC is $3^4=81$ in a single-pass case with 4 neighborhood transformation coefficients, or $3^8=6561$ in a multi-pass case with 8 neighbors.

TABLE 12

| $S_0$ | $S_1$ | $S_2$ | $S_3$ | TC | SC |
|---|---|---|---|---|---|
| 0 | 0 | 0 | 0 | 0 | 0 |
| 0 | 0 | 0 | 1 | 1 | 0 |
| 0 | 0 | 0 | 2 | 2 | 0 |
| 0 | 0 | 1 | 0 | 3 | 4 |
| 0 | 0 | 1 | 1 | 4 | 1 |
| 0 | 0 | 1 | 2 | 5 | 2 |
| 0 | 0 | 2 | 0 | 6 | 1 |
| 0 | 0 | 2 | 1 | 7 | 0 |
| 0 | 0 | 2 | 2 | 8 | 1 |
| 0 | 1 | 0 | 0 | 9 | 0 |
| 0 | 1 | 0 | 1 | 10 | 1 |
| 0 | 1 | 0 | 2 | 11 | 1 |
| 0 | 1 | 1 | 0 | 12 | 1 |
| 0 | 1 | 1 | 1 | 13 | 0 |
| 0 | 1 | 1 | 2 | 14 | 0 |
| 0 | 1 | 2 | 0 | 15 | 0 |
| 0 | 1 | 2 | 1 | 16 | 4 |

TABLE 12-continued

| S₀ | S₁ | S₂ | S₃ | TC | SC |
|---|---|---|---|---|---|
| 0 | 1 | 2 | 2 | 17 | 0 |
| 0 | 2 | 0 | 0 | 18 | 4 |
| 0 | 2 | 0 | 1 | 19 | 2 |
| 0 | 2 | 0 | 2 | 20 | 2 |
| 0 | 2 | 1 | 0 | 21 | 1 |
| 0 | 2 | 1 | 1 | 22 | 0 |
| 0 | 2 | 1 | 2 | 23 | 3 |
| 0 | 2 | 2 | 0 | 24 | 0 |
| 0 | 2 | 2 | 1 | 25 | 0 |
| 0 | 2 | 2 | 2 | 26 | 1 |
| 1 | 0 | 0 | 0 | 27 | 2 |
| 1 | 0 | 0 | 1 | 28 | 1 |
| 1 | 0 | 0 | 2 | 29 | 2 |
| 1 | 0 | 1 | 0 | 30 | 0 |
| 1 | 0 | 1 | 1 | 31 | 1 |
| 1 | 0 | 1 | 2 | 32 | 1 |
| 1 | 0 | 2 | 0 | 33 | 1 |
| 1 | 0 | 2 | 1 | 34 | 0 |
| 1 | 0 | 2 | 2 | 35 | 0 |
| 1 | 0 | 0 | 0 | 36 | 1 |
| 1 | 1 | 0 | 1 | 37 | 1 |
| 1 | 1 | 0 | 2 | 38 | 1 |
| 1 | 1 | 1 | 0 | 39 | 0 |
| 1 | 1 | 1 | 1 | 40 | 1 |
| 1 | 1 | 1 | 2 | 41 | 0 |
| 1 | 1 | 2 | 0 | 42 | 1 |
| 1 | 1 | 2 | 1 | 43 | 0 |
| 1 | 1 | 2 | 2 | 44 | 0 |
| 1 | 2 | 0 | 0 | 45 | 3 |
| 1 | 2 | 0 | 1 | 46 | 0 |
| 1 | 2 | 0 | 2 | 47 | 1 |
| 1 | 2 | 1 | 0 | 48 | 1 |
| 1 | 2 | 1 | 1 | 49 | 2 |
| 1 | 2 | 1 | 2 | 50 | 2 |
| 1 | 2 | 2 | 0 | 51 | 0 |
| 1 | 2 | 2 | 1 | 52 | 0 |
| 1 | 2 | 2 | 2 | 53 | 1 |
| 2 | 0 | 0 | 0 | 54 | 1 |
| 2 | 0 | 0 | 1 | 55 | 0 |
| 2 | 0 | 0 | 2 | 56 | 0 |
| 2 | 0 | 1 | 0 | 57 | 1 |
| 2 | 0 | 1 | 1 | 58 | 0 |
| 2 | 0 | 1 | 2 | 59 | 2 |
| 2 | 0 | 2 | 0 | 60 | 0 |
| 2 | 0 | 2 | 1 | 61 | 0 |
| 2 | 0 | 2 | 2 | 62 | 0 |
| 2 | 0 | 0 | 0 | 63 | 0 |
| 2 | 1 | 0 | 1 | 64 | 0 |
| 2 | 1 | 0 | 2 | 65 | 0 |
| 2 | 1 | 1 | 0 | 66 | 0 |
| 2 | 1 | 1 | 1 | 67 | 1 |
| 2 | 1 | 1 | 2 | 68 | 1 |
| 2 | 1 | 2 | 0 | 69 | 0 |
| 2 | 1 | 2 | 1 | 70 | 0 |
| 2 | 1 | 2 | 2 | 71 | 3 |
| 2 | 2 | 0 | 0 | 72 | 0 |
| 2 | 2 | 0 | 1 | 73 | 4 |
| 2 | 2 | 0 | 2 | 74 | 3 |
| 2 | 2 | 1 | 0 | 75 | 2 |
| 2 | 2 | 1 | 1 | 76 | 2 |
| 2 | 2 | 1 | 2 | 77 | 0 |
| 2 | 2 | 2 | 0 | 78 | 2 |
| 2 | 2 | 2 | 1 | 79 | 1 |
| 2 | 2 | 2 | 2 | 80 | 0 |

On the basis of TC, a sign context SC is defined as an index of an appropriate adaptive sign histogram g[SC], which is then used for the actual encoding of sign S using the range encoder in the processing block 3116. In both cited cases, large number of different values of the sign context SC leads to histograms that would not adapt at all. Because of that, CTX table translates 81 or 6561 different values of the ternary context TC into the preferable number of 5 different values of the sign context SC per each of subbands LH, HL and HH in the processing block 3113 (TABLE 12), which simultaneously represent a number SH of sign histograms.

TABLE 13

| TC | P(0) | P(1) | NS |
|---|---|---|---|
| 0 | 0.5276 | 0.4724 | 0 |
| 1 | 0.5333 | 0.4667 | 0 |
| 2 | 0.4901 | 0.5099 | 1 |
| 3 | 0.2961 | 0.7039 | 1 |
| 4 | 0.4321 | 0.5679 | 1 |
| 5 | 0.6300 | 0.3700 | 0 |
| 6 | 0.4463 | 0.5537 | 1 |
| 7 | 0.4754 | 0.5246 | 1 |
| 8 | 0.4397 | 0.5603 | 1 |
| 9 | 0.5012 | 0.4988 | 0 |
| 10 | 0.5796 | 0.4204 | 0 |
| 11 | 0.4117 | 0.5883 | 1 |
| 12 | 0.5842 | 0.4158 | 0 |
| 13 | 0.5457 | 0.4543 | 0 |
| 14 | 0.5364 | 0.4636 | 0 |
| 15 | 0.5243 | 0.4757 | 0 |
| 16 | 0.7224 | 0.2776 | 0 |
| 17 | 0.5050 | 0.4950 | 0 |
| 18 | 0.7235 | 0.2765 | 0 |
| 19 | 0.3963 | 0.6037 | 1 |
| 20 | 0.6019 | 0.3981 | 0 |
| 21 | 0.4508 | 0.5492 | 1 |
| 22 | 0.5286 | 0.4714 | 0 |
| 23 | 0.6598 | 0.3402 | 0 |
| 24 | 0.4770 | 0.5230 | 1 |
| 25 | 0.5417 | 0.4583 | 0 |
| 26 | 0.4398 | 0.5602 | 1 |
| 27 | 0.6147 | 0.3853 | 0 |
| 28 | 0.4170 | 0.5830 | 1 |
| 29 | 0.6326 | 0.3674 | 0 |
| 30 | 0.4889 | 0.5111 | 1 |
| 31 | 0.4176 | 0.5824 | 1 |
| 32 | 0.4469 | 0.5531 | 1 |
| 33 | 0.5505 | 0.4495 | 0 |
| 34 | 0.5240 | 0.4760 | 0 |
| 35 | 0.4731 | 0.5269 | 1 |
| 36 | 0.4299 | 0.5701 | 1 |
| 37 | 0.5880 | 0.4120 | 0 |
| 38 | 0.5806 | 0.4194 | 0 |
| 39 | 0.4698 | 0.5302 | 1 |
| 40 | 0.4119 | 0.5881 | 1 |
| 41 | 0.5193 | 0.4807 | 0 |
| 42 | 0.4539 | 0.5461 | 1 |
| 43 | 0.4871 | 0.5129 | 1 |
| 44 | 0.4953 | 0.5047 | 1 |
| 45 | 0.3502 | 0.6498 | 1 |
| 46 | 0.4688 | 0.5312 | 1 |
| 47 | 0.5802 | 0.4198 | 0 |
| 48 | 0.4432 | 0.5568 | 1 |
| 49 | 0.3927 | 0.6073 | 1 |
| 50 | 0.6199 | 0.3801 | 0 |
| 51 | 0.5357 | 0.4643 | 0 |
| 52 | 0.4830 | 0.5170 | 1 |
| 53 | 0.4464 | 0.5536 | 1 |
| 54 | 0.4168 | 0.5832 | 1 |
| 55 | 0.5012 | 0.4988 | 0 |
| 56 | 0.5302 | 0.4698 | 0 |
| 57 | 0.5467 | 0.4533 | 0 |
| 58 | 0.5061 | 0.4939 | 0 |
| 59 | 0.4039 | 0.5961 | 1 |
| 60 | 0.5024 | 0.4976 | 0 |
| 61 | 0.4613 | 0.5387 | 1 |
| 62 | 0.4837 | 0.5163 | 1 |
| 63 | 0.5106 | 0.4894 | 0 |
| 64 | 0.5440 | 0.4560 | 0 |
| 65 | 0.5343 | 0.4657 | 0 |
| 66 | 0.4918 | 0.5082 | 1 |
| 67 | 0.4521 | 0.5479 | 1 |
| 68 | 0.5841 | 0.4159 | 0 |
| 69 | 0.5211 | 0.4789 | 0 |
| 70 | 0.4783 | 0.5217 | 1 |
| 71 | 0.6651 | 0.3349 | 0 |
| 72 | 0.4561 | 0.5439 | 1 |
| 73 | 0.6998 | 0.3002 | 0 |
| 74 | 0.6531 | 0.3469 | 0 |
| 75 | 0.6163 | 0.3837 | 0 |
| 76 | 0.5956 | 0.4044 | 0 |
| 77 | 0.5022 | 0.4978 | 0 |

TABLE 13-continued

| TC | P(0) | P(1) | NS |
|----|------|------|-----|
| 78 | 0.6148 | 0.3852 | 0 |
| 79 | 0.4368 | 0.5632 | 1 |
| 80 | 0.5065 | 0.4935 | 0 |

Such incredibly small number is justified due to the encoding of a more probable sign S, which is assured by the examination block 3114, and by sign S inversion using NEG table in the processing block 3115 (TABLE 13). The ternary contexts TC with NS=NEG[TC]=0 are appropriate to the probability of the positive sign P(0) higher than the probability of the negative sign P(1). The ternary contexts TC with NS=NEG [TC]=1 are appropriate to the probability of the negative sign P(1) higher than the probability of the positive sign P(0). The sign histogram g[SC] update is performed in the processing block 3117.

Finally, a residual R is encoded using variable length coding (VLC) in the processing block 3118 for the output in the output block 3119. The number of bits for VLC is appropriate to the coefficient range in TABLE 11, which is well known to that skilled-in-the-art.

Figure 34:
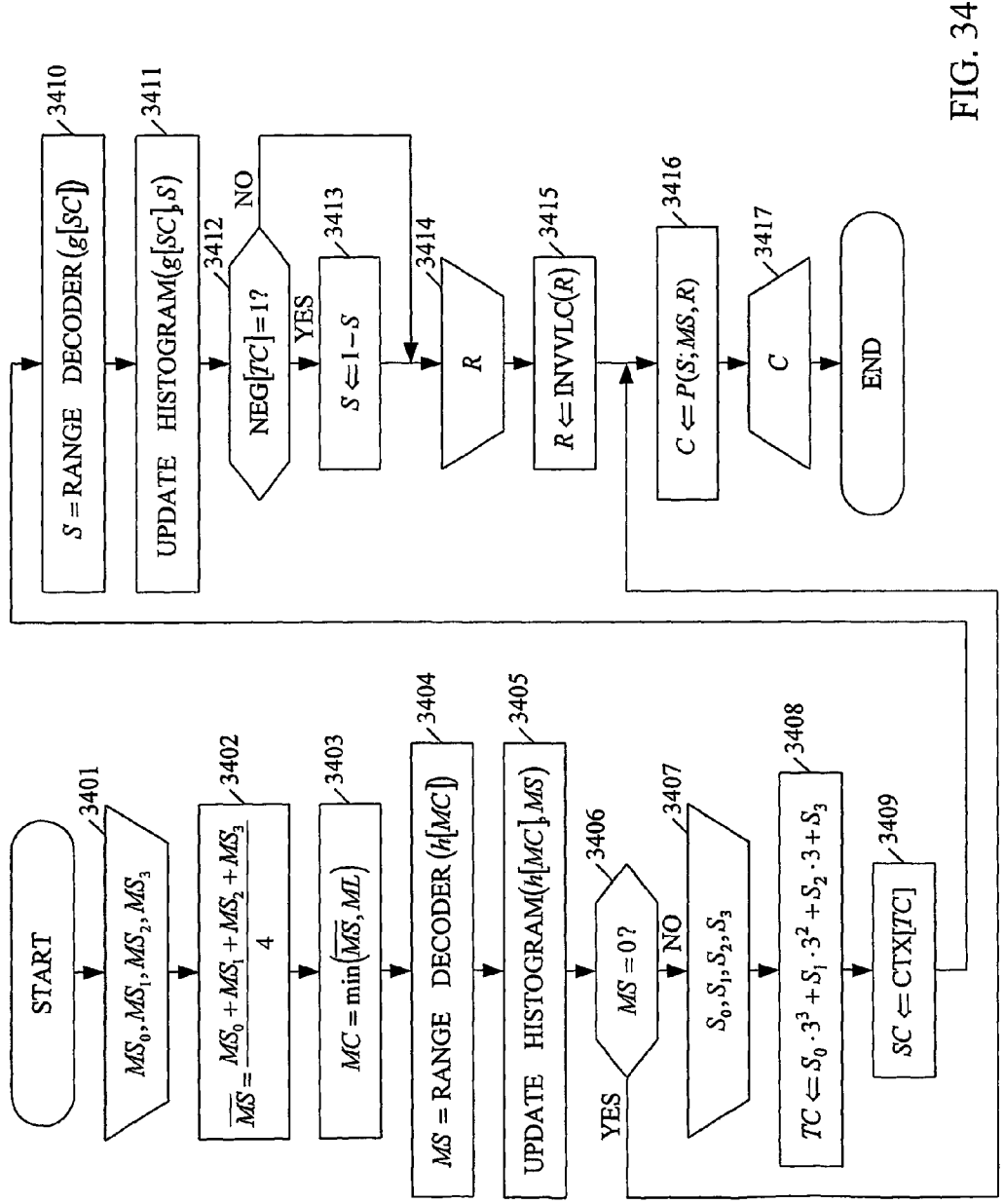
FIG. 34 is a flowchart of the entropy decoder and the decoding probability estimator of this invention based on single-pass adaptive histograms.

FIG. 34 is a flowchart of the entropy decoder 29 and the decoding probability estimator 27 of this invention, based on single-pass adaptive histograms. The mean value $\overline{MS}$ is calculated in the processing block 3402 from neighborhood magnitude-set indexes $MS_i$ of already encoded transformation coefficients from the input block 3401, shown in FIG. 32. On the basis of $\overline{MS}$, the magnitude context MC is defined as an index of an appropriate adaptive magnitude histogram h[MC], which is then used for the actual decoding of the magnitude-set index MS using the range decoder in the processing block 3404. MC is limited by the constant ML, with preferable value ML=4, in the processing block 3403. The number MH of magnitude histograms, i.e. the number of different MC, is preferably limited to MH=1+M=5. Magnitude histogram h[MC] update is performed in the processing block 3405.

In case of AS=0, sign S is not decoded at all, according to the examination block 3406. Otherwise, neighborhood sign values $S_i$ of already encoded transformation coefficients from input block 3407, shown in FIG. 33, are used for the decoding of a ternary context TC in the processing block 3408. On the basis of TC, a sign context SC is defined as an index of an appropriate adaptive sign histogram g[SC], which is then used for the actual decoding of sign S using the range decoder in the processing block 3410. Sign histogram g[SC] update is performed in the processing block 3411.

CTX table translates 81 or 6561 different values of ternary contexts TC into the preferable number of 5 different values of sign contexts SC per each of subbands LH, HL and HH in the processing block 3409 (TABLE 12), which simultaneously represent a number SH of sign histograms. Such incredibly small number is justified due to the decoding of a more probable sign S, which is assurred by the examination block 3412, and by sign S inversion using NEG table in the processing block 3413 (TABLE 13).

The residual R from the input block 3414 is decoded using the decoder with variable length code (INVVLC) in the processing block 3415. The transformation coefficient value C is rebuilt using TABLE 11 in the processing block 3416 for the output in the output block 3417.

The memory size required for the storage of the context information for all subbands during the encoding or the decoding operations described in FIG. 31 and FIG. 34, is approximately three equivalent image lines, according to TABLE 14.

TABLE 14

| 2DST level | Context memory size per subband [coefficient] Context memory size for 3 subbands (LH, HL and HH) is 3 times higher |
|---|---|
| 0 | $\dfrac{W}{2}$ |
| 1 | $\dfrac{W}{4}$ |
| 2 | $\dfrac{W}{8}$ |
| n | $\dfrac{W}{2^{n+1}}$ |
| N-1 | $\dfrac{W}{2^N}$ |
| All levels | $\sum_{n=0}^{N-1} \dfrac{W}{2^n} = W \cdot \left(1 - \dfrac{1}{2^N}\right) < W$ |
| All levels and all subbands | $3 \cdot \sum_{n=0}^{N-1} \dfrac{W}{2^n} = 3 \cdot W \cdot \left(1 - \dfrac{1}{2^N}\right) < 3 \cdot W$ |

The subband $LL_{N-1}$ at the highest N-1 2DST level can be directly stored without the encoding or encoded using any state-of-the-art compression method for small images. For example, $LL_{N-1}$ can be encoded using only one context. In the first step, the first column of the transformation coefficients remains intact. In the second step, each of other transformation coefficients is replaced by the difference with its left neighbor. In the third step, each transformation coefficient from the first column, except the top-left one, is replaced by the difference with its upper neighbor. In the fourth step, the maximum MS value of all transformation coefficients is calculated, and single adaptive histogram is initialized. Finally, all transformation coefficients are encoded using the same procedure defined in FIG. 31, which is used for the encoding of the transformation coefficients in all other subbands. Naturally, the decoding procedure requires the opposite order of the operations and the procedure in FIG. 34.

FIG. 35 is an initialization flowchart for histograms with fast adaptation. Each histogram bin is appropriate to a single symbol x, which can be MS for a magnitude histogram or S for a sign histogram. Simple state-of-the-art method for the probability p(x) estimation of an occurrence of a symbol x is based on a number u(x) of occurrences of a symbol x, and a number Total of occurrences of all symbols. Also, it is defined a cumulative probability P(x) of all symbols y preceding symbol x in the alphabet.

$$p(x) = \frac{u(x)}{\text{Total}}$$

$$\text{Total} = \sum_x u(x)$$

$$P(x) = \sum_{y<x} p(y) = \frac{U(x)}{\text{Total}}$$

$$U(x) = \sum_{y<x} u(y).$$

The main drawback of this simple method is that Total is an arbitrary integer, thus requiring division operation to determine the probability p(x). However, the division operation in this invention is replaced by shift right for $w_3$ bits, due to:

$$\text{Total}=2^{w_3}$$

The second drawback of this simple method is a slow adaptation of the probability p(x), due to averaging. The adaption of the probability p(x) in this invention is provided by low-pass filtering of the binary sequence I(j) representing occurence of a symbol x in a sequence y of symbols.

$$I(j) = \begin{cases} 1, & y(j) = x \\ 0, & y(j) \neq x \end{cases}$$

The time response of the low-pass filter is extremely important for two reasons: bigger time constant provides more accurate steady-state estimation, while smaller time constant provides faster estimation. This problem is especially pronounced at the beginning of the adaptation, due to a lack of information. Instead of making a compromise in a fixed choice of a dominant pole of the low-pass filter, the variation of a dominant pole between minimum and maximum value is implemented.

Variables are input in the input block 3501. All variables within the histogram structure h are initialized in the initialization block 3502:

i is the histogram bin index, with values from 1 to imax.

imax is the maximum histogram bin index i of the non-zero histogram, in other words, imax is the total number of different symbols in the alphabet, and is preferably less or equal 32 for a magnitude histogram or is equal to 2 for a sign histogram.

$h.P[]$ is a string of cumulative probabilities $h.P[i] = $ $$P(y \mid y < i) = \sum_{y<i} p(y).$$

h.k is a reciprocal of an absolute dominant pole value of the low-pass filter. Its variation between h.kmin and h.kmax provides fast adaptation of a histogram after the start.

h.kmax is a reciprocal value of a minimum absolute dominant pole of the low-pass filter, and is a fixed empirical parameter with preferable value less than Total.

h.kmin is a reciprocal value of a maximum absolute dominant pole of the low-pass filter, and is a fixed parameter with preferable value h.kmin=2.

h.i is the total number of symbols within the histogram plus 1.

h.itmp is the temporary h.i before change of h.k.

Step size h.s is calculated in the processing block 3503, while the index i is initialized in the initialization block 3504. The histogram is initialized in the processing block 3505. The index i is incremented in the processing block 3506, and examined in the examination block 3507. The last histogram bin is initialized in the processing block 3508. The same histogram initialization is used in both the encoding probability estimator 26 and the decoding probability estimator 27.

Figure 36:
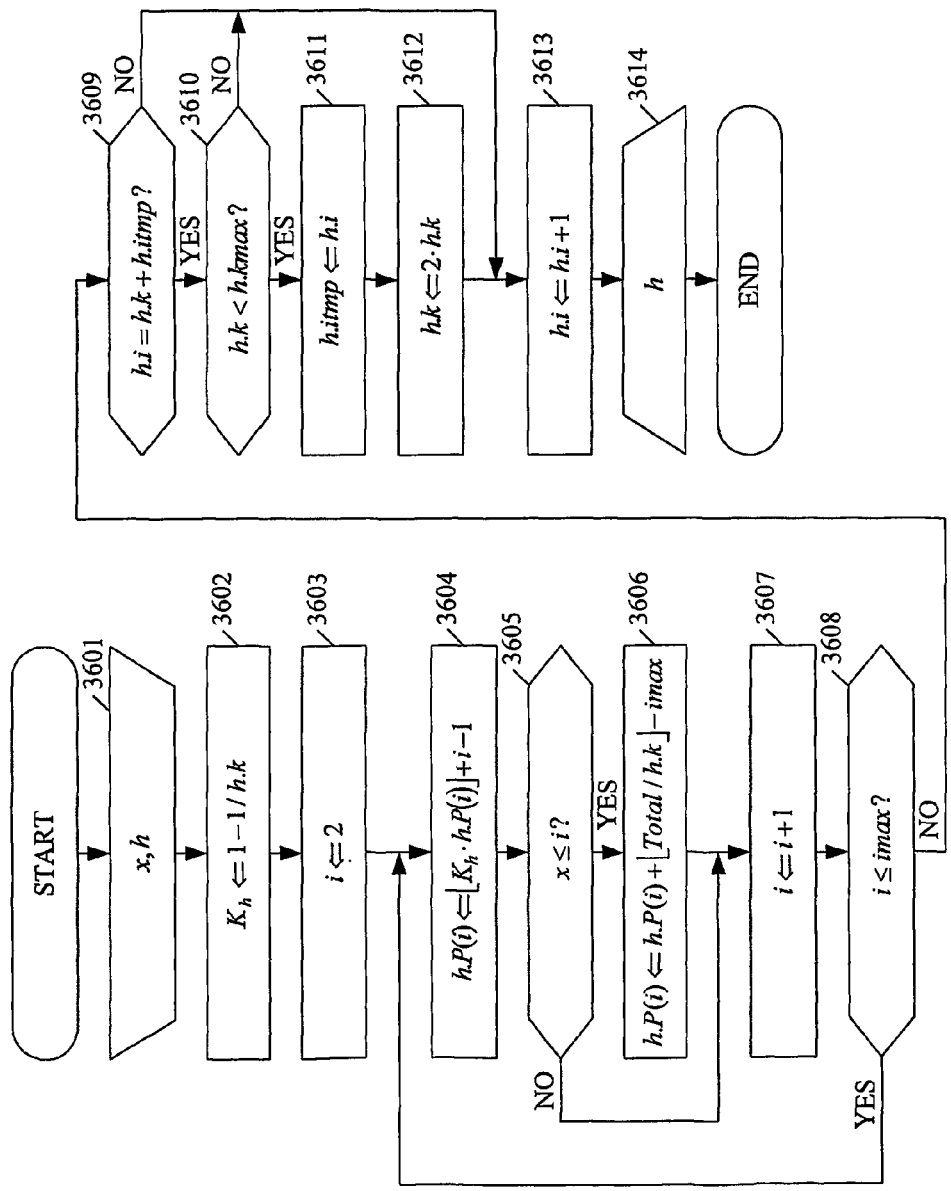
FIG. 36 is an update flowchart for histogram with fast adaptation.

FIG. 36 is an update flowchart for histogram with fast adaptation, based on the input of the symbol x and the already described histogram structure h, in the input block 3601. However, since both range encoder and range decoder cannot operate with estimated zero probability p(x)=0 even for non-occuring symbols, it is necessary to modify the binary sequence I(j). The modified probability Mp(x)=Total·p(x) is actually estimated in this invention using a fixed-point arithmetic, which is another reason for modifying the binary sequence I(j). Therefore, the adaption of the probability p(x) is actually performed by low-pass filtering of the modified binary sequence MI(j).

$$MI(j) = \begin{cases} \text{Total} - i\text{max}, & y(j) = x \\ 1, & y(j) \neq x \end{cases}$$

The maximum probability max p(x) and the minimum probability min p(x) become:

$$\max p(x) = \frac{\text{Total} - i\text{max}}{\text{Total}} < 1$$

$$\min p(x) = \frac{1}{\text{Total}} > 0$$

The preferable low-pass filter is first-order IIR filter defined as follows, where divide operation is avoided by keeping h.k to be the power of two during its variation.

$$Mp(x) \Leftarrow Mp(x) \cdot \left(1 - \frac{1}{h.k}\right) + MI(j)$$

Instead of modified probability Mp(x), a modified cumulative probability MP(x)=Total·P(x), i.e. a string of cumulative probabilities h.P[ ] is updated. The constant $K_h$, used for the fast adaptation of histograms, is initialized in the processing block 3602. The histogram bin index i is initialized in the initialization block 3603. Adding i−1 to the cumulative probability h.P[i] prescaled with $K_h$ in the processing block 3604 is equivalent to adding one to a number u(x). The update of the cumulative probability h.P[i] is performed in the processing block 3606 only for histograms with i higher than or equal to x, which probability is estimated, according to the examination block 3605. The index i is incremented in the processing block 3607, and examined in the examination block 3608.

Figure 37A:
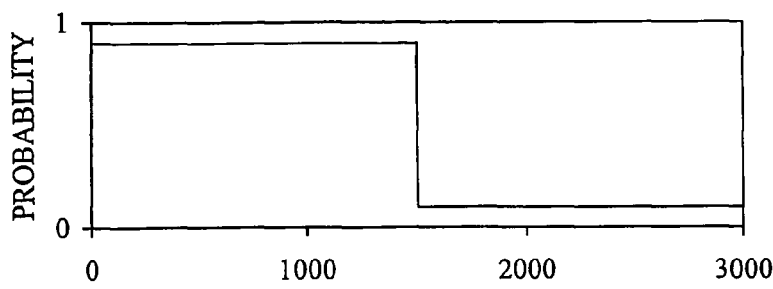
FIG. 37A illustrates one-dimensional probability function example with instantaneous jump and instantaneous fall, used for testing of histograms with fast adaptation.
Figure 37B:
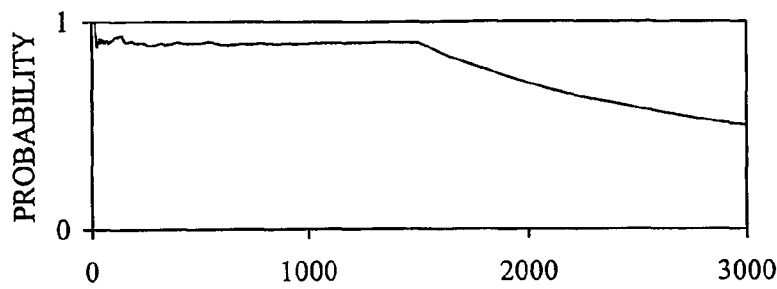
FIG. 37B illustrates one-dimensional estimated probability function, produced by the state-of-the-art probability estimation algorithm.
Figure 37C:
FIG. 37C illustrates one-dimensional estimated probability function, produced by the first embodiment of the probability estimation algorithm of this invention, but without fast adaptation of histograms.
Figure 37D:
FIG. 37D illustrates one-dimensional estimated probability function, produced by the second embodiment of the probability estimation algorithm of this invention, with fast adaptation of histograms.
Figure 37E:
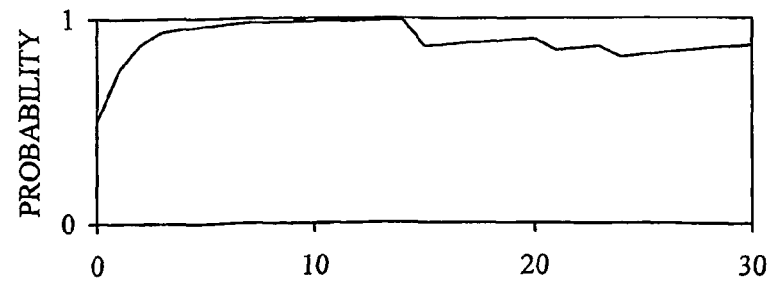
FIG. 37E illustrates close-up of one-dimensional estimated probability function, produced by the second embodiment of the probability estimation algorithm of this invention, with fast adaptation of histograms.

The second part of the histogram update algorithm is optional and especially designed for the fast adaptation of histograms. It consists of the examination block 3609, the examination block 3610, temporary save for the next update cycle in the processing block 3611, doubling of h.k in the processing block 3612, increment of the total number of symbols h.i within histogram h plus 1. The histogram structure h is output in the output block 3614. The mathematical equivalent of the second part of the histogram update algorithm is:

$h.k=\min\lfloor 2^{\lfloor \log2(h.i+h.kmin-2)\rfloor}, h.kmax \rfloor$ $h.k=\max(h.k, h.kmin)$, where h.kmin=2 preferably, which is important for the first h.k during the fast adaptation. Experimental results in FIG. 37A-37E confirmed substantial advantage of the described method for the fast adaptation of histograms, in comparison with state-of-the-art methods. Modifications of estimated probabilities are large at the beginning of the estimation process, and much smaller later, which enables the detection of small local probability variations. While the example from FIG. 37A shows extremely large change in comparison with reality, the fast adaptation to small local probability variations provides between 10% and 20% increase in the compression ratio on standard test images.

Figure 39:
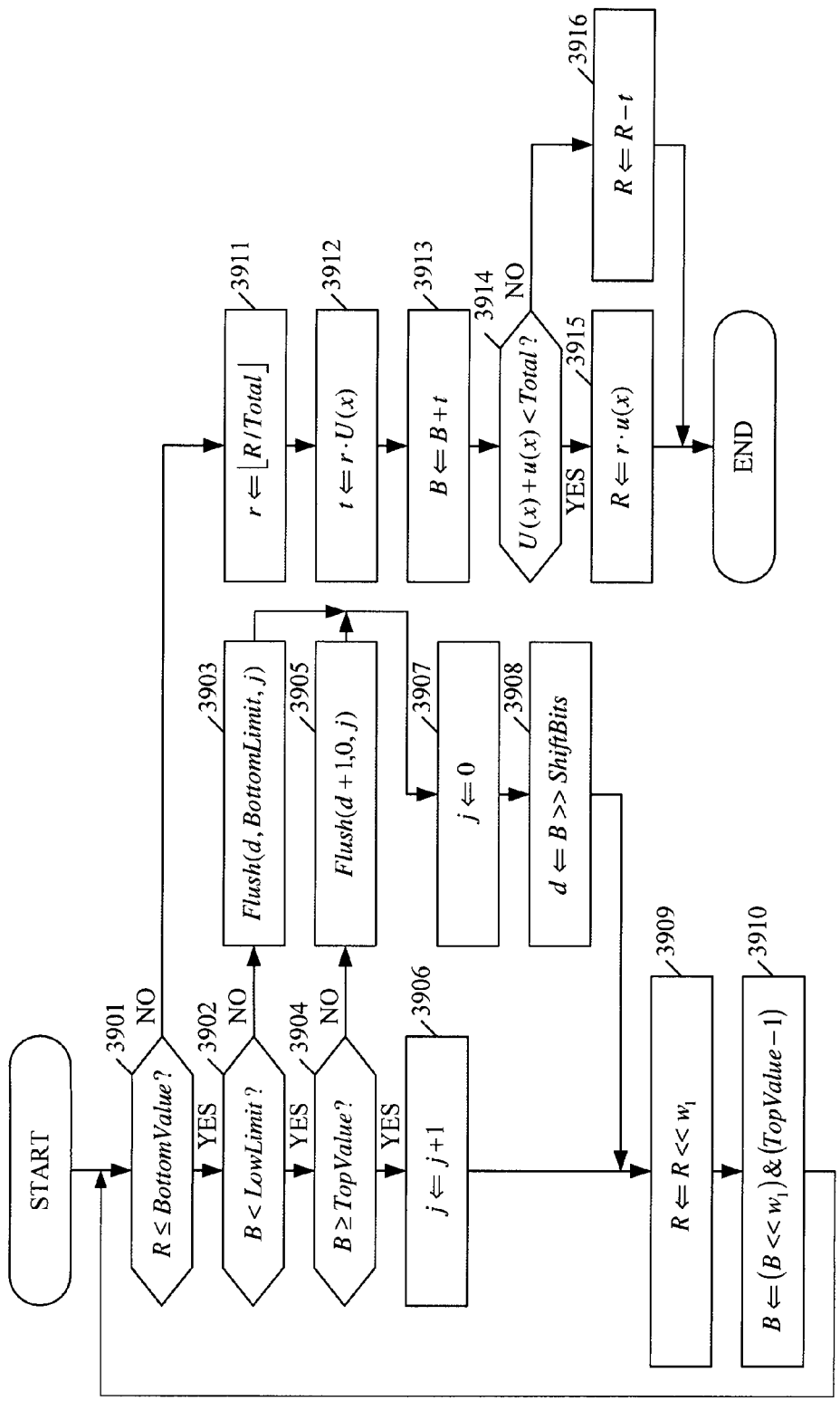
FIG. 39 and FIG. 40 are flowcharts of the state-of-the-art range encoder and the range decoder, respectively.

FIG. 39 is a flowchart of the state-of-the-art range encoder, which is together with the state-of-the-art range decoder called OLD CODER, as was disclosed in G. N. N. Martin. "Range encoding: and algorithm for removing redundancy from a digitised message," *Proc. Video & Data Recording Conf.*, Southampton, UK, Jul. 24-27, 1979; M. Schindler "A fast renormalization for arithmetic coding," *Poster at DDC, Data Compression Conf.*, Snowbird, Utah, Mar. 30-Apr. 1, 1998; and Internet location http://www.compressconsult.com/rangecoder/.

A symbol x will be encoded in the buffer of width $s=b^w$ as i:

$$i \in (\lfloor s \cdot P(x) \rfloor, \lfloor s \cdot (P(x) + p(x)) \rfloor]$$

$$\lfloor s \cdot P(x) \rfloor \leq i < \lfloor s \cdot (P(x) + p(x)) \rfloor$$

$$s \cdot P(x) + 1 \leq s \cdot (P(x) + p(x))$$

$$P(x) < \frac{i+1}{s} \leq P(x) + p(x).$$

The decoding is performed by the look-up table LUT:

$$x = LUT\left(\frac{i+1}{s}\right)$$

The coder state is represented with the following variables (d, j), [B, B+R):
B=Lower range limit;
R=Range R=T−B, instead of T=Upper range limit;
d=Output byte; and
j=Number of underflow bytes.

Floating-point range encoding algorithm after the renormalization and without checking boundary conditions is:
t⇐R·P(x); B⇐B+t; R⇐R·p(x).

Floating-point range decoding algorithm after the renormalization and without checking boundary conditions is:
t⇐B/R; x⇐LUT(t); t⇐R·P(x); B⇐B−t; R⇐R·p(x).

After introduction of the prescaled range r, the integer range encoding algorithm after the renormalization and without checking boundary conditions becomes:

$$r \Leftarrow \left\lfloor \frac{R}{\text{Total}} \right\rfloor; t \Leftarrow r \cdot U(x); B \Leftarrow B + t; R \Leftarrow r \cdot u(x).$$

After introducing prescaled range r, the integer range decoding algorithm after the renormalization and without checking boundary conditions becomes:

$$r \Leftarrow \left\lfloor \frac{R}{\text{Total}} \right\rfloor; t \Leftarrow \left\lfloor \frac{B}{r} \right\rfloor; x \Leftarrow LUTr(t); t \Leftarrow r \cdot U(x); B \Leftarrow B - t;$$

$$R \Leftarrow r \cdot u(x), \text{ where } LUTr(t \cdot \text{Total}) = LUTr\left(\frac{B}{r}\right) = LUT(t).$$

The state-of-the-art range encoder and decoder algorithms are described using the arithmetic operators borrowed from C/C++ language, like:
x<<y=shift x left for y bits;
x>>y=shift x right for y bits;
x%y=remainder of x/y;
x|y=x or y; and
x&y=x and y.

The constants TopValue, BottomValue, ShiftBits, ExtraBits, BottomLimit and LowLimit with the following preferable values are defined based on two constants $w_1$ and $w_2$, with preferable values 8 and 32, respectively.
TopValue=1<<($w_2$−1)=40000000h
BottomValue=TopValue>>$w_1$=00400000h
ShiftBits=$w_2$−$w_1$−1=23
ExtraBits=($w_2$−2)%$w_1$+1=4
BottomLimit=(1<<$w_1$)−1=0FFh.
LowLimit=BottomLimit<<ShiftBits Basic idea with ExtraBits is to consider B, T and s as fixed-point values, with ExtraBits bits after the decimal point. This modification has been made primarily because of the decoder, where choosing ExtraBits in the range (1, $w_1$) instead of more common range (0, $w_1$−1) reduces the complexity of the algorithm. Otherwise, an additional examination block would be needed for testing zero value of ExtraBits. Before range encoding is started, the following variables must be initialized:
B=0
R=TopValue
d=0
j=0

FIG. 38 is a flowchart of the state-of-the-art flush procedure, which outputs byte d in the output block 3801, initializes the loop counter i in the initialization block 3802, within the loop tests i in the examination block 3803, outputs j bytes o in the output block 3804, and increments i in the processing block 3805.

The first part of the range encoding algorithm shown in FIG. 39 performs renormalization before encoding, according to the examination block 3901. In case of a range with possible carry in the examination block 3902, first flush procedure 3903 defined in FIG. 38 outputs byte d and all underflow bytes 0FFh. In case of a range with the actual carry in the examination block 3904, flush procedure 3905 outputs byte d+1 and all underflow bytes 0h, since 0FFh becomes 0h due to the carry. In both cases after flush procedures, the number of underflow bytes j is initialized in the processing block 3907 and the output byte d is generated in the processing block 3908, by assigning high byte of B. R is updated in the processing block 3909 by shifting byte which was already output or is going to be output in case of 0FFh. B is updated in the processing block 3910 by shifting and clearing the carry. Otherwise, j is incremented in the processing block 3906.

The second part of the range encoding algorithm shown in FIG. 39 updates the range. Prescaled range r for all symbols is updated in the processing block 3911 using the first division operation. The range t of the current symbol is derived by the first multiplication operation with U(x) for the current symbol x in the processing block 3912. B is updated in the processing block 3913. According to the examination block 3914, R is updated by the second multiplication operation with the u(x) for the current symbol x in the processing block 3915, for all symbols except the last one. In case of the last symbol, R is updated by the subtraction operation in the processing block 3916.

Number of iterations in this loop is in the worst case $\log_b(s)$ and decreases by choosing larger b. This is the main advantage of state-of-the-art range coder over state-of-the-art arithmetic coders. For $s=2^{31}$, an arithmetic coder uses b=2, while a range coder uses $b=2^8=256$. Therefore, in the worst case, an arithmetic coder needs 32 iterations per each symbol, while a range coder needs only 4 iterations. Furthermore, the first set bit of the range need not be on a fixed position. State-of-the-art binary arithmetic coders more often require renormalization of the range in comparison with the state-of-the-art range coder, thus decreasing the execution speed almost twice.

This fact is illustrated in TABLE 15 for the range coder and TABLE 16 for the arithmetic coder, which shows the encoding of the same input sequence 00001123000, with the unconditional probabilities of the symbols of P(0)=50/100, P(1)=25/100, P(2)=15/100 and P(3)=10/100. However, due to the coder delay, up to 2 more bits will be emitted latter in case of the arithmetic coder, and up to 8 more bits will be emitted later in case of the range coder.

TABLE 15

RANGE CODER

| Event | Bottom | Top | Range | Out (binary) |
|---|---|---|---|---|
| Initial | 0 | 2147483648 | 2147483648 | |
| Symbol (0) | 0 | 1073741800 | 1073741800 | |
| Symbol (0) | 0 | 536870900 | 536870900 | |
| Symbol (0) | 0 | 268435450 | 268435450 | |
| Symbol (0) | 0 | 134217700 | 134217700 | |
| Symbol (1) | 67108850 | 100663275 | 33554425 | |
| Symbol (1) | 83886050 | 92274650 | 8388600 | |
| Renormalization | 2147475968 | 4294957568 | 2147481600 | 00000000 (ignored) |
| Symbol (2) | 3758087168 | 4080209408 | 322122240 | |
| Symbol (3) | 4047997148 | 4080209368 | 32212220 | |
| Symbol (0) | 4047997148 | 4064103248 | 16106100 | |
| Symbol (0) | 4047997148 | 4056050198 | 8053050 | |
| Renormalization | 1200151552 | 3261732352 | 2061580800 | 00001010 |
| Symbol (0) | 1200151552 | 2230941952 | 1030790400 | |

Figure 40:
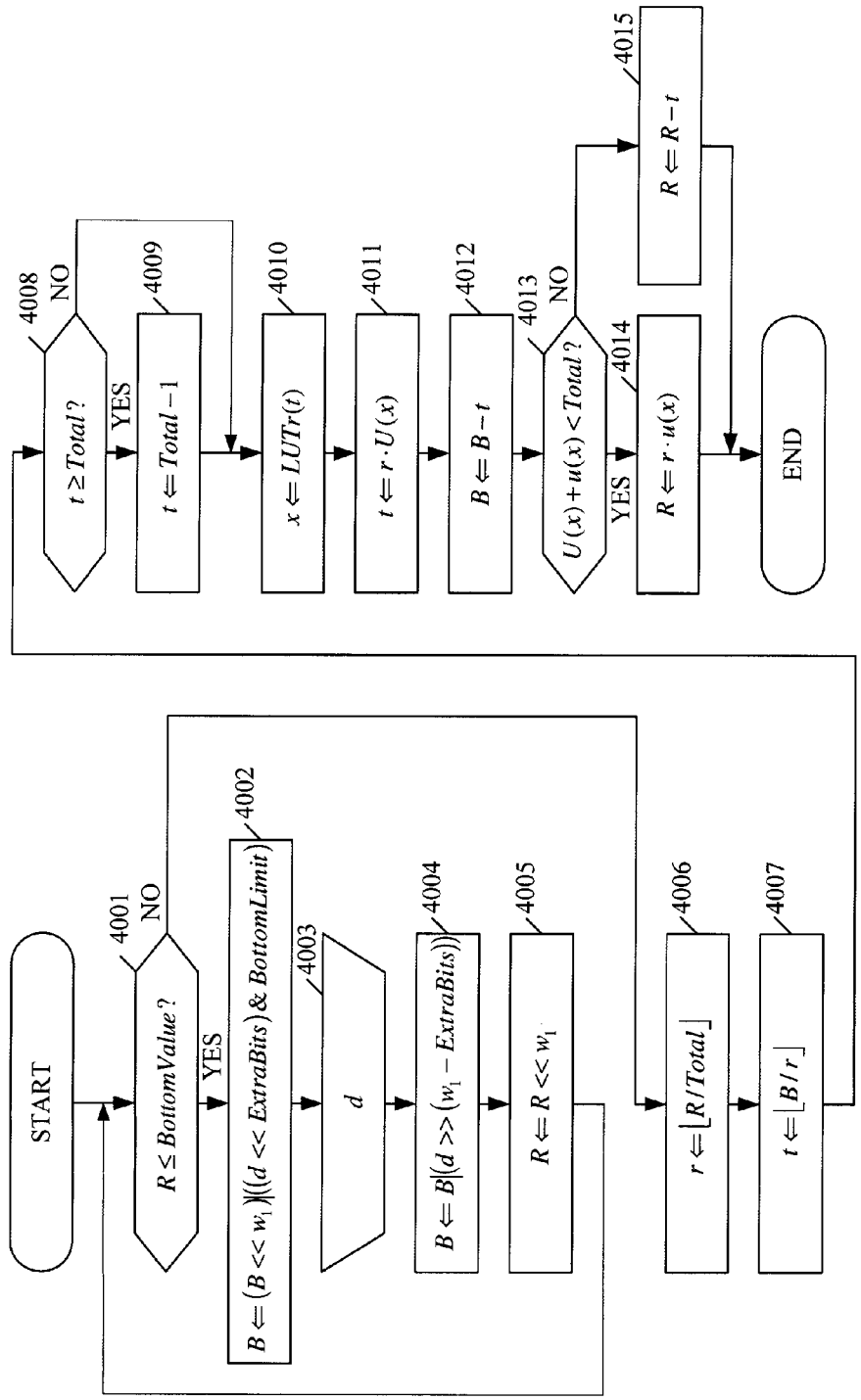

FIG. 40 is a flowchart of the state-of-the-art range decoder, which is together with the state-of-the-art range encoder called OLD CODER. Digits of the symbol x in base b from the input buffer are input. First 2·$w_1$–ExtraBits bits are ignored, according to the concept of ExtraBits. In our case, the first byte is a dummy one. Before range decoding is started, the following variables must be initialized:

B=d>>($w_1$–ExtraBits)
R=1<<ExtraBits

The first part of the range decoding algorithm shown in FIG. 40 performs renormalization before decoding, according to the examination block 4001. The appropriate bits are written into B in the processing block 4002. New symbol d is input in the input block 4003. B is updated in the processing block 4004 by shifting. R is updated in the processing block 4005 by shifting.

TABLE 16

ARITHMETIC CODER

| Event | B | T | R | Out (binary) |
|---|---|---|---|---|
| Initial | 0 | 2147483648 | 2147483648 | |
| Symbol (0) | 0 | 1073741800 | 1073741800 | |
| Symbol (0) | 0 | 536870900 | 536870900 | |
| Renormalization | 0 | 1073741800 | 1073741800 | 0 (ignored) |
| Symbol (0) | 0 | 536870900 | 536870900 | |
| Renormalization | 0 | 1073741800 | 1073741800 | 0 |
| Symbol (0) | 0 | 536870900 | 536870900 | |
| Renormalization | 0 | 1073741800 | 1073741800 | 0 |
| Symbol (1) | 536870900 | 805306350 | 268435450 | |
| Renormalization | 1073741800 | 1610612700 | 536870900 | 0 |
| Renormalization | 1073741776 | 2147483576 | 1073741800 | |
| Symbol (1) | 1610612676 | 1879048126 | 268435450 | |
| Renormalization | 1073741704 | 1610612604 | 536870900 | 10 |
| Renormalization | 1073741584 | 2147483384 | 1073741800 | |
| Symbol (2) | 1879047934 | 2040109204 | 161061270 | |

TABLE 16-continued

ARITHMETIC CODER

| Event | B | T | R | Out (binary) |
|---|---|---|---|---|
| Renormalization | 1610612220 | 1932734760 | 322122540 | 10 |
| Renormalization | 1073740792 | 1717985872 | 644245080 | 1 |
| Symbol (3) | 1653561292 | 1717985792 | 64424500 | |
| Renormalization | 1159638936 | 1288487936 | 128849000 | 1 |
| Renormalization | 171794224 | 429492224 | 257698000 | 1 |
| Renormalization | 343588448 | 858984448 | 515396000 | 0 |
| Renormalization | 687176896 | 1717968896 | 1030792000 | 0 |
| Symbol (0) | 687176896 | 1202572896 | 515396000 | |
| Renormalization | 300611968 | 1331403968 | 1030792000 | |
| Symbol (0) | 300611968 | 816007968 | 515396000 | |
| Renormalization | 601223936 | 1632015936 | 1030792000 | 01 |
| Symbol (0) | 601223936 | 1116619936 | 515396000 | |

The second part of the range decoding algorithm shown in FIG. 40 updates the range. Prescaled range r for all symbols is updated in the processing block 4006 using the first division operation. The cumulative number of occurrences t of the current symbol is derived by the second division operation in the processing block 4007. The limitation of t is performed using the examination block 4008 and the processing block 4009. After finding the symbol x based on t in the processing block 4010, t is prescaled in the processing block 4011. B is updated in the processing block 4012. According to the examination block 4013, R is updated by the second multiplication operation with u(x) for the current symbol x in the processing block 4014, for all symbols except the last one. In case of the last symbol, R is updated by the subtraction operation in the processing block 4015. After all data is decoded, a final renormalization is made.

In the state-of-the-art range encoder and the range decoder it is possible to implement first division operation by Total with the shift right for $w_3$ bits in case when Total=$2^{w_3}$, as provided by the encoding probability estimator 26. Unfortunately, the second division operation in the processing block 4007 from FIG. 40 cannot be removed, which significantly increase the complexity of the decoding processor, since most state-of-the-art digital signal processors (DSPs) do not support division operation. Additionally, there are two multiplication operations in both the encoder 30 and the decoder 31 per each symbol of the compressed image 18, which decrease the processing speed in general-purpose microprocessors. These drawbacks were eliminated in both the range encoder and the range decoder of this invention.

Figure 41A:
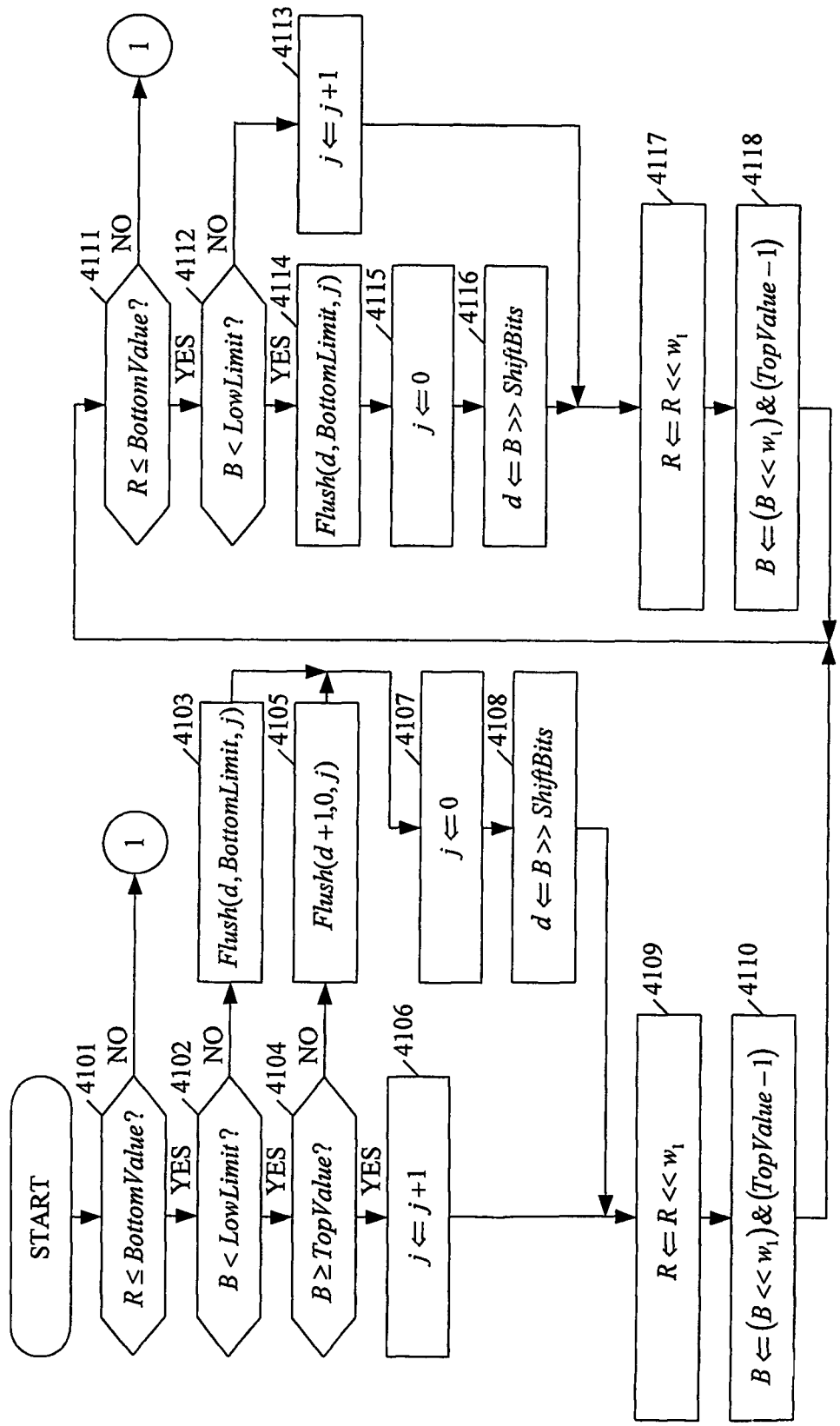
FIG. 41A,B and FIG. 42 are flowcharts of the range encoder and the range decoder of this invention, without division operations and optionally, without multiplication operations.

FIG. 41A and FIG. 41B are flowcharts of the range encoder of this invention, without division operations and optionally, without multiplication operations. The first division operation by Total=$2^{w_3}$ in the processing block 3911 in FIG. 39 is implemented by the shift right for $w_3$ bits in the processing block 4119 in FIG. 41B, thanks to the fast adaptation of histograms of this invention. The representation of r=V·$2^l$ according to this invention is performed in the processing block 4120 in FIG. 41B. The first multiplication operation in the processing block 3912 in FIG. 39 is implemented by the first multiplication operation with small number V and shift left for l bits in the processing block 4121 in FIG. 41B. The second multiplication operation in the processing block 3915 in FIG. 39 is implemented by the second multiplication operation with small number V and shift left for l bits in the processing block 4124 in FIG. 41B. Both first and second multiplication are simplified due to less number of bits in V. Furthermore, the multiplication operation with small odd numbers V=3 or V=5 can be implemented by the combination of shift and add operations, which is faster than a multiplication operation in a general-purpose microprocessor, thus completely removing multiplication operations. Naturally, in case of a DSP, processing block 4120 is skipped, while processing blocks 4121 and 4124 contain ordinary multiplication.

The first part of the state-of-the-art range encoding algorithm shown in FIG. 39 performing renormalization before encoding, can be directly utilized in the range encoder of this invention. However, the decoupling of the processing blocks from 3901 to 3910 in FIG. 39 into two groups of the processing blocks: first group consisting of the processing blocks from 4101 to 4110 in FIG. 41A and the second group consisting of the processing blocks from 4111 to 4118 in FIG. 41A, which actually perform processing loop, increase processing speed even further, due to the elimination of the examination block appropriate to the examination block 4104 from the second group of the processing blocks in FIG. 41A.

Figure 42:
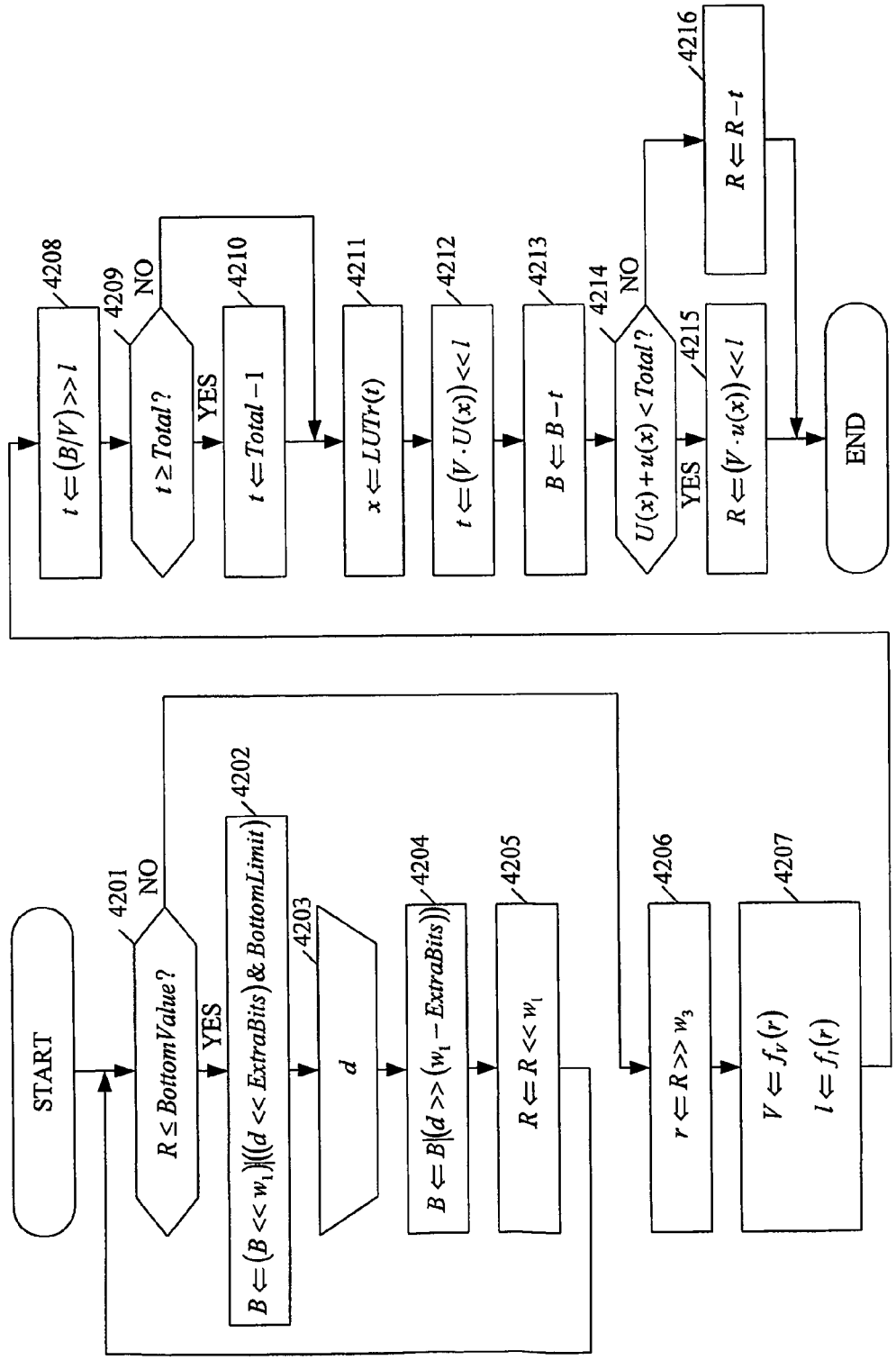

FIG. 42 is a flowchart of the range decoder of this invention, without division operations and optionally, without multiplication operations. The first division operation by Total=$2^{w_3}$ in the processing block 4006 in FIG. 40 is implemented by the shift right for $w_3$ bits in the processing block 4206 in FIG. 42, thanks to the fast adaptation of histograms of this invention. The representation of $r=V \cdot 2^l$ according to this invention is performed in the processing block 4207 in FIG. 42, similarly to the range encoder of this invention. The first multiplication operation in the processing block 4011 in FIG. 40 is implemented by the first multiplication operation with small number V and shift left for l bits in the processing block 4212 in FIG. 42. The second multiplication operation in the processing block 4014 in FIG. 40 is implemented by the second multiplication operation with small number V and shift left for l bits in the processing block 4215 in FIG. 42. Furthermore, the multiplication operation with small odd numbers V=3 or V=5 can be implemented by the combination of shift and add operations, which is faster than a multiplication operation in a general-purpose microprocessor, thus completely removing multiplication operations. Naturally, in case of a DSP, processing blocks 4212 and 4215 contain ordinary multiplication.

The second division operation by γ in the processing block 4007 in FIG. 40 is implemented by the division operation with small number V and shift right for l bits in the processing block 4208 in FIG. 42. The division operation by constant small odd numbers (3, 5, 9, 11, 13, 15) can be implemented with one multiplication and one right shift operations, as disclosed in D. J. Magenheimer et al., "Integer multiplication and division on the HP precision architecture," *IEEE Trans. Computers*, Vol. 37, No. 8, p. 980-990, August 1988; and T. Granlud et al. "Division by invariant integers using multiplication," SIGPLAN Notices, Vol. 29, No. 6, p. 61, June 1994, according to TABLE 17. Specially, division operation by 7 is the most complex, since it requires the addition operation of 049240249h and the addition operation with carry and 0h (ADC with 0h), between the multiplication and the right shift operations shown in the TABLE 17.

TABLE 17

| DIVIDE BY [DECIMAL NUMBER] | MULTIPLY BY [HEXADECIMAL NUMBER] | RIGHT SHIFT FOR [BINARY DIGITS] |
|---|---|---|
| 3 | 0AAAAAAAB | 1 |
| 5 | 0CCCCCCCD | 2 |
| 7 | 049249249 | 1 |
| 9 | 038E38E39 | 1 |
| 11 | 0BA2E8BA3 | 3 |

TABLE 17-continued

| DIVIDE BY [DECIMAL NUMBER] | MULTIPLY BY [HEXADECIMAL NUMBER] | RIGHT SHIFT FOR [BINARY DIGITS] |
|---|---|---|
| 13 | 04EC4EC4F | 2 |
| 15 | 088888889 | 3 |

It should be noticed however, that the approximations used in this invention lead to smaller compression ratio. For example, maximum possible approximation error is achieved by fixing V=1 and thus completely removing all division and multiplication operations. In that case the compression ratio is decreased by less than 5%. If V is allowed to be 1 or 3, the compression ratio is decreased by less than 1%. TABLE 18 and TABLE 19 depict the difference in a number of multiplication and division operations per encoded and decoded symbol between the state-of-the-art range coder (OLD CODER) and the range coder of this invention (NEW CODER).

TABLE 18

Total ≠ $2^{w_3}$

| | | | NEW CODER $r = V \cdot 2^l$ | | |
|---|---|---|---|---|---|
| DEVICE TYPE | OPERATION TYPE | OLD CODER | V = 1 | V = 3 V = 5 | V ≧ 7 |
| ENCODER | MULTIPLY | 2 | 0 | 0 | 2 |
|  | DIVIDE | 1 | 1 | 1 | 1 |
| DECODER | MULTIPLY | 2 | 0 | 1 | 3 |
|  | DIVIDE | 2 | 1 | 1 | 1 |

TABLE 19

Total = $2^{w_3}$

| | | | NEW CODER $r = V \cdot 2^l$ | | |
|---|---|---|---|---|---|
| DEVICE TYPE | OPERATION TYPE | OLD CODER | V = 1 | V = 3 V = 5 | V ≧ 7 |
| ENCODER | MULTIPLY | 2 | 0 | 0 | 2 |
|  | DIVIDE | 0 | 0 | 0 | 0 |
| DECODER | MULTIPLY | 2 | 0 | 1 | 3 |
|  | DIVIDE | 1 | 0 | 0 | 0 |

INDUSTRIAL APPLICABILITY

The communication method employing compression and decompression of this invention provides:
 Unified lossy and lossless compression;
 Still image and video intraframe (I-frame) compression;
 Symmetrical encoding & decoding time;
 Color and gray-scale image compression;
 Direct support for 4:4:4 and 4:2:2 YUV formats; and
 Integer arithmetic.
The novelty of this invention comprises:
 Direct and inverse non-stationary filters for the subband transformation;
 Simple context modeling for the sign and the magnitude of transformation coefficients;
 Fast adaptation of histograms for the symbol probability estimation;
 Range coder without division operations; and
 Significant reduction or the complete elimination of the synchronization buffers.

This invention eliminates the following drawbacks of state-of-the-art methods:
- Necessity for blocks, tiles or frames for low-memory performance;
- Blocky artifacts;
- Motion artifacts;
- Slow multiplication and division operations in general-purpose microprocessors;
- Absence of division operation in digital signal processors; and
- Slow execution of the arithmetic coder.

Typical experimental compression ratio (CR) is:
- >3:1 lossless;
- >100:1 visually lossless;
- >400:1 visually lossless for large images and preprints;
- >1000:1 slightly annoying;
- Perceived quality higher than full-frame JPEG2000; and
- PSNR higher or equal to full-frame JPEG2000.

Useful intraframe compression ratio is order of magnitude higher than in MPEG-4. Since no motion compensation is used in this invention, video (interframe) compression ratio is lower than in MPEG-4 for almost still images in video-conferencing applications. However, useful video compression ratio is higher than in MPEG-4 for medium and fast changing scenes for better perceived image quality.

This invention provides smallest encoding time (extended TABLE 20):
- 1.7 ... 9.3 times smaller than JPEG;
- 26 ... 152* times smaller than JPEG2000 without tiles (full frame);
- 31 ... 183 times smaller than JPEG2000 with 128×128 tiles; and
- 252 ... 1659 times smaller than JPEG2000 with 32×32 tiles.

This invention provides smallest decoding time (extended TABLE 21):
- 1.6 ... 4.3 times smaller than JPEG;
- 11 ... 105* times smaller than JPEG2000 without tiles (full frame);
- 8 ... 82 times smaller than JPEG2000 with 128×128 tiles; and
- 57 ... 1682 times smaller than JPEG2000 with 32×32 tiles.

This invention provides smallest encoding memory buffer (extended TABLE 22):
- 37 ... 2357 times smaller than JPEG;
- 276 ... 14839* times smaller than JPEG2000 without tiles (full frame);
- 94 ... 1433 times smaller than JPEG2000 with 128×128 tiles; and
- 76 ... 1419 times smaller than JPEG2000 with 32×32 tiles.

This invention provides smallest decoding memory buffer (extended TABLE 23):
- 32 ... 1416 times smaller than JPEG;
- 193 ... 13414* times smaller than JPEG2000 without tiles (full frame);
- 70 ... 1430 times smaller than JPEG2000 with 128×128 tiles; and
- 52 ... 1509 times smaller than JPEG2000 with 32×32 tiles.

All measurements have been made using standard set images and non-optimized C++ CIFF code (CIFF version 1.0), C++ JPEG code (The Independent JPEG Group's release 6b) and C++

All measurements have been made using standard set images and non-optimized C++ CIFF code (CIFF version 1.0), C++ JPEG code (The Independent JPEG Group's release 6b) and C++ JPEG2000 code (JasPer version 1.500.4.) with XP1800+ microprocessor and CR=20 ... 350. The asterisk (*) denotes lack of memory in a computer with 1GB system memory.

TABLE 20

ENCODING TIME [s]

| IMAGE (W × H × C) | CIFF (this invention) | JPEG | JPEG2000 without tiles | JPEG2000 128 × 128 tiles | JPEG2000 32 × 32 tiles |
|---|---|---|---|---|---|
| 256 × 256 × 1 | 0.01 | 0.03 | 0.36 | 0.43 | 4.05 |
| 512 × 512 × 1 | 0.02 | 0.10 | 1.40 | 1.85 | 16.74 |
| 768 × 512 × 3 | 0.04 | 0.18 | 2.24 | 3.42 | 27.04 |
| 1920 × 1080 × 3 | 0.26 | 0.93 | 11.73 | 18.28 | 132.62 |
| 2048 × 2560 × 3 | 0.82 | 2.41 | 40.51 | 47.28 | 354.50 |
| 6563 × 3890 × 3 | 4.62 | 11.40 | 153.40 | 218.49 | 1605.87 |
| 10000 × 3543 × 3 | 9.08 | 15.77 | * | 282.86 | 2291.04 |

TABLE 21

DECODING TIME [s]

| IMAGE (W × H × C) | CIFF (this invention) | JPEG | JPEG2000 without tiles | JPEG2000 128 × 128 tiles | JPEG2000 32 × 32 tiles |
|---|---|---|---|---|---|
| 256 × 256 × 1 | 0.01 | 0.03 | 0.11 | 0.14 | 0.58 |
| 512 × 512 × 1 | 0.02 | 0.05 | 0.87 | 0.50 | 2.33 |
| 768 × 512 × 3 | 0.05 | 0.12 | 1.06 | 0.74 | 3.49 |
| 1920 × 1080 × 3 | 0.27 | 0.61 | 5.51 | 3.96 | 21.44 |
| 2048 × 2560 × 3 | 0.84 | 1.52 | 21.29 | 10.26 | 87.46 |
| 6563 × 3890 × 3 | 4.90 | 10.22 | 96.26 | 154.05 | 1669.44 |
| 10000 × 3543 × 3 | 9.30 | 14.47 | * | 218.60 | 3120.67 |

TABLE 22

ENCODING MEMORY BUFFER SIZE [KB]

| IMAGE (W × H × C) | CIFF (this invention) | JPEG | JPEG2000 without tiles | JPEG2000 128 × 128 tiles | JPEG2000 32 × 32 tiles |
|---|---|---|---|---|---|
| 256 × 256 × 1 | 8 | 376 | 3136 | 1612 | 1220 |
| 512 × 512 × 1 | 12 | 1352 | 10232 | 2196 | 1796 |
| 768 × 512 × 3 | 28 | 2412 | 15284 | 2628 | 2220 |
| 1920 × 1080 × 3 | 72 | 12364 | 78588 | 7560 | 7156 |
| 2048 × 2560 × 3 | 80 | 30940 | 194976 | 16896 | 16476 |
| 6563 × 3890 × 3 | 260 | 150620 | 858620 | 76300 | 75884 |

TABLE 23

DECODING MEMORY BUFFER SIZE [KB]

| IMAGE (W × H × C) | CIFF (this invention) | JPEG | JPEG2000 without tiles | JPEG2000 128 × 128 tiles | JPEG2000 32 × 32 tiles |
|---|---|---|---|---|---|
| 256 × 256 × 1 | 8 | 252 | 2268 | 1048 | 692 |
| 512 × 512 × 1 | 12 | 844 | 7764 | 1648 | 1272 |
| 768 × 512 × 3 | 28 | 2416 | 11420 | 2068 | 1668 |
| 1920 × 1080 × 3 | 72 | 12388 | 58436 | 7028 | 6936 |
| 2048 × 2560 × 3 | 80 | 30964 | 146636 | 16372 | 16848 |
| 6563 × 3890 × 3 | 260 | 150644 | 712140 | 76008 | 80180 |
| 10000 × 3543 × 3 | 380 | 208724 | * | 105144 | 111068 |

Speed measurements for encoders have been started after an input uncompressed image 10 had been read from a hard drive to the system memory, and stopped after an output compressed image 18 had been stored in the output compressed buffer 32. Speed measurements for decoders have been started after an input compressed image 19 had been read from a hard drive to the input compressed buffer 33, and stopped after an output uncompressed image 11 had been stored in the system memory. The size of system memory required for a program code, an input uncompressed image 10, an output compressed image 18, an input compressed image 19 and an output uncompressed image 11 have not been accounted in TABLE 22 and TABLE 23, leaving only memory size actually required by compression/decompression methods.

This invention implemented in hardware provides the following features:
Lowest cost;
Ultra-low power;
Very low complexity;
Absence of multipliers and dividers;
Integer arithmetic;
Small integrated memory; and
Ultra-fast encoding & decoding.

Data compression has wide areas of applications, which are listed further.

Computer applications are: desktop, laptop, server, PDA, set-top box, scanner, printer, etc.

Software applications are: Web browsers, electronic commerce, desktop publishing, multimedia electronic mail, games, video help for applications, interactive imagery, etc.

Mobile phone applications are: 3G and 2.5G mobile phones, video-streaming, video-conferencing, digital camera, multimedia messaging service, single and multi-player video games, etc.

TV applications are: video-on-demand, digital TV, high-definition TV, cable TV, digital video broadcast, direct satellite system, etc.

Movie applications are: digital cinema release copy, digital cinema archive, digital cinema edit master, CDROM with movie, future "DVD" format, digital video cassette, etc.

Consumer applications are: digital video camera, digital still camera, video-conferencing, videophone, color facsimile, electronic newspaper, etc.

Professional applications are: video surveillance, dynamic advertising, remote sensing, space imaging, interactive multimedia database, digital library and archive, etc.

Medical applications are: mammography, computerized tomography, magnetic resonance imaging, ultrasonography, X-radiography, telemedicine, etc.

Compression of medical images is typically used as an example of lossless compression. However, this invention provides very high lossy compression ratio of medical images with negligible subjective and objective difference between uncompressed and decompressed image, which was experimentally confirmed by applying a specialized image processing software for a digital mammography with the same results on both uncompressed and decompressed images up to the compression ratio of 850.

This invention at any compression ratio provides higher or the same perceived and measured quality of the decompressed image in comparison with best state-of-the-art compression methods (JPEG2000, JPEG, MPEG-4, MPEG-2, MPEG-1 and C. Chrysafis' papers).

The fast codec embodied in software can be stored in a storage medium, such as compact disc (CD), digital versatile disc (DVD), optical disc, floppy disk, hard disk, magnetic tape, dynamic random access memory (DRAM), static random access memory (SRAM), flash memory, electrically erasable programmable read only memory (EEPROM), erasable programmable read only memory (EPROM), read only memory (TOM), ferromagnetic memory, ferroelectric memory, optical storage, charge coupled devices (CCD), smart cards, etc.

Although the preferred embodiments of this invention are described and illustrated, those skilled in the art can perform various modifications and design equivalents of this invention, which was already emphasized using several examples. This invention is intended to cover all such alternatives and modifications within the scope of the following claims.

We claim:
1. A fast encoder for compressing input data into output compressed data, comprising:
a plurality of single-level direct subband transformers, the plurality of single-level direct subband transformers for receiving and transforming input data to produce transformation coefficients;
a plurality of processing means, each of the plurality of processing means directly coupled to at least a respective one of the plurality of single-level direct subband transformers, each of the plurality of processing means selected from a group consisting of: pass-through means for lossless processing and quantizer means for lossy processing, for directly receiving and processing respective transformation coefficients to produce processed transformation coefficients;
a plurality of encoding probability estimators, each of the plurality of encoding probability estimators coupled to at least a respective one of the plurality of processing means, for receiving respective processed transformation coefficients and estimating probabilities of symbols within contexts of transformation coefficients to produce the probabilities of symbols within the contexts of transformation coefficients;
a plurality of entropy encoders, each of the plurality of entropy encoders coupled to at least a respective one of the plurality of encoding probability estimators, for receiving and entropy encoding respective processed transformation coefficients using respective probabilities of symbols within respective contexts of transformation coefficients to produce encoded data; and
an output compressed buffer coupled to the plurality of entropy encoders, for receiving and substantially synchronizing the encoded data from each of the plurality of entropy encoders to produce output compressed data.

2. The fast encoder of claim 1, further comprising:
at least one synchronization memory coupled to at least one of the plurality of entropy encoders, for receiving and substantially synchronizing the encoded data from the at least one of the plurality of entropy encoders to produce synchronized compressed data;
wherein the output compressed buffer is further coupled to at least one of said at least one synchronization memory, for receiving and buffering synchronized compressed data to produce the output compressed data.

3. The fast encoder of claim 1, further comprising:
at least one color space converter for converting an original input image to produce the input data.

4. The fast encoder of claim 1, wherein:
a first of said plurality of single-level direct subband transformers is coupled to receive and transform the input data to produce transformation coefficients; and
each other of said plurality of single-level direct subband transformers is coupled to receive and transform selected transformation coefficients to produce transformed transformation coefficients.

5. The fast encoder of claim 4, wherein selected transformation coefficients are low-pass transformed for one-dimensional input data.

6. The fast encoder of claim 4, wherein selected transformation coefficients are low-pass transformed both horizontally and vertically for two-dimensional input data.

7. The fast encoder of claim 1, wherein said plurality of single-level direct subband transformers comprises:
at least one direct filter for horizontal filtering; and
at least one direct filter for vertical filtering.

8. The fast encoder of claim 7, wherein said at least one direct filter for horizontal filtering is different from said at least one direct filter for vertical filtering.

9. The fast encoder of claim 7, wherein at least one of said at least one direct filter for horizontal filtering and said at least one direct filter for vertical filtering comprises at least one direct non-stationary filter.

10. The fast encoder of claim 1, wherein said plurality of single-level direct subband transformers comprises at least one direct filter for filtering.

11. The fast encoder of claim 10, wherein said at least one direct filter comprises at least one direct non-stationary filter.

12. The fast encoder of claim 11, wherein said at least one direct non-stationary filter comprises a plurality of serially coupled direct non-stationary filter cells.

13. The fast encoder of claim 12, wherein each said direct non-stationary filter cell comprises:
a filter device;
a filter cell input x coupled to said filter device;
a filter cell output y coupled to said filter device;
a first switch and a second switch coupled to said filter device, having a plurality of controllable positions; and
a clock input c coupled to control said first switch and said second switch, for providing a non-stationarity of said direct non-stationary filter cell.

14. The fast encoder of claim 13, wherein:
said first switch is in a first position for horizontal filtering of each second pixel and in a second position for horizontal filtering of other pixels; and
said second switch is in a second position for horizontal filtering of each second pixel and in a first position for horizontal filtering of other pixels.

15. The fast encoder of claim 13, wherein:
said first switch is in a first position for vertical filtering of each second line and in a second position for vertical filtering of other lines; and
said second switch is in a second position for vertical filtering of each second line and in a first position for vertical filtering of other lines.

16. The fast encoder of claim 13, wherein each said direct non-stationary filter further comprises:
a first gain multiplier;
a second gain multiplier; and
a selection switch, having a plurality of positions controlled by said clock input c, wherein
an output of said plurality of serially coupled direct non-stationary filter cells is coupled to an input of said first gain multiplier, for multiplying said output with a first gain number to produce a first result;
an output of said plurality of serially coupled direct non-stationary filter cells is coupled to an input of said second gain multiplier, for multiplying said output with a second gain number to produce a second result;
an output of said direct non-stationary filter is coupled to an output of said first gain multiplier for said selection switch in the first position; and
an output of said direct non-stationary filter is coupled to an output of said second gain multiplier for said selection switch in the second position.

17. The fast encoder of claim 13, wherein said filter device comprises:
at least one delay element $z^{-w}$;
a plurality of multipliers $K_1[0], K_1[1], \ldots, K_1[k-1], K_2[k-1], K_2[k-2], \ldots, K_2[0]$; and
a plurality of adders, wherein:
an output of each even indexed said delay element $z^{-w}$ is coupled to an input of subsequent odd indexed said delay element $z^{-w}$;
an output of each odd indexed said delay element $z^{-w}$ is coupled to an input of subsequent even indexed said delay element $z^{-w}$;
the output of each even indexed said delay element $z^{-w}$ is coupled to an input of at least one of said plurality of multipliers $K_1[0], K_1[1], \ldots, K_1[K-1]$;
outputs of all said multipliers $K_1[0], K_1[1], \ldots, K_1[k-1]$ are coupled to inputs of said adders, for adding together all outputs of all said multipliers $K_1[0], K_1[1], \ldots, K_1[k-1]$ to produce a first result;
inputs of first said adder are coupled to receive and add the first result with said filter cell input x;
an input of first said delay element $z^{-w}$ is coupled to said filter cell input x for said first switch in the first position;
an input of first said delay element $z^{-w}$ is coupled to the output of first said adder for said first switch in the second position;
said filter cell input x and the output of each odd indexed said delay element $z^{-w}$ is coupled to an input of at least one of said plurality of multipliers $K_2[k-1], K_2[k-2], \ldots, K_2[0]$;
outputs of all said multipliers $K_2[k-1], K_2[k-2], \ldots, K_2[0]$ are coupled to inputs of said adders, for adding together all outputs of all said multipliers $K_2[k-1], K_2[k-2], \ldots, K_2[0]$ to produce a second result;
inputs of last said adder are coupled to receive and add the second result with the output of last said delay element $z^{-w}$;
said filter cell output y is coupled to the output of last said delay element $z^{-w}$ for said second switch in the first position; and
said filter cell output y is coupled to the output of last said adder for said second switch in the second position.

18. The fast encoder of claim 17, wherein at least one of said multipliers $K_1[0], K_1[1], \ldots, K_1[k-1], K_2[k-1], K_2[k-2], \ldots, K_2[0]$ comprises a shifting means selected from a group consisting of: shifters and shifted hardwired bit line connections.

19. The fast encoder of claim 17, wherein said filter device further comprises:
a first function $N_1$ means coupled to receive and transform the first result to produce a third result; and
a second function $N_2$ means coupled to receive and transform the second result to produce a fourth result, wherein:
inputs of first said adder are coupled to receive and add the third result with said filter cell input x; and
inputs of last said adder are coupled to receive and add the fourth result with the output of last said delay element $z^{-w}$.

20. The fast encoder of claim 19, wherein at least one of said first function $N_1$ means and said second function $N_2$ means comprises a shifting means selected from a group consisting of: shifters and shifted hardwired bit line connections.

21. The fast encoder of claim 13, wherein said filter device comprises:
a delay element $z^{-w}$;
a first multiplier and a second multiplier; and
a first adder and a second adder, wherein:
an input of said first multiplier is coupled to said filter cell input x;
an input of said second multiplier is coupled to an output of said delay element $z^{-w}$;
inputs of said first adder are coupled to receive and add the output of said second multiplier with said filter cell input x;
an input of said delay element $z^{-w}$ is coupled to said filter cell input x for said first switch in the first position;
an input of said delay element $z^{-w}$ is coupled to the output of said first adder for said first switch in the second position;
inputs of said second adder are coupled to receive and add the output of said first multiplier with the output of said delay element $z^{-w}$;
said filter cell output y is coupled to the output of said delay element $z^{-w}$ for said second switch in the first position; and
said filter cell output y is coupled to the output of said second adder for said second switch in the second position.

22. The fast encoder of claim 21, wherein at least one of said first multiplier and said second multiplier comprises a shifting means selected from a group consisting of: shifters and shifted hardwired bit line connections.

23. The fast encoder of claim 22, wherein said shifting means shifts right data from its input for one bit position to produce data at its output.

24. The fast encoder of claim 23, wherein:
inputs of said first adder are coupled to receive and subtract the output of said second multiplier from said filter cell input x; and
inputs of said second adder are coupled to receive and subtract the output of said first multiplier from the output of said delay element $z^{-w}$.

25. The fast encoder of claim 21, wherein said shifting means shifts right data from its input for two bit positions to produce data at its output.

26. The fast encoder of claim 13, wherein said filter device comprises:
a first delay element $z^{-w}$, a second delay element $z^{-w}$ and a third delay element $z^{-w}$;
a first multiplier, a second multiplier, a third multiplier and a fourth multiplier; and
a first adder, a second adder, a third adder and a fourth adder,
wherein:
an output of said first delay element $z^{-w}$ is coupled to an input of said second delay element $z^{-w}$ and an input of said second multiplier;
an output of said second delay element $z^{-w}$ is coupled to an input of said third delay element $z^{-w}$ and an input of said third multiplier;
an input of said fourth multiplier is coupled to the output of said third delay element $z^{-w}$;
inputs of said second adder are coupled to receive. and add the output of said second multiplier with the output of said fourth multiplier;
inputs of said first adder are coupled to receive and add the output of said second adder with said filter cell input x;
an input of said first delay element $z^{-w}$ is coupled to said filter cell input x for said first switch in the first position;
an input of said first delay element $z^{-w}$ is coupled to the output of said first adder for said first switch in the second position;
inputs of said third adder are coupled to receive and add the output of said third multiplier with the output of said first multiplier;
inputs of said fourth adder are coupled to receive and add the output of said third adder with the output of said third delay element $z^{-w}$;
said filter cell output y is coupled to the output of said third delay element $z^{-w}$ for said second switch in the first position; and
said filter cell output y is coupled to the output of said fourth adder for said second switch in the second position.

27. The fast encoder of claim 26, wherein at least one of said first multiplier, said second multiplier, said third multiplier and said fourth multiplier comprises a shifting means selected from a group consisting of:
shifters and shifted hardwired bit line connections.

28. The fast encoder of claim 27, wherein said shifting means shifts right data from its input for four bit positions to produce data at its output.

29. The fast encoder of claim 28, wherein:
inputs of said second adder are coupled to receive and subtract the output of said second multiplier from the output of said fourth multiplier; and
inputs of said third adder are coupled to receive and subtract the output of said third multiplier from the output of said first multiplier.

30. The fast encoder of claim 1, wherein said plurality of encoding probability estimators comprises at least one adaptive histogram updating means, for updating an adaptive histogram.

31. The fast encoder of claim 30, wherein said adaptive histogram updating means comprises a low-pass filter for filtering probabilities selected from a group consisting of:
probabilities of occurrences of a current symbol x; and
cumulative probabilities of occurrences of all symbols preceding the current symbol x.

32. The fast encoder of claim 31, wherein said adaptive histogram updating means further comprises a dominant pole adapter for adapting a dominant pole of said low-pass filter.

33. The fast encoder of claim 32, wherein said dominant pole adapter comprises a dominant pole divider for halving a value of the dominant pole in each adaptation cycle.

34. The fast encoder of claim 1, wherein said plurality of entropy encoders comprises at least one range encoder, comprising a first multiplier for multiplying a prescaled range r with a number Q(x) selected from a group consisting of:
a number U(x) of occurrences of all symbols preceding a current symbol x, to produce a range correction $t = r \cdot U(x)$; and
a number u(x) of occurrences of the current symbol x, to produce a range $R = r \cdot u(x)$.

35. The fast encoder of claim 34, wherein said first multiplier comprises:
a first simplified multiplier for multiplying a small number $V = \lfloor r \cdot 2^{-1} \rfloor$ with said number Q(x); and
a first left shifter coupled to said first simplified multiplier, for shifting left the output of said first simplified multiplier for 1 bit positions.

36. The fast encoder of claim 34, wherein said first multiplier comprises a first left shifter for shifting left said number Q(x) for 1 bit positions.

37. The fast encoder of claim 34, wherein said first multiplier comprises:
a third left shifter comprising:
means for zeroing its output, when a small number $V=\lfloor r \cdot 2^{-1} \rfloor$ is equal 1, and
means for shifting left said number Q(x) for one bit position, when said small number V is any odd number higher or equal 3;
a first adder coupled to said third left shifter, for adding said number Q(x) with the output of said third left shifter; and
a first left shifter coupled to said first adder, for shifting left the output of said first adder for 1 bit positions.

38. The fast encoder of claim 34, wherein said first multiplier comprises:
a third left shifter comprising:
means for zeroing its output, when a small number $V=\lfloor r \cdot 2^{-1} \rfloor$ is equal 1,
means for shifting left said number Q(x) for one bit position, when said small number V is equal 3, and
means for shifting left said number Q(x) for two bit positions, when said small number V is any odd number higher or equal 5;
a first adder coupled to said third left shifter, for adding said number Q(x) with the output of said third left shifter; and
a first left shifter coupled to said first adder, for shifting left the output of said first adder for 1 bit positions.

39. The fast encoder of claim 1, wherein said plurality of entropy encoders comprises at least one range encoder, comprising a first divider for dividing a range R with a number Total of occurrences of all symbols, to produce a prescaled range $r=\lfloor R/\text{total} \rfloor$.

40. The fast encoder of claim 39, wherein said first divider comprises a first right shifter for shifting right said range R for $w_3=\log_2(\text{Total})$ bit positions.

41. The fast encoder of claim 1, wherein said plurality of encoding probability estimators comprises:
at least one transformation coefficient C splitter, for splitting a transformation coefficient C into a sign S and a magnitude M;
at least one magnitude-set index MS determinator coupled to said transformation coefficient C splitter, for determining a magnitude-set index MS using said magnitude M and a magnitude-set table;
at least one residual R determinator, coupled to said transformation coefficient C splitter, for determining a residual R using said magnitude M and said magnitude-set table.

42. The fast encoder of claim 41, wherein:
said magnitude-set index MS is determined to be equal to a sum of a doubled position of the first nonzero bit of the highest significance and the value of the first next bit of the lower significance in a binary representation of said magnitude M; and
said residual R is determined as the difference between said magnitude M and the lower coefficient limit, equal to a value of said magnitude M with all bits zeroed except the first nonzero bit of the highest significance and the first next bit of the lower significance in a binary representation of said magnitude M.

43. The fast encoder of claim 41, wherein said plurality of entropy encoders comprises at least one residual R encoder coupled to said residual R determinator, for encoding the residual R using variable length coding (VLC).

44. The fast encoder of claim 41, wherein said plurality of encoding probability estimators further comprises at least one context modeler of a transformation coefficient to be encoded, using already encoded transformation coefficients.

45. The fast encoder of claim 44, wherein said already encoded transformation coefficients are located north-east, north, north-west and west from said transformation coefficient to be encoded.

46. The fast encoder of claim 44, wherein said plurality of encoding probability estimators further comprises at least one mean value $\overline{MS}$ determinator coupled to said context modeler, for determining $\overline{MS}$ as the mean value of magnitude-set indexes $MS_i$ of said already encoded transformation coefficients.

47. The fast encoder of claim 46, wherein said plurality of encoding probability estimators further comprises at least one maximum mean value $\overline{MS}$ limiter coupled to said mean value $\overline{MS}$ determinator, for limiting a maximum mean value $\overline{MS}$ by a constant ML to produce a magnitude context MC.

48. The fast encoder of claim 47, wherein said plurality of entropy encoders comprises at least one magnitude range encoder coupled to said maximum mean value $\overline{MS}$ limiter, for encoding said magnitude-set index MS as a current symbol x, using an adaptive magnitude histogram h[MC].

49. The fast encoder of claim 47, wherein said plurality of encoding probability estimators further comprises at least one adaptive magnitude histogram h[MC] updating means coupled to said maximum mean value $\overline{MS}$ limiter, for an adaptive magnitude histogram h[MC] updating using said magnitude-set index MS as a current symbol x.

50. The fast encoder of claim 44, wherein said plurality of encoding probability estimators further comprises at least one ternary context TC determinator coupled to said transformation coefficient C splitter, for determining a ternary context TC as the ternary code of sign values $S_i$ of already encoded transformation coefficients.

51. The fast encoder of claim 50, wherein said plurality of encoding probability estimators further comprises at least one sign inverter coupled to said ternary context TC determinator, for inverting less probable said sign S using NEG table.

52. The fast encoder of claim 50, wherein said plurality of encoding probability estimators further comprises at least one ternary context TC translator coupled to said ternary context TC determinator, for translating said ternary context TC into a sign context SC using CTX table.

53. The fast encoder of claim 52, wherein said plurality of entropy encoders comprises at least one sign range encoder coupled to said ternary context TC translator, for encoding said sign S as a current symbol x, using an adaptive sign histogram g[SC].

54. The fast encoder of claim 52, wherein said plurality of encoding probability estimators further comprises at least one adaptive sign histogram g[SC] updating means coupled to said ternary context TC translator, for an adaptive sign histogram g[SC] updating using said sign S as a current symbol x.

55. A fast decoder for decompressing input compressed data into output data, comprising:
an input compressed buffer, for receiving and substantially synchronizing input compressed data to produce synchronized compressed data;
a plurality of entropy decoders, each of the plurality of entropy decoders coupled to said input compressed buffer, for receiving and decoding respective synchronized compressed data using probabilities of symbols within contexts of transformation coefficients to produce transformation coefficients;
a plurality of decoding probability estimators, each of the plurality of decoding probability estimators coupled to at least a respective one of the plurality of entropy decoders, for receiving respective transformation coefficients and estimating the probabilities of symbols within the contexts of transformation coefficients to produce the probabilities of symbols within the contexts of transformation coefficients;

a plurality of processing means, each of the plurality of processing means coupled to at least a respective one of the plurality of entropy decoders, each of the plurality of processing means selected from a group consisting of: pass-through means for lossless processing and dequantizer means for lossy processing, for receiving and processing respective transformation coefficients to produce processed transformation coefficients; and a plurality of single-level inverse direct subband transformers, the plurality of single-level inverse direct subband transformers directly coupled to at least: a respective one of the plurality of processing means, for receiving and transforming processed transformation coefficients to produce output data.

56. The fast decoder of claim 55, further comprising:

at least one synchronization memory coupled to said input compressed buffer, for receiving and substantially synchronizing buffered compressed data to produce synchronized compressed data;

wherein the input compressed buffer is further configured to receive and buffer input compressed data to produce buffered compressed data.

57. The fast decoder of claim 55, further comprising at least one color space converter for converting the output data to produce converted output data.

58. The fast decoder of claim 55, wherein:

a last of said plurality of single-level inverse subband transformers is coupled to receive and transform transformation coefficients to produce the output data; and each other of said plurality of single-level inverse subband transformers is coupled to receive and transform transformation coefficients to produce selected transformation coefficients.

59. The fast decoder of claim 58, wherein said selected transformation coefficients are low-pass transformed for one-dimensional output data.

60. The fast decoder of claim 58, wherein said selected transformation coefficients are low-pass transformed both horizontally and vertically for two-dimensional output data.

61. The fast decoder of claim 55, wherein said plurality of single-level inverse subband transformers comprises:

at least one inverse filter for horizontal filtering; and
at least one inverse filter for vertical filtering.

62. The fast decoder of claim 61, wherein said inverse filter for horizontal filtering is different from said inverse filter for vertical filtering.

63. The fast decoder of claim 61, wherein at least one of said inverse filter for horizontal filtering and said inverse filter for vertical filtering comprises at least one inverse non-stationary filter.

64. The fast decoder of claim 55, wherein said plurality of single-level inverse subband transformers comprises at least one inverse filter for filtering.

65. The fast decoder of claim 64, wherein said inverse filter comprises at least one inverse non-stationary filter.

66. The fast decoder of claim 65, wherein said inverse non-stationary filter comprises a plurality of serially coupled inverse non-stationary filter cells.

67. The fast decoder of claim 66, wherein said inverse non-stationary filter cell comprises:

a filter device;
a filter cell input x coupled to said filter device;
a filter cell output y coupled to said filter device;

a first switch and a second switch coupled to said filter device, having a plurality of controllable positions; and a clock input c coupled to control said first switch and said second switch, for providing a non-stationarity of said direct non-stationary filter cell.

68. The fast decoder of claim 67, wherein:

said first switch is in a second position for horizontal filtering of each second pixel and in a first position for horizontal filtering of other pixels; and said second switch is in a first position for horizontal filtering of each second pixel and in a second position for horizontal filtering of other pixels.

69. The fast decoder of claim 67, wherein:

said first switch is in a second position for vertical filtering of each second line and in a first position for vertical filtering of other lines; and said second switch is in a first position for vertical filtering of each second line and in a second position for vertical filtering of other lines.

70. The fast decoder of claim 67, wherein said direct non-stationary filter further comprises:

a first gain multiplier;
a second gain multiplier; and
a selection switch, having a plurality of positions controlled by said clock input c, wherein:

an input of said first gain multiplier is coupled to an input of said inverse non-stationary filter, for multiplying an input sample with a reciprocal value of a first gain number to produce a first result;

an input of said second gain multiplier is coupled to an input of said inverse non-stationary filter, for multiplying an input sample with a reciprocal value of a second gain number to produce a second result;

an input of said plurality of serially coupled inverse non-stationary filter cells is coupled to an output of said first gain multiplier, for said selection switch in the second position; and an input of said plurality of serially coupled inverse non-stationary filter cells is coupled to an output of said second gain multiplier, for said selection switch in the first position.

71. The fast decoder of claim 67, wherein said filter device comprises:

at least one delay element $z^{-w}$;
a plurality of multipliers $K_1[0], K_1[k-1], \ldots, K_1[k-1], K_2[k-1], K_2[k-2], \ldots, K_2[0]$; and
a plurality of adders, wherein:

an output of each even indexed said delay element $z^{-w}$ is coupled to an input of subsequent odd indexed said delay element $z^{-w}$;

an output of each odd indexed said delay element $z^{-w}$ is coupled to an input of subsequent even indexed said delay element $z^{-w}$;

the output of each even indexed said delay element $z^{-w}$ is coupled to an input of at least one of said plurality of multipliers $K_1[0], K_1[1], \ldots, K_1[k-1]$;

outputs of all said multipliers $K_1[0], K_1[1], \ldots, K_1[k-1]$ are coupled to inputs of said adders, for adding together all outputs of all said multipliers $K_1[0], K_1[1], \ldots, K_1[k-1]$ to produce a first result;

inputs of first said adder are coupled to receive and add the first result with said filter cell input x;

an input of first said delay element $z^{-w}$ is coupled to said filter cell input x for said first switch in the first position;

an input of first said delay element $z^{-w}$ is coupled to the output of first said adder for said first switch in the second position;

said filter cell input x and the output of each cdd indexed said delay element $z^{-w}$ is coupled to an input of at least one of said plurality of multipliers $K_2[k-1]$, $K_2[k-2]$, ..., $K_2[0]$;

outputs of all said multipliers $K_2[k-1]$, $K_2[k-2]$, ..., $K_2[0]$ are coupled to inputs of said adders, for adding together all outputs of all said multipliers $K_2[k-1]$, $K_2[k-2]$, ..., $K_2[0]$ to produce a second result;

inputs of last said adder are coupled to receive and add the second result with the output of last said delay element $z^{-w}$;

said filter cell output y is coupled to the output of last said delay element $z^{-w}$ for said second switch in the first position; and said filter cell output y is coupled to the output of last said adder for said second switch in the second position.

72. The fast decoder of claim 71, wherein at least one of said multipliers $K_1[0]$, $K_1[1]$, ..., $K_1[k-1]$, $K_2[k-1]$, $K_2[k-2]$, ..., $K_2[0]$ comprises a shifting means selected from a group consisting of: shifters and shifted hardwired bit line connections.

73. The fast decoder of claim 71, wherein said inverse non-stationary filter cell further comprises:
a first function $N_1$ means coupled to receive and transform the first result to produce a third result; and
a second function $N_2$, means coupled to receive and transform the second result to produce a fourth result, wherein:
inputs of first said adder are coupled to receive and add the third result with said filter cell input x; and
inputs of last said adder are coupled to receive and add the fourth result with the output of last said delay element $z^{-w}$.

74. The fast decoder of claim 73, wherein at least one of said first function $N_1$ means and said second function $N_2$ means comprises a shifting means selected from a group consisting of: shifters and shifted hardwired bit line connections.

75. The fast decoder of claim 67, wherein said filter device comprises:
a delay element $z^{-w}$; a first multiplier and a second multiplier; and
a first adder and a second adder, wherein:
an input of said first multiplier is coupled to said filter cell input x;
an input of said second multiplier is coupled to an output of said delay element $z^{-w}$;
inputs of said first adder are coupled to receive and add the output of said second multiplier with said filter cell input x;
an input of said delay element $z^{-w}$ is coupled to said filter cell input x, for said first switch in the first position;
an input of said delay element $z^{-w}$ is coupled to the output of said first adder, for said first switch in the second position;
inputs of said second adder are coupled to receive and add the output of said first multiplier with the output of said delay element $z^{-w}$;
said filter cell output y is coupled to the output of said delay element $z^{-w}$, for said second switch in the first position; and
said filter cell output y is coupled to the output of said second adder, for said second switch in the second position.

76. The fast decoder of claim 75, wherein at least one of said first multiplier and said second multiplier comprises a shifting means selected from a group consisting of: shifters and shifted hardwired bit line connections.

77. The fast decoder of claim 76, wherein said shifting means shifts right data from its input for one bit position to produce data at its output.

78. The fast decoder of claim 76, wherein said shifting means shifts right data from its input for two bit positions to produce data at its output.

79. The fast decoder of claim 78, wherein:
inputs of said first adder are coupled to receive and subtract the output of said second multiplier from said filter cell input x; and
inputs of said second adder are coupled to receive and subtract the output of said first multiplier from the output of said delay element $z^{-w}$.

80. The fast decoder of claim 67, wherein said filter device comprises:
a first delay element $z^{-w}$, a second delay element $z^{-w}$ and a third delay element $z^{-w}$;
a first multiplier, a second multiplier, a third multiplier and a fourth multiplier; and
a first adder, a second adder, a third adder and a fourth adder, wherein:
an output of said first delay element $z^{-w}$ is coupled to an input of said second delay element $z^{-w}$ and an input of said second multiplier;
an output of said second delay element $z^{-w}$ is coupled to an input of said third delay element $z^{-w}$ and an input of said third multiplier;
an input of said fourth multiplier is coupled to the output of said third delay element $z^{-w}$;
inputs of said second adder are coupled to receive and add the output of said fourth multiplier with the output of said second multiplier;
inputs of said first adder are coupled to receive and add the output of said second adder with said filter cell input x;
an input of said first delay element $z^{-w}$ is coupled to said filter cell input x, for said first switch in the first position;
an input of said first delay element $z^{-w}$ is coupled to the output of said first adder, for said first switch in the second position;
inputs of said third adder are coupled to receive and add the output of said first multiplier with the output of said third multiplier;
inputs of said fourth adder are coupled to receive and add the output of said third adder with the output of said third delay element $z^{-w}$;
said filter cell output y is coupled to the output of said third delay element $z^{-w}$, for said second switch in the first position; and
said filter cell output y is coupled to the output of said fourth adder, for said second switch in the second position.

81. The fast decoder of claim 80, wherein at least one of said first multiplier, said second multiplier, said third multiplier and said fourth multiplier comprises a shifting means selected from a group consisting of: shifters and shifted hardwired bit line connections.

82. The fast decoder of claim 81, wherein said shifting means shifts right data from its input for four bit positions to produce data at its output.

83. The fast decoder of claim 82, wherein:
inputs of said second adder are coupled to receive and subtract the output of said fourth multiplier from the output of said second multiplier; and inputs of said third adder are coupled to receive and subtract the output of said first multiplier from the output of said third multiplier.

84. The fast decoder of claim 55, wherein said plurality of decoding probability estimators comprises at least one adaptive histogram updating means, for updating an adaptive histogram.

85. The fast decoder of claim 84, wherein said adaptive histogram updating means comprises a low-pass filter for filtering probabilities selected from a group consisting of:
   probabilities of occurrences of a current symbol x; and
   cumulative probabilities of occurrences of all symbols preceding the current symbol x.

86. The fast decoder of claim 85, wherein said adaptive histogram updating means further comprises a dominant pole adapter for adapting a dominant pole of said low-pass filter.

87. The fast decoder of claim 86, wherein said dominant pole adapter comprises a dominant pole divider for halving a value of the dominant pole in each adaptation cycle.

88. The fast decoder of claim 55, wherein said plurality of entropy decoders comprises at least one range decoder, comprising a first multiplier for multiplying a prescaled range r with a number Q(x) selected from a group consisting of:
   a number U(x) of occurrences of all symbols preceding a current symbol x, to produce a range correction t=r·U(x); and
   a number u(x) of occurrences of the current symbol x, to produce a range R=r·u(x).

89. The fast decoder of claim 88, wherein said first multiplier comprises:
   a first simplified multiplier for multiplying a small number $V=\lfloor r \cdot 2^{-1} \rfloor$ with said number Q(x); and
   a first left shifter coupled to said first simplified multiplier, for shifting left the output of said first simplified multiplier for 1 bit positions.

90. The fast decoder of claim 88, wherein said first multiplier comprises a first left shifter for shifting left said number Q(x) for 1 bit positions.

91. The fast decoder of claim 88, wherein said first multiplier comprises:
   a third left shifter comprising:
      means for zeroing its output, when a small number $V=\lfloor r \cdot 2^{-1} \rfloor$ is equal 1, and
      means for shifting left said number Q(x) for one bit position, when said small number V is any odd number higher or equal 3;
   a first adder coupled to said third left shifter, for adding said number Q(x) with the output of said third left shifter; and
   a first left shifter coupled to said first adder, for shifting left the output of said first adder for 1 bit positions.

92. The fast decoder of claim 88, wherein said first multiplier comprises:
   a third left shifter comprising:
      means for zeroing its output, when a small number $V=\lfloor r \cdot 2^{-1} \rfloor$ is equal 1,
      means for shifting left said number Q(x) for one bit position, when said small number V is equal 3, and
      means for shifting left said number Q(x) for two bit positions, when said small number V is any odd number higher or equal 5;
   a first adder coupled to said third left shifter, for adding said number Q(x) with the output of said third left shifter; and
   a first left shifter coupled to said first adder, for shifting left the output of said first adder for 1 bit positions.

93. The fast decoder of claim 55, wherein said plurality of entropy decoders comprises at least one range decoder, comprising a first divider for dividing a range R with a number Total of occurrences of all symbols, to produce a prescaled range r=⌊R/Total⌋.

94. The fast decoder of claim 93, wherein said first divider comprises a first right shifter for shifting right said range R for $w_3 = \log_2(\text{Total})$ bit positions.

95. The fast decoder of claim 55, wherein said plurality of entropy decoders comprises at least one range decoder, comprising a second divider for dividing a bottom range limit B with a prescaled range r, to produce a range correction t=⌊B/r⌋.

96. The fast decoder of claim 95, wherein said second divider comprises:
   a second simplified divider for dividing said bottom range limit B with a small number $V=\lfloor r \cdot 2^{-1} \rfloor$; and
   a second right shifter coupled to said second simplified divider, for shifting right the output of said second simplified divider for 1 bit positions.

97. The fast decoder of claim 95, wherein said second divider comprises:
   a third multiplier for multiplying said bottom range limit B with a first predefined number, dependent on a small number $V=\lfloor r \cdot 2^{-1} \rfloor$; and
   a second right shifter coupled to said third multiplier, for shifting right the output of said third multiplier for a sum of 1 and a second predefined number of bit positions, dependent on said small number V.

98. The fast decoder of claim 55, wherein said plurality of decoding probability estimators comprises at least one transformation coefficient C builder for reconstructing transformation coefficient C using a magnitude-set index MS, a sign S and a residual R.

99. The fast decoder of claim 98, wherein said plurality of entropy decoders comprises at least one residual R decoder, for decoding said residual R using inverse variable length coding (INVVLC).

100. The fast decoder of claim 98, wherein said plurality of decoding probability estimators further comprises at least one context modeler of a transformation coefficient to be decoded, using already decoded transformation coefficients.

101. The fast decoder of claim 100, wherein said already decoded transformation coefficients are located north-east, north, north-west and west from said transformation coefficient to be decoded.

102. The fast decoder of claim 100, wherein said plurality of decoding probability estimators further comprises at least one mean value $\overline{MS}$ determinator coupled to said context modeler, for determining $\overline{MS}$ as the mean value of magnitude-set indexes $MS_i$ of said already decoded transformation coefficients.

103. The fast decoder of claim 102, wherein said plurality of decoding probability estimators further comprises at least one maximum mean value $\overline{MS}$ limiter coupled to said mean value $\overline{MS}$ determinator, for limiting a maximum mean value $\overline{MS}$ by a constant ML to produce a magnitude context MC.

104. The fast decoder of claim 103, wherein said plurality of entropy decoders comprises at least one magnitude range decoder coupled to said maximum mean value $\overline{MS}$ limiter, for decoding a magnitude-set index MS as e current symbol x, using an adaptive magnitude histogram h[MC].

105. The fast decoder of claim 104, wherein said plurality of decoding probability estimators further comprises at least one adaptive magnitude histogram h[MC] updating means coupled to said magnitude range decoder, for an adaptive magnitude histogram h[MC] updating using decoded said magnitude-set index MS as a current symbol x.

106. The fast decoder of claim 100, wherein said plurality of decoding probability estimators further comprises at least one ternary context TC determinator coupled to said context modeler, for determining a ternary context TC as the ternary code of sign values $S_i$ of already decoded transformation coefficients.

107. The fast decoder of claim 106, wherein said plurality of decoding probability estimators further comprises at least one ternary context TC translator coupled to said ternary context TC determinator, for translating ternary context TC into a sign context SC using CTX table.

108. The fast decoder of claim 107, wherein said plurality of entropy decoders comprises at least one sign range decoder coupled to said ternary context TC translator, for decoding a sign S as a current symbol x, using an adaptive sign histogram g[SC].

109. The fast decoder of claim 108, wherein said plurality of decoding probability estimators further comprises at least one adaptive sign histogram g[SC] updating means coupled to said sign range decoder, for an adaptive sign histogram g[SC] updating using decoded said sign S as a current symbol x.

110. The fast decoder of claim 108, wherein said plurality of decoding probability estimators further comprises at least one sign inverter coupled to said sign range decoder, for inverting less probable said sign S using NEG table.

111. A method for fast encoding input data into output compressed data, comprising:
- receiving input data at a plurality of single-level direct subband transformers;
- transforming the input data received at the plurality of single-level direct subband transformers to produce transformation coefficients;
- receiving respective transformation coefficients directly from the plurality of single-level direct subband transformers at a plurality of processing means;
- processing the respective transformation coefficients received at each of the plurality of processing means to produce processed transformation coefficients, each of the plurality of processing means selected from a group consisting of: pass-through means for lossless processing and quantizer means for lossy processing;
- estimating probabilities of symbols within contexts of transformation coefficients using the processed transformation coefficients to produce the probabilities of symbols within the contexts of transformation coefficients;
- entropy encoding the processed transformation coefficients using the probabilities of symbols within the contexts of transformation coefficients to produce encoded data; and
- substantially synchronizing the encoded data to produce output compressed data.

112. The method for fast encoding of claim 111, further comprising:
- substantially synchronizing the encoded data to produce synchronized compressed data; and
- buffering the synchronized compressed data to produce the output compressed data.

113. The method for fast encoding of claim 111, further comprising color space converting original input data to produce input data.

114. The method for fast encoding of claim 111, wherein said direct subband transforming comprises:
- (a) direct subband transforming the input data to produce transformation coefficients;
- (b) direct subband transforming selected transformation coefficients to produce transformed transformation coefficients; and
- (c) repeating step (b) finite number of times.

115. The method for fast encoding of claim 114, wherein said selected transformation coefficients are low-pass transformed for one-dimensional input data.

116. The method for fast encoding of claim 114, wherein said selected transformation coefficients are low-pass transformed both horizontally and vertically for two-dimensional input data.

117. The method for fast encoding of claim 111, wherein said direct subband transforming comprises:
- at least one horizontal direct filtering; and
- at least one vertical direct filtering.

118. The method for fast encoding of claim 117, wherein said horizontal direct filtering is different from said vertical direct filtering.

119. The method for fast encoding of claim 117, wherein at least one of said horizontal direct filtering and said vertical direct filtering comprises at least one direct non-stationary filtering.

120. The method for fast encoding of claim 111, wherein said direct subband transforming comprises at least one direct filtering.

121. The method for fast encoding of claim 120, wherein said direct filtering comprises at least one direct non-stationary filtering.

122. The method for fast encoding of claim 121, wherein said direct non-stationary filtering comprises a plurality of successive direct non-stationary cell filtering steps.

123. The method for fast encoding of claim 122, wherein said direct non-stationary cell filtering comprises:
- filtering using a first direct transfer function in a first cycle; and
- filtering using a second direct transfer function in a second cycle.

124. The method for fast encoding of claim 123, wherein:
- said first cycle is active during horizontal filtering of each second pixel; and
- said second cycle is active during horizontal filtering of other pixels.

125. The method for fast encoding of claim 123, wherein:
- said first cycle is active during vertical filtering of each second line; and
- said second cycle is active during vertical filtering of other lines.

126. The method for fast encoding of claim 123, further comprising:
- first multiplying a result of said plurality of successive direct non-stationary cell filtering steps with a first gain number to produce a first result;
- second multiplying a result of said plurality of successive direct non-stationary cell filtering steps with a second gain number to produce a second result;
- selecting the first result in each first cycle to produce an output sample; and
- selecting the second result in each second cycle to produce the output sample.

127. The method for fast encoding of claim 123, wherein said direct non-stationary cell filtering further comprises:
- delaying an input sample for w samples to produce a plurality of even and odd indexed delayed results in each first cycle;
- multiplying each even indexed delayed result with at least one first filter coefficient selected from a group of first filter coefficients to produce first results;

adding together all first results to produce a third result;
adding the third result with the input sample to produce a fifth result;
delaying the fifth result for w samples to produce a plurality of even and odd indexed delayed results in each second cycle;
multiplying the input sample and each odd indexed delayed result with at least one second filter coefficient selected from a group of second filter coefficients to produce second results;
adding together all second results to produce a fourth result;
adding the fourth result with last delayed result to produce a sixth result;
outputting the sixth result in each first cycle; and
outputting the last delayed result in each second cycle.

128. The method for fast encoding of claim 127, wherein at least one said multiplying comprises an operation selected from a group consisting of: shifting and bit remapping.

129. The method for fast encoding of claim 127, wherein said direct non-stationary cell filtering further comprises:
transforming the third result by first function $N_1$ to produce a seventh result;
transforming the fourth result by first function $N_2$ to produce an eight result;
adding the seventh result with the input sample to produce a fifth result; and
adding the eight result with last delayed result to produce a sixth result.

130. The method for fast encoding of claim 129, wherein at least one said transforming comprises an operation selected from a group consisting of: shifting and bit remapping.

131. The method for fast encoding of claim 123, wherein said direct non-stationary cell filtering further comprises:
delaying an input sample for w samples to produce a delayed result in each first cycle;
second multiplying the delayed result with a second filter coefficient to produce a second result;
first adding the second result with the input sample to produce a fourth result;
delaying the fourth result for w samples to produce the delayed result in each second cycle;
first multiplying the input sample with a first filter coefficient to produce a first result;
second adding the first result with the delayed result to produce a third result;
outputting the third result in each first cycle; and
outputting the delayed result in each second cycle.

132. The method for fast encoding of claim 131, wherein at least one of said first multiplying and said second multiplying comprises an operation selected from a group consisting of: shifting and bit remapping.

133. The method for fast encoding of claim 132, wherein said operation comprises shifting right for two bit positions.

134. The method for fast encoding of claim 132, wherein said operation comprises shifting right for one bit position.

135. The method for fast encoding of claim 134, wherein:
said first adding comprises subtracting the second result from the input sample to produce a fourth result; and
said second adding comprises subtracting the first result from the delayed result to produce a third result.

136. The method for fast encoding of claim 123, wherein said direct non-stationary cell filtering further comprises:
delaying the input sample for w samples to produce a first delayed result in each first cycle;
delaying the first delayed result for w samples to produce a second delayed result;
delaying the second delayed result for w samples to produce a third delayed result;
first multiplying the input sample with a first filter coefficient to produce a first result;
second multiplying the first delayed result with a second filter coefficient to produce a second result;
third multiplying the second delayed result with a third filter coefficient to produce a third result;
fourth multiplying the third delayed result with a fourth filter coefficient to produce a fourth result;
second adding the second result with the fourth result to produce a sixth result;
third adding the third result with the first result to produce a fifth result;
first adding the sixth result with the input sample to produce an eight result;
delaying the eight result for w samples to produce the first delayed result in each second cycle;
fourth adding the fifth result with the third delayed result to produce a seventh result;
outputting the seventh result in each first cycle; and
outputting the third delayed result in each second cycle.

137. The method for fast encoding of claim 136, wherein at least one of said first multiplying, said second multiplying, said third multiplying and said fourth multiplying comprises an operation selected from a group consisting of:
shifting and bit remapping.

138. The method for fast encoding of claim 137, wherein said operation comprises shifting right for four bit positions.

139. The method for fast encoding of claim 138, wherein:
said second adding comprises subtracting the second result from the fourth result to produce a sixth result; and
said third adding comprises subtracting the third result from the first result to produce a fifth result.

140. The method for fast encoding of claim 111, wherein said estimating the probabilities of symbols within the contexts of transformation coefficients comprises updating adaptive histograms.

141. The method for fast encoding of claim 140, wherein said updating adaptive histograms comprises low-pass filtering probabilities selected from a group consisting of:
probabilities of occurrences of a current symbol x; and
cumulative probabilities of occurrences of all symbols preceding the current symbol x.

142. The method for fast encoding of claim 141, wherein said updating adaptive histograms further comprises adapting a dominant pole during said low-pass filtering.

143. The method for fast encoding of claim 142, wherein said adapting a dominant pole comprises halving value of the dominant pole in each adaptation cycle.

144. The method for fast encoding of claim 111, wherein said entropy encoding comprises range encoding, comprising first multiplying a prescaled range r with a number Q(x) selected from a group consisting of:
a number U(x) of occurrences of all symbols preceding a current symbol x, to produce a range correction t=r·U(x); and
a number u(x) of occurrences of the current symbol x, to produce a range R=r·u(x).

145. The method for fast encoding of claim 144, wherein said first multiplying comprises:
simplified multiplying a small number $V=\lfloor r \cdot 2^{-1} \rfloor$ with said number Q(x) to produce a first result; and
shifting left the first result for 1 bit positions.

146. The method for fast encoding of claim 144, wherein said first multiplying comprises shifting left said number Q(x) for 1 bit positions.

147. The method for fast encoding of claim 144, wherein said first multiplying comprises:
  zeroing a first result, when a small number $V=\lfloor r \cdot 2^{-1} \rfloor$ is equal 1;
  shifting left said number Q(x) for one bit position to produce a first result, when said small number V is any odd number higher or equal 3;
  adding said number Q(x) with the first result to produce a second result; and
  shifting left the second result for 1 bit positions.

148. The method for fast encoding of claim 144, wherein said first multiplying comprises:
  zeroing a first result, when a small number $V=\lfloor r \cdot 2^{-1} \rfloor$ is equal 1;
  shifting left said number QGO for one bit position to produce a first result, when said small number V is equal 3;
  shifting left said number Q(x) for two bit positions to produce a first result, when said small number V is any odd number higher or equal 5;
  adding said number Q(x) with the first result to produce a second result; and
  shifting left the second result for 1 bit positions.

149. The method for fast encoding of claim 111, wherein said entropy encoding comprises range encoding, comprising first dividing a range R with a number Total of occurrences of all symbols, to produce a prescaled range $r=\lfloor R/\text{Total} \rfloor$.

150. The method for fast encoding of claim 149, wherein said first dividing comprises shifting right said range R for $w_3=\log_2(\text{Total})$ bit positions.

151. The method for fast encoding of claim 111, wherein said estimating the probabilities of symbols within the contexts of transformation coefficients comprises:
  splitting a transformation coefficient C into a sign S and a magnitude M;
  determining a magnitude-set index MS using said magnitude M and a magnitude-set table; and
  determining a residual R using said magnitude M and said magnitude-set table.

152. The method for fast encoding of claim 151, wherein:
  said magnitude-set index MS is determined to be equal to a sum of a doubled position of the first nonzero bit of the highest significance and the value of the first next bit of the lower significance in a binary representation of said magnitude M; and
  said residual R is determined as the difference between said magnitude M and the lower coefficient limit, equal to a value of said magnitude M with all bits zeroed except the first nonzero bit of the highest significance and the first next bit of the lower significance in a binary representation of said magnitude M.

153. The method for fast encoding of claim 151, wherein said entropy encoding comprises encoding a residual R using variable length coding (VLC).

154. The method for fast encoding of claim 151, wherein said estimating the probabilities of symbols within the contexts of transformation coefficients further comprises context modeling a transformation coefficient to be encoded, using already encoded transformation coefficients.

155. The method for fast encoding of claim 154, wherein said already encoded transformation coefficients are located north-east, north, north-west and west from said transformation coefficient to be encoded.

156. The method for fast encoding of claim 154, wherein said estimating the probabilities of symbols within the contexts of transformation coefficients further comprises determining a mean value $\overline{MS}$ as the mean value of magnitude-set indexes $MS_i$ of said already encoded transformation coefficients.

157. The method for fast encoding of claim 156, wherein said estimating the probabilities of symbols within the contexts of transformation coefficients further comprises limiting a maximum mean value $\overline{MS}$ by a constant ML to produce a magnitude context MC.

158. The method for fast encoding of claim 157, wherein said entropy encoding comprises range encoding said magnitude-set index MS as a current symbol x, using an adaptive magnitude histogram h[MC].

159. The method for fast encoding of claim 157, wherein said estimating the probabilities of symbols within the contexts of transformation coefficients further comprises updating of an adaptive magnitude histogram h[MC] using said magnitude-set index MS as a current symbol x.

160. The method for fast encoding of claim 159, wherein said estimating the probabilities of symbols within the contexts of transformation coefficients further comprises determining a ternary context TC as the ternary code of sign values $S_i$ of said already encoded transformation coefficients.

161. The method for fast encoding of claim 160, wherein said estimating the probabilities of symbols within the contexts of transformation coefficients further comprises inverting less probable said sign S using NEG table.

162. The method for fast encoding of claim 160, wherein said estimating the probabilities of symbols within the contexts of transformation coefficients further comprises translating said ternary context TC into a sign context SC using CTX table.

163. The method for fast encoding of claim 162, wherein said entropy encoding comprises range encoding said sign S as a current symbol x, using an adaptive sign histogram g[SC].

164. The method for fast encoding of claim 162, wherein said estimating the probabilities of symbols within the contexts of transformation coefficients further comprises updating of an adaptive sign histogram g[SC] using said sign S as a current symbol x.

165. An article of manufacture for fast encoding of input data into output compressed data comprising a at least one non-transitory processor readable storage medium for storing a computer program of instructions configured to be readable by at least one processor for instructing the at least one processor to execute a computer process for performing the method of claim 111.

166. A method for fast decoding of input compressed data into output data, comprising:
  substantially synchronizing input compressed data to produce synchronized compressed data;
  entropy decoding the synchronized compressed data using probabilities of symbols within contexts of transformation coefficients to produce transformation coefficients;
  estimating the probabilities of symbols within the contexts of transformation coefficients using the transformation coefficients to produce the probabilities of symbols within the contexts of transformation coefficients;
  processing the transformation coefficients in a plurality of processing means to produce processed transformation coefficients, each of the plurality of processing means selected from a group consisting of: pass-through means for lossless processing and dequantizer means for lossy processing;

receiving respective processed transformation coefficients directly from the plurality of processing means at a plurality of single-level inverse direct subband transformers; and transforming the respective processed transformation coefficients received at the plurality of single-level inverse direct subband transformers to produce output data.

167. The method for fast decoding of claim 166, further comprising:

buffering input compressed data to produce buffered compressed data; and substantially synchronizing the buffered compressed data to produce synchronized compressed data.

168. The method for fast decoding of claim 166, further comprising color space converting the output data to produce converted output data.

169. The method for fast decoding of claim 166, wherein said inverse subband transforming comprises:

(a) inverse subband transforming transformation coefficients to produce selected transformation coefficients;

(b) repeating step (a) finite number of times; and (c) inverse subband transforming transformation coefficients to produce the output data.

170. The method for fast decoding of claim 169, wherein said selected transformation coefficients are low-pass transformed for one-dimensional output data.

171. The method for fast decoding of claim 169, wherein said selected transformation coefficients are low-pass transformed both horizontally and vertically for two-dimensional output data.

172. The method for fast decoding of claim 166, wherein said inverse subband transforming comprises:

at least one horizontal inverse filtering; and at least one vertical inverse filtering.

173. The method for fast decoding of claim 172, wherein said horizontal inverse filtering is different from said vertical inverse filtering.

174. The method for fast decoding of claim 172, wherein at least one of said horizontal inverse filtering and said vertical inverse filtering comprises at least one inverse non-stationary filtering.

175. The method for fast decoding of claim 166, wherein said inverse subband transforming comprises at least one inverse filtering.

176. The method for fast decoding of claim 175, wherein said inverse filtering comprises at least one inverse non-stationary filtering.

177. The method for fast decoding of claim 176, wherein said inverse non-stationary filtering comprises a plurality of successive inverse non-stationary cell filtering steps.

178. The method for fast decoding of claim 177, wherein said inverse non-stationary cell filtering comprises:

filtering using a first inverse transfer function in a first cycle; and filtering using a second inverse transfer function in a second cycle.

179. The method for fast decoding of claim 178, wherein:

said second cycle is active during horizontal filtering of each second pixel; and said first cycle is active during horizontal filtering of other pixels.

180. The method for fast decoding of claim 178, wherein:

said second cycle is active during vertical filtering of each second line; and said first cycle is active during vertical filtering of other lines.

181. The method for fast decoding of claim 178, wherein said inverse non-stationary cell filtering further comprising:

first multiplying an input with a reciprocal value of a first gain number to produce a first result;

second multiplying an input with a reciprocal value of the second gain number to produce a second result;

selecting first result in each second cycle to produce an input sample for said plurality of successive inverse non-stationary cell filtering steps; and selecting second result in each first cycle to produce the input sample for said plurality of successive inverse non-stationary cell filtering steps.

182. The method for fast decoding of claim 178, wherein said inverse non-stationary cell filtering further comprises:

delaying an input sample for w samples to produce a plurality of even and odd indexed delayed results in each first cycle;

multiplying each even indexed delayed result with at least one first filter coefficient selected from a group of first filter coefficients to produce first results;

adding together all first results to produce a third result;

adding the third result with the input sample to produce a fifth result;

delaying the fifth result for w samples to produce a plurality of even and odd indexed delayed results in each second cycle;

multiplying the input sample and each odd indexed delayed result with at least one second filter coefficient selected from the group of second filter coefficients to produce second results;

adding together all second results to produce a fourth result;

adding the fourth result with last delayed result to produce a sixth result;

outputting the sixth result in each first cycle; and outputting the last delayed result in each second cycle.

183. The method for fast decoding of claim 182, wherein at least one said multiplying comprises an operation selected from a group consisting of: shifting and bit remapping.

184. The method for fast decoding of claim 182, wherein said inverse non-stationary cell filtering further comprises:

transforming the third result by first function $N_1$ to produce a seventh result;

transforming the fourth result by first function $N_2$ to produce an eight result;

adding the seventh result with the input sample to produce a fifth result; and adding the eight result with last delayed result to produce a sixth result.

185. The method for fast decoding of claim 184, wherein at least one said transforming comprises an operation selected from a group consisting of: shifting and bit remapping.

186. The method for fast decoding of claim 178, wherein said inverse non-stationary cell filtering further comprises:

delaying an input sample for w samples to produce a delayed result in each first cycle;

second multiplying the delayed result with a second filter coefficient to produce a second result;

first adding the second result with the input sample to produce a fourth result;

delaying the fourth result for w samples to produce the delayed result in each second cycle;

first multiplying the input sample with a first filter coefficient to produce a first result;

second adding the first result with the delayed result to produce a third result;

outputting the third result in each first cycle; and outputting the delayed result in each second cycle.

187. The method for fast decoding of claim 186, wherein at least one of said first multiplying and said second multiplying comprises an operation selected from a group consisting of: shifting and bit remapping.

188. The method for fast decoding of claim 187, wherein said operation comprises shifting right for one bit position.

189. The method for fast decoding of claim 187, wherein said operation comprises shifting right for two bit positions.

190. The method for fast decoding of claim 189, wherein:
said first adding comprises subtracting the second result from the input sample to produce a fourth result; and
said second adding comprises subtracting the first result from the delayed result to produce a third result.

191. The method for fast decoding of claim 178, wherein said inverse non-stationary cell filtering further comprises:
delaying the input sample for w samples to produce a first delayed result in each first cycle;
delaying the first delayed result for w samples to produce a second delayed result;
delaying the second delayed result for w samples to produce a third delayed result;
first multiplying the input sample with a first filter coefficient to produce a first result;
second multiplying the first delayed result with a second filter coefficient to produce a second result;
third multiplying the second delayed result with a third filter coefficient to produce a third result;
fourth multiplying the third delayed result with a fourth filter coefficient to produce a fourth result;
second adding the fourth result with the second result to produce a sixth result;
third adding the first result with the third result to produce a fifth result;
first adding the sixth result with the input sample to produce an eight result;
delaying the eight result for w samples to produce the first delayed result in each second cycle;
fourth adding the fifth result with the third delayed result to produce a seventh result;
outputting the seventh result in each first cycle; and
outputting the third delayed result in each second cycle.

192. The method for fast decoding of claim 191, wherein at least one of said first multiplying, said second multiplying, said third multiplying and said fourth multiplying comprises an operation selected from a group consisting of:
shifting and bit remapping.

193. The method for fast decoding of claim 192, wherein said operation comprises shifting right for four bit positions.

194. The method for fast decoding of claim 193, wherein:
said second adding comprises subtracting the fourth result from the second result to produce a sixth result; and
said third adding comprises subtracting the first result from the third result to produce a fifth result.

195. The method for fast decoding of claim 166, wherein said estimating the probabilities of symbols within the contexts of transformation coefficients comprises updating adaptive histograms.

196. The method for fast decoding of claim 195, wherein said updating adaptive histograms comprises low-pass filtering probabilities selected from a group consisting of:
probabilities of occurrences of a current symbol x; and
cumulative probabilities of occurrences of all symbols preceding said current symbol x.

197. The method for fast decoding of claim 196, wherein said updating adaptive histograms further comprises adapting a dominant pole during said low-pass filtering.

198. The method for fast decoding of claim 197, wherein said adapting a dominant pole comprises halving value of the dominant pole in each adaptation cycle.

199. The method for fast decoding of claim 166, wherein said entropy decoding comprises range decoding, comprising first multiplying a prescaled range r with a number Q(x) selected from a group consisting of:
a number U(x) of occurrences of all symbols preceding a current symbol x, to produce a range correction t=r·U(x); and
a number u(x) of occurrences of the current symbol x, to produce a range R=r·u(x).

200. The method for fast decoding of claim 199, wherein said first multiplying comprises:
simplified multiplying a small number $V=\lfloor r \cdot 2^{-1} \rfloor$ with said number Q(x) to produce a first result; and
shifting left the first result for 1 bit positions.

201. The method for fast decoding of claim 199, wherein said first multiplying comprises shifting left said number Q(x) for 1 bit positions.

202. The method for fast decoding of claim 199, wherein said first multiplying comprises:
zeroing a first result, when a small number $V=\lfloor r \cdot 2^{-1} \rfloor$ is equal 1;
shifting left said number Q(x) for one bit position to produce a first result, when said small number V is any odd number higher or equal 3;
adding said number Q(x) with the first result to produce a second result; and
shifting left the second result for 1 bit positions.

203. The method for fast decoding of claim 199, wherein said first multiplying comprises:
zeroing a first result, when a small number $V=\lfloor r \cdot 2^{-1} \rfloor$ is equal 1;
shifting left said number Q(x) for one bit position to produce a first result, when said small number V is equal 3;
shifting left said number Q(x) for two bit positions to produce a first result, when said small number V is any odd number higher or equal 5;
adding said number Q(x) with the first result to produce a second result; and
shifting left the second result for 1 bit positions.

204. The method for fast decoding of claim 166, wherein said entropy decoding comprises range decoding, comprising first dividing a range R with a number Total of occurrences of all symbols, to produce a prescaled range $r=\lfloor R/\text{Total} \rfloor$.

205. The method for fast decoding of claim 204, wherein said first dividing comprises shifting right said range R for $w_3 = \log_2(\text{Total})$ bit positions.

206. The method for fast decoding of claim 166, wherein said entropy decoding comprises range decoding, comprising second dividing a bottom range limit B with a prescaled range r, to produce a range correction $t=\lfloor B/r \rfloor$.

207. The method for fast decoding of claim 206, wherein said second dividing comprises:
simplified dividing said bottom range limit B with a small number $V=\lfloor r \cdot 2^{-1} \rfloor$ to produce a first result; and
shifting right the first result for 1 bit positions.

208. The method for fast decoding of claim 206, wherein said second dividing comprises:
multiplying said bottom range limit B with a first predefined number, dependent on a small number $V=\lfloor r \cdot 2^{-1} \rfloor$ to produce a first result; and
shifting right the first result for a sum of 1 and a second predefined number of bit positions, dependent on said small number V.

209. The method for fast decoding of claim 166, wherein said estimating the probabilities of symbols within the contexts of transformation coefficients comprises reconstructing transformation coefficient C using a magnitude-set index MS, a sign S and a residual R.

210. The method for fast decoding of claim 209, wherein said entropy decoding comprises decoding said residual R using inverse variable length coding (INVVLC).

211. The method for fast decoding of claim 209, wherein said estimating the probabilities of symbols within the contexts of transformation coefficients further comprises context modeling of a transformation coefficient to be decoded, using already decoded transformation coefficients.

212. The method for fast decoding of claim 211, wherein said already decoded transformation coefficients are located north-east, north, north-west and west from the transformation coefficient to be decoded.

213. The method for fast decoding of claim 211, wherein said estimating the probabilities of symbols within the contexts of transformation coefficients further comprises determining a mean value $\overline{MS}$ as the mean value of magnitude-set indexes $MS_i$ of said already decoded transformation coefficients.

214. The method for fast decoding of claim 213, wherein said estimating the probabilities of symbols within the contexts of transformation coefficients further comprises limiting a maximum mean value $\overline{MS}$ by a constant ML to produce a magnitude context MC.

215. The method for fast decoding of claim 214, wherein said entropy decoding comprises range decoding a magnitude-set index MS as a current symbol x, using an adaptive magnitude histogram h[MC].

216. The fast decoding of claim 215, wherein said estimating the probabilities of symbols within the contexts of transformation coefficients further comprises updating of an adaptive magnitude histogram h[MC] using decoded said magnitude-set index MS as a current symbol x.

217. The method for fast decoding of claim 211, wherein said estimating the probabilities of symbols within the contexts of transformation coefficients further comprises determining a ternary context TC as the ternary code of sign values $S_i$ of said already decoded transformation coefficients.

218. The method for fast decoding of claim 217, wherein said estimating the probabilities of symbols within the contexts of transformation coefficients further comprises translating said ternary context TC into a sign context SC using CTX table.

219. The method for fast decoding of claim 218, wherein said entropy decoding comprises range decoding a sign S as a current symbol x, using an adaptive sign histogram g[SC].

220. The method for fast decoding of claim 219, wherein said estimating the probabilities of symbols within the contexts of transformation coefficients further comprises updating of an adaptive sign histogram g[SC] using decoded said sign S as a current symbol x.

221. The method for fast decoding of claim 219, wherein said estimating the probabilities of symbols within the contexts of transformation coefficients further comprises inverting less probable decoded said sign S using NEG table.

222. An article of manufacture for fast decoding of input compressed data into output data comprising a at least one non-transitory processor readable storage medium for storing a computer program of instructions configured to be readable by at least one processor for instructing the at least one processor to execute a computer process for performing the method of claim 166.

223. An article of manufacture for fast encoding of input data into output compressed data, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
receive input data at a plurality of single-level direct subband transformers;
transform the input data in the plurality of single-level direct subband transformers to produce transformation coefficients;
receive respective transformation coefficients directly from the plurality of single-level direct subband transformers at a plurality of processing means;
process the respective transformation coefficients received at each of the plurality of processing means to produce processed transformation coefficients, each of the plurality of processing means selected from a group consisting of: pass-through means for lossless processing and quantizer means for lossy processing;
estimate probabilities of symbols within contexts of transformation coefficients using the processed transformation coefficients to produce the probabilities of symbols within the contexts of transformation coefficients;
entropy encode the processed transformation coefficients using the probabilities of symbols within the contexts of transformation coefficients to produce encoded data; and
substantially synchronize the encoded data to produce output compressed data.

224. The article of manufacture for fast encoding of claim 223, further causing the at least one processor to:
substantially synchronize the encoded data to produce synchronized compressed data; and
buffer the synchronized compressed data to produce the output compressed data.

225. The article of manufacture for fast encoding of claim 223, further causing the at least one processor to color space convert original input data to produce input data.

226. The article of manufacture for fast encoding of claim 223, wherein said direct subband transform causes the at least one processor to:
(a) direct subband transform the input data to produce transformation coefficients;
(b) direct subband transform selected transformation coefficients to produce transformed transformation coefficients; and
(c) repeat step (b) finite number of times.

227. The article of manufacture for fast encoding of claim 226, wherein said selected transformation coefficients are low-pass transformed for one-dimensional input data.

228. The article of manufacture for fast encoding of claim 226, wherein said selected transformation coefficients are low-pass transformed both horizontally and vertically for two-dimensional input data.

229. The article of manufacture for fast encoding of claim 223, wherein said direct subband transform causes the at least one processor to:
direct filter horizontally; and
direct filter vertically.

230. The article of manufacture for fast encoding of claim 229, wherein said direct filter horizontally is different from said direct filter vertically.

231. The article of manufacture for fast encoding of claim 229, wherein at least one of said direct filter horizontally and said direct filter vertically causes the at least one processor to direct non-stationary filter.

232. The article of manufacture for fast encoding of claim 223, wherein said direct subband transform causes the at least one processor to direct filter.

233. The article of manufacture for fast encoding of claim 232, wherein said direct filter causes the at least one processor to direct non-stationary filter.

234. The article of manufacture for fast encoding of claim 233, wherein said direct non-stationary filter causes the at least one processor to perform a plurality of successive direct non-stationary cell filterings.

235. The article of manufacture for fast encoding of claim 234, wherein said direct non-stationary cell filter causes the at least one processor to:
 filter using a first direct transfer function in a first cycle; and
 filter using a second direct transfer function in a second cycle.

236. The article of manufacture for fast encoding of claim 235, wherein said first cycle is active during horizontal filtering of each second pixel; and said second cycle is active during horizontal filtering of other pixels.

237. The article of manufacture for fast encoding of claim 235, wherein said first cycle is active during vertical filtering of each second line; and said second cycle is active during vertical filtering of other lines.

238. The article of manufacture for fast encoding of claim 235, wherein said direct non-stationary filter further causes the at least one processor to:
 multiply a result of a plurality of steps that successive direct non-stationary cell filter with a first gain number to produce a first result;
 multiply a result of a plurality of steps that successive direct non-stationary cell filter with a second gain number to produce a second result;
 select the first result in each first cycle to produce an output sample; and
 select the second result in each second cycle to produce the output sample.

239. The article of manufacture for fast encoding of claim 235, wherein said direct non-stationary cell filter further causes the at least one processor to:
 delay an input sample for w samples to produce a plurality of even and odd indexed delayed results in each first cycle;
 multiply each even indexed delayed result with at least one first filter coefficient selected from a group of first filter coefficients to produce first results;
 add together all first results to produce a third result;
 add the third result with the input sample to produce a fifth result;
 delay the fifth result for w samples to produce a plurality of even and odd indexed delayed results in each second cycle;
 multiply the input sample and each odd indexed delayed result with at least one second filter coefficient selected from a group of second filter coefficients to produce second results;
 add together all second results to produce a fourth result;
 add the fourth result with last delayed result to produce a sixth result;
 output the sixth result in each first cycle; and
 output the last delayed result in each second cycle.

240. The article of manufacture for fast encoding of claim 239, wherein at least one said multiply causes the at least one processor to perform an operation selected from a group consisting of: shift and bit remap.

241. The article of manufacture for fast encoding of claim 239, wherein said direct non-stationary filter further causes the at least one processor to:
 transform the third result by first function $N_1$ to produce a seventh result;
 transform the fourth result by first function $N_2$ to produce an eight result;
 add the seventh result with the input sample to produce a fifth result; and
 add the eight result with last delayed result to produce a sixth result.

242. The article of manufacture for fast encoding of claim 241, wherein at least one said transform causes the at least one processor to perform an operation selected from a group consisting of: shift and bit remap.

243. The article of manufacture for fast encoding of claim 235, wherein said direct non-stationary cell filter further causes the at least one processor to:
 delay an input sample for w samples to produce a delayed result in each first cycle;
 multiply the delayed result with a second filter coefficient to produce a second result;
 add the second result with the input sample to produce a fourth result;
 delay the fourth result for w samples to produce the delayed result in each second cycle;
 multiply the input sample with a first filter coefficient to produce a first result;
 add the first result with the delayed result to produce a third result;
 output the third result in each first cycle; and
 output the delayed result in each second cycle.

244. The article of manufacture for fast encoding of claim 243, wherein at least one said multiply causes the at least one processor to perform an operation selected from a group consisting of: shift and bit remap.

245. The article of manufacture for fast encoding of claim 244, wherein said operation causes the at least one processor to shift right data for two bit positions.

246. The article of manufacture for fast encoding of claim 244, wherein said operation causes the at least one processor to shift right data for one bit position.

247. The article of manufacture for fast encoding of claim 246, wherein said add the second result causes the at least one processor to subtract the second result from the input sample to produce a fourth result; and said add the first result causes the at least one processor to subtract the first result from the delayed result to produce a third result.

248. The article of manufacture for fast encoding of claim 235, wherein said direct non-stationary cell filter further causes the at least one processor to:
 delay the input sample for w samples to produce a first delayed result in each first cycle;
 delay the first delayed result for w samples to produce a second delayed result;
 delay the second delayed result for w samples to produce a third delayed result;
 multiply the input sample with a first filter coefficient to produce a first result;
 multiply the first delayed result with a second filter coefficient to produce a second result;
 multiply the second delayed result with a third filter coefficient to produce a third result;

multiply the third delayed result with a fourth filter coefficient to produce a fourth result;
add the second result with the fourth result to produce a sixth result;
add the third result with the first result to produce a fifth result;
add the sixth result with the input sample to produce an eight result;
delay the eight result for w samples to produce the first delayed result in each second cycle;
add the fifth result with the third delayed result to produce a seventh result;
output the seventh result in each first cycle; and
output the third delayed result in each second cycle.

249. The article of manufacture for fast encoding of claim 248, wherein at least one said multiply causes the at least one processor to perform an operation selected from a group consisting of: shift and bit remap.

250. The article of manufacture for fast encoding of claim 249, wherein said operation causes the at least one processor to shift right data for four bit positions.

251. The article of manufacture for fast encoding of claim 250, wherein:
said add the second result causes the at least one processor to subtract the second result from the fourth result to produce a sixth result; and
said add the third result causes the at least one processor to subtract the third result from the first result to produce a fifth result.

252. The article of manufacture for fast encoding of claim 223, wherein said estimate the probabilities of symbols within the contexts of transformation coefficients causes the at least one processor to update adaptive histograms.

253. The article of manufacture for fast encoding of claim 252, wherein said updates adaptive histograms causes the at least one processor to low-pass filter probabilities selected from a group consisting of:
probabilities of occurrences of a current symbol x; and
cumulative probabilities of occurrences of all symbols preceding the current symbol x.

254. The article of manufacture for fast encoding of claim 253, wherein said update adaptive histograms further causes the at least one processor to adapt a dominant pole during said low-pass filtering.

255. The article of manufacture for fast encoding of claim 254, wherein said adapt a dominant pole causes the at least one processor to halve value of the dominant pole in each adaptation cycle.

256. The article of manufacture for fast encoding of claim 223, wherein said entropy encode comprises a range encode, causing the at least one processor to multiply a prescaled range r with a number Q(x) selected from a group consisting of:
a number U(x) of occurrences of all symbols preceding a current symbol x, to produce a range correction t= r·U(x); and
a number u(x) of occurrences of the current symbol x, to produce a range R=r·u(x).

257. The article of manufacture for fast encoding of claim 256, wherein said multiply causes the at least one processor to:
simplified multiply a small number $V=\lfloor r \cdot 2^{-1} \rfloor$ with said number Q(x) to produce a first result; and
shift left the first result for l bit positions.

258. The article of manufacture for fast encoding of claim 256, wherein said multiply causes the at least one processor to shift left said number Q(x) for 1 bit positions.

259. The article of manufacture for fast encoding of claim 256, wherein said multiply causes the at least one processor to:
zero a first result, when a small number $V=\lfloor r \cdot 2^{-1} \rfloor$ is equal 1;
shift left said number Q(x) for one bit position to produce a first result, when said small number V is any odd number higher or equal 3;
add said number Q(x) with the first result to produce a second result; and
shift left the second result for 1 bit positions.

260. The article of manufacture for fast encoding of claim 256, wherein said multiply causes the at least one processor to:
zero a first result, when a small number $V=\lfloor r \cdot 2^{-1} \rfloor$ is equal 1;
shift left said number Q(x) for one bit position to produce a first result, when said small number V is equal 3;
shift left said number Q(x) for two bit positions to produce a first result, when said small number V is any odd number higher or equal 5;
add said number Q(x) with the first result to produce a second result; and
shift left the second result for 1 bit positions.

261. The article of manufacture for fast encoding of claim 223, wherein said entropy encode comprises a range encode, causing the at least one processor to:
divide a range R with a number Total of occurrences of all symbols, to produce a prescaled range $r=\lfloor R/Total \rfloor$.

262. The article of manufacture for fast encoding of claim 261, wherein said divide causes the at least one processor to shift right range R for $w_3=\log_2(Total)$ bit positions.

263. The article of manufacture for fast encoding of claim 223, wherein said estimate the probabilities of symbols within the contexts of transformation coefficients causes the at least one processor to:
split a transformation coefficient C into a sign S and a magnitude M;
determine a magnitude-set index MS using said magnitude M and a magnitude-set table; and
determine a residual R using said magnitude M and said magnitude-set table.

264. The article of manufacture for fast encoding of claim 263, wherein:
said magnitude-set index MS is determined to be equal to a sum of a doubled position of the first nonzero bit of the highest significance and the value of the first next bit of the lower significance in a binary representation of said magnitude M; and
said residual R is determined as the difference between said magnitude M and the lower coefficient limit, equal to a value of said magnitude M with all bits zeroed except the first nonzero bit of the highest significance and the first next bit of the lower significance in a binary representation of said magnitude M.

265. The article of manufacture for fast encoding of claim 263, wherein said entropy encodes causes the at least one processor to encode a residual R using variable length coding (VLC).

266. The article of manufacture for fast encoding of claim 263, wherein said estimate the probabilities of symbols within the contexts of transformation coefficients further causes the at least one processor to context model a transformation coefficient to be encoded, using already encoded transformation coefficients.

267. The article of manufacture for fast encoding of claim 266, wherein said already encoded transformation coefficients are located north-east, north, north-west and west from said transformation coefficient to be encoded.

268. The article of manufacture for fast encoding of claim 266, wherein said estimate the probabilities of symbols within the contexts of transformation coefficients further causes the at least one processor to determine a mean value $\overline{MS}$ as the mean value of magnitude-set indexes $MS_i$ of said already encoded transformation coefficients.

269. The article of manufacture for fast encoding of claim 268, wherein said estimate the probabilities of symbols within the contexts of transformation coefficients further causes the at least one processor to limit a maximum mean value $\overline{MS}$ by a constant ML to produce a magnitude context MC.

270. The article of manufacture for fast encoding of claim 269, wherein said entropy encodes causes the at least one processor to range encode said magnitude-set index MS as a current symbol x, using said adaptive magnitude histogram h[MC].

271. The article of manufacture for fast encoding of claim 270, wherein said estimate the probabilities of symbols within the contexts of transformation coefficients further causes the at least one processor to update an adaptive magnitude histogram h[MC] using said magnitude-set index MS as a current symbol x.

272. The article of manufacture for fast encoding of claim 266, wherein said estimate the probabilities of symbols within the contexts of transformation coefficients further causes the at least one processor to determine a ternary context TC as the ternary code of sign values $S_i$ of said already encoded transformation coefficients.

273. The article of manufacture for fast encoding of claim 272, wherein said estimate the probabilities of symbols within the contexts of transformation coefficients further causes the at least one processor to invert less probable said sign S using NEG table.

274. The article of manufacture for fast encoding of claim 272, wherein said estimate the probabilities of symbols within the contexts of transformation coefficients further causes the at least one processor to translate said ternary context TC into a sign context SC using CTX table.

275. The article of manufacture for fast encoding of claim 274, wherein said entropy encodes causes the at least one processor to range encode said sign S as a current symbol x, using said adaptive sign histogram g[SC].

276. The article of manufacture for fast encoding of claim 274, wherein said estimate the probabilities of symbols within the contexts of transformation coefficients further causes the at least one processor to update of an adaptive sign histogram g[SC] using said sign S as a current symbol x.

277. An article of manufacture for fast decoding of input compressed data into output data, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
substantially synchronize input compressed data to produce synchronized compressed data;
entropy decode the synchronized compressed data using probabilities of symbols within contexts of transformation coefficients to produce transformation coefficients;
estimate the probabilities of symbols within the contexts of transformation coefficients using the transformation coefficients to produce the probabilities of symbols within the contexts of transformation coefficients;
process the transformation coefficients in a plurality of processing means to produce processed transformation coefficients, each of the plurality of processing means selected from a group consisting of: pass-through means for lossless processing and dequantizer means for lossy processing;
receive respective processed transformation coefficients directly from the plurality of processing means at a plurality of single-level inverse direct subband transformers; and
transform the respective processed transformation coefficients received at the plurality of single-level inverse direct subband transformers to produce output data.

278. The article of manufacture for fast decoding of claim 277, further causing the at least one processor to:
buffer input compressed data to produce buffered compressed data; and
substantially synchronize the buffered compressed data to produce synchronized compressed data.

279. The article of manufacture for fast decoding of claim 277, further causing the at least one processor to color space convert the output data to produce converted output data.

280. The article of manufacture for fast decoding of claim 277, wherein said inverse subband transform causes the at least one processor to:
(a) inverse subband transform transformation coefficients to produce selected transformation coefficients;
(b) repeat step (a) finite number of times; and
(c) inverse subband transform transformation coefficients to produce the output data.

281. The article of manufacture for fast decoding of claim 280, wherein said selected transformation coefficients are low-pass transformed for one-dimensional input data.

282. The article of manufacture for fast decoding of claim 280, wherein said selected transformation coefficients are low-pass transformed both horizontally and vertically for two-dimensional input data.

283. The article of manufacture for fast decoding of claim 277, wherein said inverse subband transform causes the at least one processor to:
inverse filter horizontally; and
inverse filter vertically.

284. The article of manufacture for fast decoding of claim 283, wherein said inverse filter horizontally is different from said inverse filter vertically.

285. The article of manufacture for fast decoding of claim 283, wherein at least one of said inverse filter horizontally and said inverse filter vertically causes the at least one processor to inverse non-stationary filter.

286. The article of manufacture for fast decoding of claim 277, wherein said inverse subband transform causes the at least one processor to inverse filter.

287. The article of manufacture for fast decoding of claim 286, wherein said inverse filter causes the at least one processor to inverse non-stationary filter.

288. The article of manufacture for fast decoding of claim 287, wherein said inverse non-stationary filter causes the at least one processor to perform a plurality of successive inverse non-stationary cell filterings.

289. The article of manufacture for fast decoding of claim 288, wherein said inverse non-stationary cell filter causes the at least one processor to:

filter using a first inverse transfer function in a first cycle; and filter using a second inverse function in a second cycle.

290. The article of manufacture for fast decoding of claim 289, wherein said second cycle is active during horizontal filtering of each second pixel and said first cycle is active during horizontal filtering of other pixels.

291. The article of manufacture for fast decoding of claim 289, wherein said second cycle is active during vertical filtering of each second line and said first cycle is active during vertical filtering of other lines.

292. The article of manufacture for fast decoding of claim 289, wherein said inverse non-stationary filter further causes the at least one processor to:
    multiply an input with a reciprocal value of a first gain number to produce a first result;
    multiply an input with a reciprocal value of a second gain number to produce a second result;
    select the first result in each second cycle to produce an input sample for a plurality of steps that successive inverse non-stationary cell filter; and
    select the second result in each first cycle to produce an input sample for a plurality of steps that successive inverse non-stationary cell filter.

293. The article of manufacture for fast decoding of claim 289, wherein said inverse non-stationary cell filter further causes the at least one processor to:
    delay an input sample for w samples to produce a plurality of even and odd indexed delayed results in each first cycle;
    multiply each even indexed delayed result with at least one first filter coefficient selected from a group of first filter coefficients to produce first results;
    add together all first results to produce a third result;
    add the third result with the input sample to produce a fifth result;
    delay the fifth result for w samples to produce a plurality of even and odd indexed delayed results in each second cycle;
    multiply the input sample and each odd indexed delayed result with at least one second filter coefficient selected from a group of second filter coefficients to produce second results;
    add together all second results to produce a fourth result;
    add the fourth result with last delayed result to produce a sixth result;
    output the sixth result in each first cycle; and
    output the last delayed result in each second cycle.

294. The article of manufacture for fast decoding of claim 293, wherein at least one said multiply causes the at least one processor to perform an operation selected from a group consisting of: shift and bit remap.

295. The article of manufacture for fast decoding of claim 293, wherein said inverse non-stationary cell filter further causes the at least one processor to:
    transform the third result by a first function $N_1$ to produce a seventh result;
    transform the fourth result by a first function $N_2$ to produce an eight result;
    add the seventh result with the input sample to produce a fifth result; and
    add the eight result with last delayed result to produce a sixth result.

296. The article of manufacture for fast decoding of claim 295, wherein at least one said transform causes the at least one processor to perform an operation selected from a group consisting of: shift and bit remap.

297. The article of manufacture for fast decoding of claim 289, wherein said inverse non-stationary cell filter further causes the at least one processor to:
    delay an input sample for w samples to produce a delayed result in each first cycle;
    multiply the delayed result with a second filter coefficient to produce a second result;
    add the second result with the input sample to produce a fourth result;
    delay the fourth result for w samples to produce the delayed result in each second cycle;
    multiply the input sample with a first filter coefficient to produce a first result;
    add the first result with the delayed result to produce a third result;
    output the third result in each first cycle; and
    output the delayed result in each second cycle.

298. The article of manufacture for fast decoding of claim 297, wherein at least one said multiply causes the at least one processor to perform an operation selected from a group consisting of: shift and bit remap.

299. The article of manufacture for fast decoding of claim 298, wherein said operation causes the at least one processor to shift right for one bit position.

300. The article of manufacture for fast decoding of claim 298, wherein said operation causes the at least one processor to shift right data for two bit positions.

301. The article of manufacture for fast decoding of claim 300, wherein said add the second result causes the at least one processor to subtract the second result from the input sample to produce a fourth result; and said add the first result causes the at least one processor to subtract the first result from the delayed result to produce a third result.

302. The article of manufacture for fast decoding of claim 289, wherein said inverse non-stationary cell filter further causes the at least one processor to:
    delay an input sample for w samples to produce a first delayed result in each first cycle;
    delay the first delayed result for w samples to produce a second delayed result;
    delay the second delayed result for w samples to produce a third delayed result;
    multiply the input sample with a first filter coefficient to produce a first result;
    multiply the first delayed result with a second filter coefficient to produce a second result;
    multiply the second delayed result with a third filter coefficient to produce a third result;
    multiply the third delayed result with a fourth filter coefficient to produce a fourth result;
    add the fourth result with the second result to produce a sixth result;
    add the first result with the third result to produce a fifth result;
    add the sixth result with the input sample to produce an eight result;
    delay the eight result for w samples to produce the first delayed result in each second cycle;
    add the fifth result with the third delayed result to produce a seventh result;
    output the seventh result in each first cycle; and
    output the third delayed result in each second cycle.

303. The article of manufacture for fast decoding of claim 302, wherein at least one said multiply causes the at least one processor to perform an operation selected from a group consisting of: shift and bit remap.

304. The article of manufacture for fast decoding of claim 303, wherein said operation causes the at least one processor to shift right data for four bit positions.

305. The article of manufacture for fast decoding of claim 304, wherein said add the fourth result causes the at least one processor to subtract the fourth result from the second result to produce a sixth result; and said add the first result causes the at least one processor to subtract the first result from the third result to produce a fifth result.

306. The article of manufacture for fast decoding of claim 277, wherein said estimate the probabilities of symbols within the contexts of transformation coefficients causes the at least one processor to update adaptive histograms.

307. The article of manufacture for fast decoding of claim 306, wherein said update adaptive histograms causes the at least one processor to low-pass filter probabilities selected from a group consisting of:
 probabilities of occurrences of a current symbol x; and
 cumulative probabilities of occurrences of all symbols preceding said current symbol x.

308. The article of manufacture for fast decoding of claim 307, wherein said update adaptive histograms further causes the at least one processor to adapt a dominant pole during said low-pass filtering.

309. The article of manufacture for fast decoding of claim 308, wherein said adapt a dominant pole causes the at least one processor to halve value of the dominant pole in each adaptation cycle.

310. The article of manufacture for fast decoding of claim 277, wherein said entropy decode comprises a range decode, causing the at least one processor to multiply a prescaled range r with a number Q(x) selected from a group consisting of:
 a number U(x) of occurrences of all symbols preceding a current symbol x, to produce a range correction t= r·U(x); and
 a number u(x) of occurrences of the current symbol x, to produce a range R=r·u(x).

311. The article of manufacture for fast decoding of claim 310, wherein said multiply causes the at least one processor to:
 simplified multiply a small number $V=\lfloor r \cdot 2^{-1} \rfloor$ with said number Q(x) to produce a first result; and
 shift left the first result for 1 bit positions.

312. The article of manufacture for fast decoding of claim 310, wherein said multiply causes the at least one processor to shift left said number Q(x) for 1 bit positions.

313. The article of manufacture for fast decoding of claim 310, wherein said multiply causes the at least one processor to:
 zero a first result, when a small number $V=\lfloor r \cdot 2^{-1} \rfloor$ is equal 1;
 shift left said number Q(x) for one bit position to produce a first result, when said small number V is any odd number higher or equal 3;
 add said number Q(x) with the first result to produce a second result; and
 shift left the second result for 1 bit positions.

314. The article of manufacture for fast decoding of claim 310, wherein said multiply causes the at least one processor to:
 zero a first result, when a small number $V=\lfloor r \cdot 2^{-1} \rfloor$ is equal 1;
 shift left said number Q(x) for one bit position to produce a first result, when said small number V is equal 3;
 shift left said number Q(x) for two bit positions to produce a first result, when said small number V is any odd number higher or equal 5;
 add said number Q(x) with the first result to produce a second result; and
 shift left the second result for 1bit positions.

315. The article of manufacture for fast decoding of claim 277, wherein said entropy decode comprises a range decode, causing the at least one processor to divide a range R with a number Total of occurrences of all symbols, to produce a prescaled range $r=\lfloor R/Total \rfloor$.

316. The article of manufacture for fast decoding of claim 315, wherein said divide causes the at least one processor to shift right said range R for $w_3=\log_2(Total)$ bit positions.

317. The article of manufacture for fast decoding of claim 277, wherein said entropy decode comprises a range decode, causing the at least one processor to divide a bottom range limit B with a prescaled range r, to produce a range correction $t=\lfloor B/r \rfloor$.

318. The article of manufacture for fast decoding of claim 317, wherein said divide causes the at least one processor to:
 simplified divide said bottom range limit B with a small number $V=\lfloor r \cdot 2^{-1} \rfloor$ to produce a first result; and
 shift right the first result for 1 bit positions.

319. The article of manufacture for fast decoding of claim 317, wherein said divide causes the at least one processor to:
 multiply said bottom range limit B with a first predefined number, dependent on a small number $V=\lfloor r \cdot 2^{-1} \rfloor$ to produce a first result; and
 shift right the first result for a sum of 1 and a second predefined number of bit positions, dependent on said small number V.

320. The article of manufacture for fast decoding of claim 277, wherein said estimate the probabilities of symbols within the contexts of transformation coefficients causes the at least one processor to reconstruct transformation coefficient C, using a magnitude-set index MS, a sign S and a residual R.

321. The article of manufacture for fast decoding of claim 320, wherein said entropy decode causes the at least one processor to decode said residual R using inverse variable length coding (INVVLC).

322. The article of manufacture for fast decoding of claim 320, wherein said estimate the probabilities of symbols within the contexts of transformation coefficients further causes the at least one processor to context model a transformation coefficient to be decoded, using already decoded transformation coefficients.

323. The article of manufacture for fast decoding of claim 322, wherein said already decoded transformation coefficients are located north-east, north, north-west and west from the transformation coefficient to be decoded.

324. The article of manufacture for fast decoding of claim 322, wherein said estimate the probabilities of symbols within the contexts of transformation coefficients further causes the at least one processor to determine a mean value $\overline{MS}$ as the mean value of magnitude-set indexes $MS_i$ of said already decoded transformation coefficients.

325. The article of manufacture for fast decoding of claim 324, wherein said estimate the probabilities of symbols within the contexts of transformation coefficients further causes the at least one processor to limit a maximum mean value $\overline{MS}$ by a constant ML to produce a magnitude context MC.

326. The article of manufacture for fast decoding of claim 325, wherein said entropy decode causes the at least one processor to range decode said magnitude-set index MS as a current symbol x, using said adaptive magnitude histogram h[MC].

327. The article of manufacture for fast decoding of claim 326, wherein said estimate the probabilities of symbols within the contexts of transformation coefficients further causes the at least one processor to update an adaptive magnitude histogram h[MC] using said magnitude-set index MS as a current symbol x.

328. The article of manufacture for fast decoding of claim 322, wherein said estimate the probabilities of symbols within the contexts of transformation coefficients further causes the at least one processor to determine a ternary context TC as the ternary code of sign values $S_i$ of said already decoded transformation coefficients.

329. The article of manufacture for fast decoding of claim 328, wherein said estimate the probabilities of symbols within the contexts of transformation coefficients further causes the at least one processor to translate said ternary context TC into a sign context SC using CTX table.

330. The article of manufacture for fast decoding of claim 329, wherein said entropy decode causes the at least one processor to range decode sign S as a current symbol x, using an adaptive sign histogram g[SC].

331. The article of manufacture for fast decoding of claim 330, wherein said estimate the probabilities of symbols within the contexts of transformation coefficients further causes the at least one processor to update an adaptive sign histogram g[SC] using decoded sign S as a current symbol x.

332. The article of manufacture for fast decoding of claim 330, wherein said estimate the probabilities of symbols within the contexts of transformation coefficients further causes the at least one processor to invert less probable decoded sign S using NEG table.

* * * * *

UNITED STATES PATENT AND TRADEMARK OFFICE
CERTIFICATE OF CORRECTION

PATENT NO. : 8,306,340 B2
APPLICATION NO. : 10/527963
DATED : November 6, 2012
INVENTOR(S) : Vladimir Ceperkovic et al.

It is certified that error appears in the above-identified patent and that said Letters Patent is hereby corrected as shown below:

Title Page

Item (75) should read:
--(75) Inventors: Vladimir Ceperkovic, Kraljevo, Serbia (RS)
Sasa Pavlovic, Belgrade, Serbia (RS)
Dusan Mirkovic, Belgrade, Serbia (RS)--

Item (73) should read:
--(73) Assignees: Vladimir Ceperkovic, Kraljevo, Serbia (RS)
Sasa Pavlovic, Belgrade, Serbia (RS)
Dusan Mirkovic, Belgrade, Serbia (RS)
Milan Prokin, Belgrade, Serbia (RS)--

Signed and Sealed this
Fifteenth Day of January, 2013

David J. Kappos
*Director of the United States Patent and Trademark Office*